(12) United States Patent
Akashi et al.

(10) Patent No.: US 12,444,235 B2
(45) Date of Patent: Oct. 14, 2025

(54) CONTROLLING ILLUMINATION APPARATUS BASED ON OVERLAP STATE BETWEEN IRIS AREA AND REFLECTION AREA

(71) Applicant: NEC Corporation, Tokyo (JP)

(72) Inventors: Ryuichi Akashi, Tokyo (JP); Kosuke Yoshimi, Tokyo (JP); Yuka Ogino, Tokyo (JP); Ryo Yamakabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/776,328

(22) PCT Filed: Aug. 31, 2021

(86) PCT No.: PCT/JP2021/032008
§ 371 (c)(1),
(2) Date: May 12, 2022

(87) PCT Pub. No.: WO2023/032051
PCT Pub. Date: Mar. 9, 2023

(65) Prior Publication Data
US 2024/0153311 A1   May 9, 2024

(51) Int. Cl.
*G06V 40/18* (2022.01)
*G06F 3/01* (2006.01)
*G06T 7/20* (2017.01)
*G06V 10/141* (2022.01)

(52) U.S. Cl.
CPC ............ *G06V 40/197* (2022.01); *G06F 3/013* (2013.01); *G06T 7/20* (2013.01); *G06V 10/141* (2022.01); *G06V 40/193* (2022.01); *G06V 2201/07* (2022.01)

(58) Field of Classification Search
None
See application file for complete search history.

(56) References Cited

U.S. PATENT DOCUMENTS

| | | |
|---|---|---|
| 2003/0152251 A1 | 8/2003 | Ike |
| 2005/0248725 A1 | 11/2005 | Ikoma et al. |
| 2009/0237208 A1 | 9/2009 | Tsukahara et al. |

FOREIGN PATENT DOCUMENTS

| | | |
|---|---|---|
| JP | H11-203478 A | 7/1999 |
| JP | 2000-060825 A | 2/2000 |
| JP | 2002-514098 A | 5/2002 |

(Continued)

OTHER PUBLICATIONS

Translation of WO 2020/261424 (Year: 2020).*

(Continued)

*Primary Examiner* — Lennin R Rodriguezgonzalez

(57) ABSTRACT

An illumination control apparatus 3 comprises: a detection unit 311 that detects an iris area IA and a reflection area RA in an eye image IMG_E generated by imaging eyes of a target being illuminated with illumination light IL from an illumination apparatus 2, the iris area IA and the reflection area RA corresponding to an iris of the eyes and a reflection image of the illumination light respectively; and an illumination control unit 312 that controls the illumination apparatus based on an overlap state between the iris area and the reflection area.

16 Claims, 23 Drawing Sheets

(56) References Cited

FOREIGN PATENT DOCUMENTS

| | | |
|---|---|---|
| JP | 2002-341406 A | 11/2002 |
| JP | 2003-308523 A | 10/2003 |
| JP | 2004-046451 A | 2/2004 |
| JP | 2007-319174 A | 12/2007 |
| WO | 2020/009126 A1 | 1/2020 |
| WO | 2020/261424 A1 | 12/2020 |
| WO | 2021/049428 A1 | 3/2021 |

OTHER PUBLICATIONS

Translation of JP 2004-046451 (Year: 2004).*
Partial supplementary European Search Report for EP Application No. 21955941.6, dated on Sep. 23, 2024.
JP Office Action for JP Application No. 2023-544849, mailed on Apr. 1, 2025 with English Translation.

* cited by examiner

CONTROLLING ILLUMINATION APPARATUS BASED ON OVERLAP STATE BETWEEN IRIS AREA AND REFLECTION AREA

This application is a National Stage Entry of PCT/JP2021/032008 filed on Aug. 31, 2021, the contents of all of which are incorporated herein by reference, in their entirety.

TECHNICAL FIELD

This disclosure relates to technical arts of, for example, an illumination control apparatus, an illumination control method, a recording medium, and an imaging system, each being available in an authentication system for authenticating a target using an iris of the target.

BACKGROUND ART

Patent Document 1 discloses one example of an authentication system capable of authenticating a target using an image generated by imaging an eye (especially, an iris) of the target. In addition, there are Patent Document 2 to Patent Document 8 as background art documents related to this disclosure.

BACKGROUND ART DOCUMENT LIST

Patent Document

Patent Document 1: JP 2002-341406 A
Patent Document 2: JP-H11-203478 A
Patent Document 3: JP 2002-514098 A
Patent Document 4: JP 2003-308523 A
Patent Document 5: WO 2020/009126 A1
Patent Document 6: WO 2020/261424 A1
Patent Document 7: WO 2021/049428 A1
Patent Document 8: JP 2007-319174 A

SUMMARY

Technical Problem

It is an object of the present disclosure to provide an illumination control apparatus, an illumination control method, a recording medium, and an imaging system for improving the arts thereof described in the background art documents.

Solution to Problem

One aspect of the illumination control apparatus includes: a detection unit that detects an iris area and a reflection area in an eye image generated by imaging eyes of a target being illuminated with illumination light from an illumination apparatus, the iris area and the reflection area corresponding to an iris of the eyes and a reflection image of the illumination light respectively; and an illumination control unit that controls the illumination apparatus based on an overlap state between the iris area and the reflection area.

One aspect of the illumination control method includes: detecting an iris area and a reflection area in an eye image generated by imaging eyes of a target being illuminated with illumination light from an illumination apparatus, the iris area and the reflection area corresponding to an iris of the eyes and a reflection image of the illumination light respectively; and controlling the illumination apparatus based on an overlap state between the iris area and the reflection area.

One aspect of recording medium is a recording medium storing a computer program that allows a computer to implement an illumination control method including: detecting an iris area and a reflection area in an eye image generated by imaging eyes of a target being illuminated with illumination light from an illumination apparatus, the iris area and the reflection area corresponding to an iris of the eyes and a reflection image of the illumination light respectively; and controlling the illumination apparatus based on an overlap state between the iris area and the reflection area.

One aspect of the imaging system includes: a right illumination apparatus that emits right illumination light capable of illuminating at least a right eye of a target; a left illumination apparatus that emits left illumination light capable of illuminating at least a left eye of the target; and an imaging apparatus that images the right eye illuminated with the right illumination light and the left eye illuminated with the left illumination light, wherein the right illumination apparatus is arranged on a left side of the imaging apparatus viewed from the front of the imaging apparatus, the left illumination apparatus is arranged on a right side of the imaging apparatus viewed from the front of the imaging apparatus, and an optical axis of the right illumination apparatus and an optical axis of the left illumination apparatus intersect each other at a position between the imaging apparatus and the target at a timing when the imaging apparatus images the right eye and the left eye.

DESCRIPTION OF EXAMPLE EMBODIMENTS

Hereinafter, example embodiments of an illumination control apparatus, an illumination control method, a recording medium, and an imaging system will be described with reference to the drawings.

(1) First Example Embodiment

Figure 1:
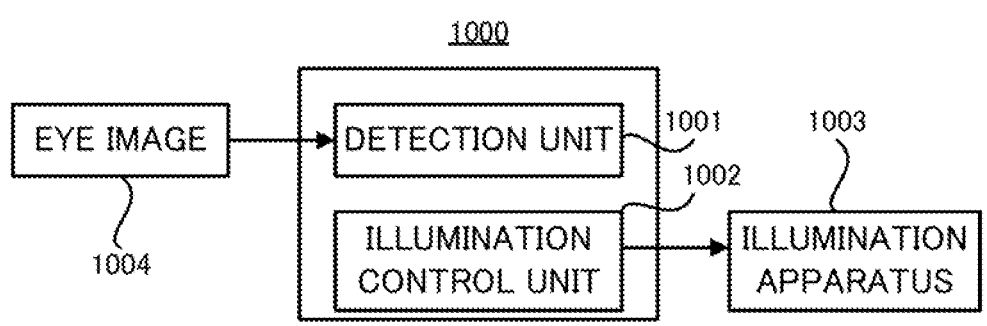
FIG. 1 is a block diagram showing a configuration of an illumination control apparatus according to the first example embodiment.

First, an illumination control apparatus, an illumination control method, a recording medium, and an imaging system according to a first example embodiment will be described. Referring to FIG. 1, the illumination control apparatus, the illumination control method, and the recording medium according to the first example embodiment will be explained using an illumination control apparatus 1000 where the illumination control apparatus, the illumination control method, and the recording medium according to the first example embodiment are applied. FIG. 1 is a block diagram showing a configuration of the illumination control apparatus 1000 according to the first example embodiment.

As shown in FIG. 1, the illumination control apparatus 1000 includes a detection unit 1001 and an illumination control unit 1002. The detection unit 1001 detects in an eye image 1004, an iris area corresponding to the iris of eyes and a reflection area corresponding to reflected image of the illumination light, the eye image 1004 being generated by at least imaging eyes of a target illuminated by the illumination light from an illumination apparatus 1003. The illumination control unit 1002 controls the illumination apparatus 1003 based on an overlap state between the iris area and the reflection area.

Depending on the overlap state between the iris area and the reflection area in the eye image 1004, target's authentication accuracy using the iris of target caught in the eye image 1004 may deteriorate. Because, the reflection area may hide at least a part of the iris area. However, the illumination control apparatus 1000 of the first example embodiment is capable of controlling the illumination apparatus 1003 based on the overlap state of the iris area and the reflection area. Therefore, the illumination control apparatus 1000 can reduce effects which the overlap between the iris area and the reflection area in the eye image 1004 has on the authentication accuracy. Accordingly, the authentication system using such an illumination control apparatus 1000 can reduce the effects caused by the overlap between the iris area and the reflection area in the eye image 1004, at the moment when the target is authenticated using the iris of the target. That is, the authentication system using the illumination control apparatus 1000 can authenticate the target with higher accuracy using the iris of the target, compared to an authentication system without the illumination control apparatus 1000.

(2) Second Example Embodiment

Figure 2:
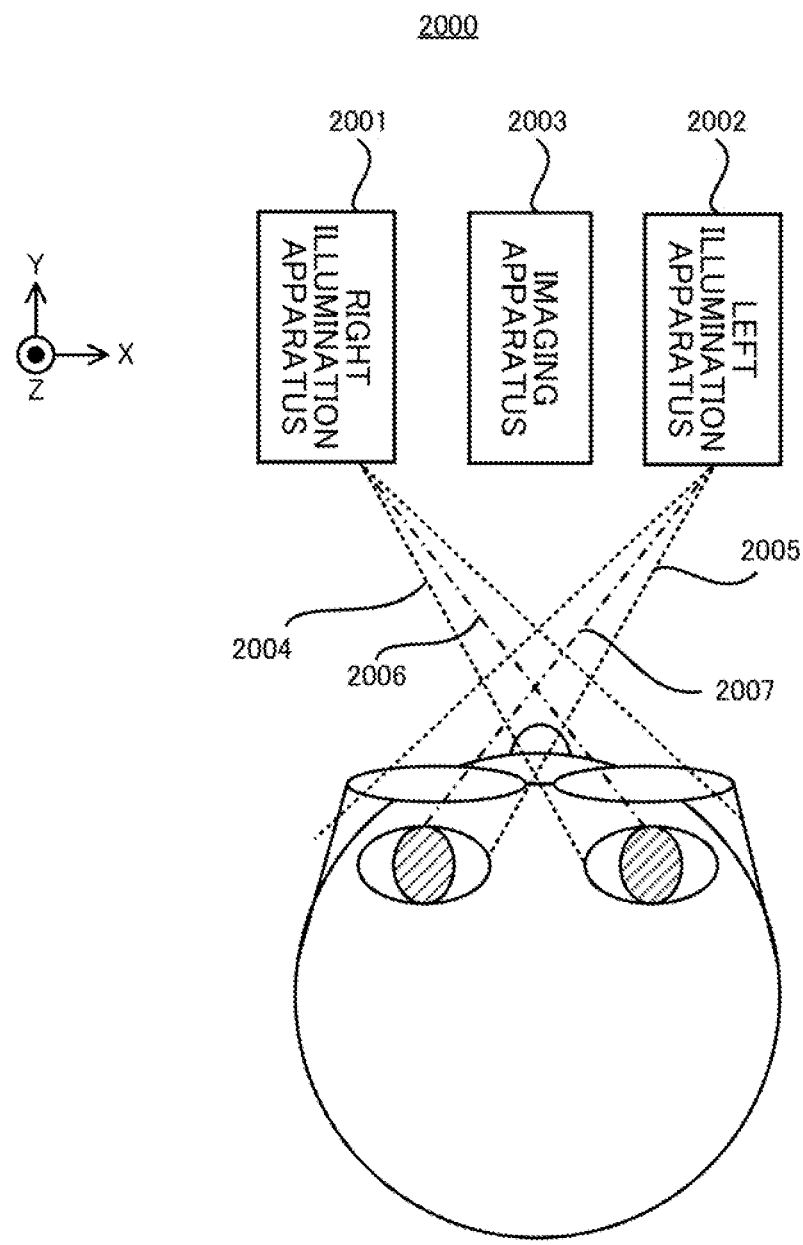
FIG. 2 is a block diagram showing a configuration of an imaging system according to the second example embodiment.

Subsequently, a second example embodiment with respect to the illumination control apparatus, the illumination control method, the recording medium, and the imaging system will be described. Hereinafter, with reference to FIG. 2, the imaging system in the second example embodiment will be explained using the imaging system 2000 to which the imaging system in the second example embodiment is applied. FIG. 2 is a block diagram showing the configuration of the imaging system 2000 in the second example embodiment.

As shown in FIG. 2, the imaging system 2000 includes a right illumination apparatus 2001, a left illumination apparatus 2002, and an imaging apparatus 2003. The right illumination apparatus 2001 emits right illumination light 2004 which is capable of illuminating at least the right eye of target (in the example embodiment shown in FIG. 2, a person). The left illumination apparatus 2002 emits left illumination light 2005 which is capable of illuminating at least the left eye of target. The imaging apparatus 2003 images the right eye illuminated by the right illumination light 2004 and the left eye illuminated by the left illumination light 2005.

In the second example embodiment, in particular, the right illumination apparatus 2001 is arranged on the left side of the imaging apparatus 2003 viewed from the front of the imaging apparatus 2003 (in the example shown in FIG. 2, −X side). Furthermore, the left illumination apparatus 2002 is arranged on the right side of the imaging apparatus 2003 viewed from the front of the imaging apparatus 2003 (in the example embodiment shown in FIG. 2, +X side).

Furthermore, at the timing when the imaging apparatus 2003 images right and left eyes, an optical axis 2006 of the right illumination apparatus 2001 (e.g., the optical axis of the optical system such as a lens provided in the right illumination apparatus 2001) and the optical axis 2007 of the left illumination apparatus 2002 (e.g., the optical axis of the optical system such as a lens provided in the left illumination apparatus 2002) intersect each other at a position between the imaging apparatus 2003 and the target.

The right illumination apparatus 2001 may be located in the imaging apparatus 2003. The right illumination apparatus 2001 may be located differently from the imaging apparatus 2003. The right illumination apparatus 2001 may be integrated with the imaging apparatus 2003. The right illumination apparatus 2001 may be independently located from the imaging apparatus 2003. The left illumination apparatus 2002 may be located in the imaging apparatus 2003. The left illumination apparatus 2002 may be located differently from the imaging apparatus 2003. The left illumination apparatus 2002 may be integrated with the imaging apparatus 2003. Alternatively, the left illumination apparatus 2002 may be independently located from the imaging apparatus 2003.

In a case that a gate apparatus through which the target can pass is located, at least one of the right illumination apparatus 2001 and the left illumination apparatus 2002 may be located in the gate apparatus. In a case that a gate apparatus through which target can pass is located, the imaging apparatus 2003 may image the target passing through the gate apparatus.

Here, if the target is wearing glasses, it could occur in the eye image generated by the imaging apparatus that the reflection area corresponding to the reflected image of the illumination light (e.g., at least one of the right illumination light, the left illumination light, and the other illumination lights) may overlap the iris area corresponding to the iris of eyes (e.g., at least one of the right eye and the left eye). The possibility that such iris area and reflection area overlap each other increases as the angle of incidence of the illumination light with respect to the lens of the glasses covering the eyes decreases.

In the second example embodiment, the right illumination apparatus 2001 is arranged on the left side of the imaging apparatus 2003, and also, the optical axis 2006 of the right illumination apparatus 2001 and the optical axis 2007 of the left illumination apparatus 2002 intersect each other at a position between the imaging apparatus 2003 and the target. Consequently, as compared to the case where the right illumination apparatus 2001 is arranged on the right side of the imaging apparatus 2003 and/or where the optical axis 2006 does not intersect the optical axis 2007, the angle of incidence of the right illumination light 2004 with respect to the right lens of the glasses covering the right eye is increased. As a result of that, in the eye image which the imaging apparatus has generated by imaging the right eye illuminated with the right illumination right, there is decreased a possibility that the reflection area corresponding to the reflected image of the right illumination light overlaps the iris area corresponding to the iris of the right eye.

Similarly, in the second example embodiment, the left illumination apparatus 2002 is arranged on the right side of the imaging apparatus 2003, and also, the optical axis 2006 of the right illumination apparatus 2001 and the optical axis 2007 of the left illumination apparatus 2002 intersect each other at a position between the imaging apparatus 2003 and the target. Consequently, as compared to the case where the left illumination apparatus 2002 is arranged on the left side of the imaging apparatus 2003 and/or where the optical axis 2007 does not intersect the optical axis 2006, the angle of incidence of the left illumination light 2005 with respect to the left lens of the glasses covering the left eye is increased. As a result of that, in the eye image which the imaging apparatus has generated by imaging the left eye illuminated with the left illumination right, there is decreased a possibility that the reflection area corresponding to the reflected image of the left illumination light overlaps the iris area corresponding to the iris of the left eye.

Therefore, the imaging system 2000 can reduce the effect that the overlap between the iris area and the reflection area in the eye image has on the authentication accuracy. Therefore, the authentication system using the imaging system 2000 can reduce the effect of overlap between the iris area and the reflection area in the eye image at the moment of authenticating the target using the iris of the target. That is, the authentication system using the imaging system 2000 can authenticate the target with higher accuracy using the iris of the target compared to an authentication system without the imaging system 2000.

(3) Third Example Embodiment

Subsequently, a third example embodiment with respect to the illumination control apparatus, the illumination control method, the recording medium, and the imaging system will be described. Hereinafter, the illumination control apparatus, the illumination control method, the recording medium, and the imaging system according to the third example embodiment will be described using an authentication system SYSa where the illumination control apparatus, the illumination control method, the recording medium, and the imaging system according to the second example embodiment are applied.

(3-1) Entire Configuration of Authentication System SYSa

Figure 3:
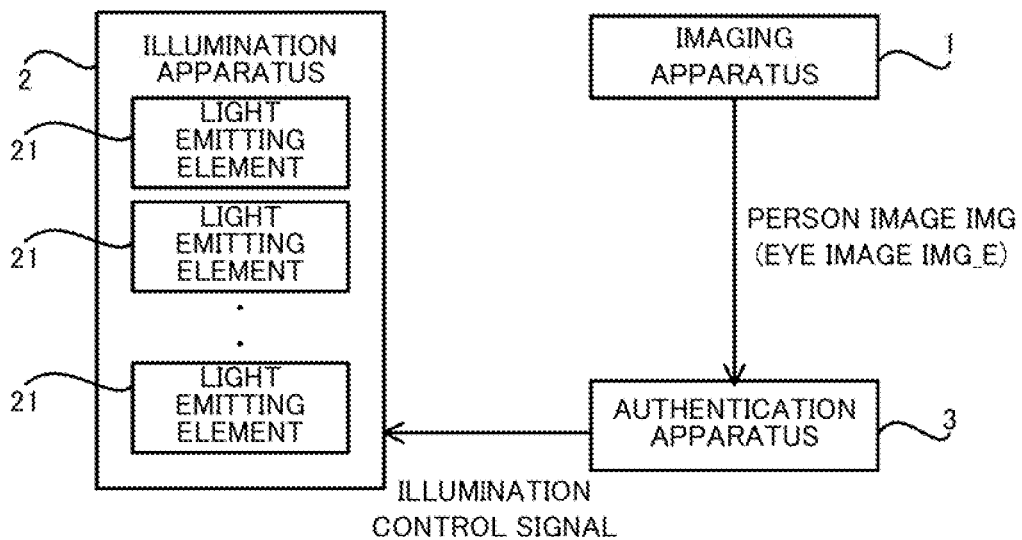
FIG. 3 is a block diagram showing an entire configuration of an authentication system according to the third example embodiment.

First, an entire configuration of the authentication system SYSa according to the third example embodiment will be described with reference to FIG. 3. FIG. 3 is a block diagram illustrating the entire configuration of the authentication system SYSa according to the third example embodiment.

As shown in FIG. 3, the authentication system SYSa includes an imaging apparatus 1, an illumination apparatus 2, and an authentication apparatus 3.

The imaging apparatus 1 is capable of imaging at least a part of the target. The target may include, for example, a person. The target may include animals that differ from humans (e.g., mammals such as dogs and cats, birds such as sparrows, reptiles such as snakes, amphibians such as frogs, and fish such as goldfish). The target may include an inanimate object. The inanimate object may include a robot that mimics a person or an animal. In the following explanation, an example where the target is a person (hereinafter, this target is referred to as a "target person") will be described.

The imaging apparatus 1 is capable of generating a person image IMG in which at least a part of the target person has been captured by imaging at least a part of the target person. In the third example embodiment, an exemplary embodiment will be described in which the imaging apparatus 1 is capable of imaging the eyes (in particular, the eyes including the iris) of the target person P to generate as the person image IMG, an eye image IMG_E where the eyes (in particular, the eyes including the iris) of the target person have been captured.

The illumination apparatus 2 is capable of emitting illumination light IL. The illumination apparatus 2 illuminates the target person (particularly the eyes) with the illumination light IL emitted when the imaging apparatus 1 images the target person. In the third example embodiment, the illumination apparatus 2 can change the illumination mode of the illumination light IL with respect to the eyes of target person. In the following description, there will be described an example where the illumination apparatus 2 includes a plurality of light emitting elements 21 each capable of emitting the illumination light IL in order to change the illumination mode of the illumination light IL to the eyes of target person. The light emitting elements 21 is a specific example of a "light emitting unit" in the supplementary notes to be described later. In this case, as will be described in detail later, the illumination apparatus 2 may change the illumination mode of the illumination light IL to the eyes of target person by changing at least one of the number and the position of the light emitting elements 21 for emitting the illumination light IL. The illumination apparatus 2 may change the illumination mode of the illumination light IL to the eyes of target person by changing the angle (in other words, the direction) at which the light emitting element 21 emits the illumination light IL. The illumination apparatus 2 may change the illumination mode of the illumination light IL to the eyes of target person by changing the intensity of the illumination light IL emitted by the light emitting element 21.

When the illumination mode of the illumination light IL to the eyes of target person changes, the state of a reflection image of the illumination light IL (that is, reflected light corresponding to the illumination light IL reflected by the eyes of target person) captured in the eye image IMG_E changes. Therefore, as will be described in detail later, the illumination apparatus 2 may be considered to change the status of the reflection image of the illumination light IL captured in the eye image IMG_E, by changing at least one of the number of light emitting elements 21 for emitting the illumination light IL, the position of the light emitting element 21 for emitting the illumination light IL, the angle at which the light emitting element 21 emits the illumination light IL, and the intensity of the illumination light IL that the light emitting element 21 emits.

The authentication apparatus 3 acquires the eye image IMG_E from the imaging apparatus 1 and uses the eye image IMG_E to perform an authentication operation for authenticating the target person. In the third example embodiment, the authentication apparatus 3 performs the authentication operation for authenticating the target person using the pattern of the iris of eyes of the target person captured in the eye image IMG_E. That is, the authentication apparatus 3 performs the authentication operation related to the iris authentication. Specifically, the authentication apparatus 3 determines whether or not the target person captured in the acquired eye image IMG_E is the same as a person pre-registered (hereinafter referred to as the "registered person") based on the pattern of the iris captured in the eye image IMG_E acquired. In a case that it is determined that target person captured in the eye image IMG_E is the same as the registered person, it is determined that authentication of the target person is successful. On the other hand, in a case that it is determined that the target person captured in the eye image IMG_E is not the same as the registered person, it is determined that authentication of the target person is failed.

(3-2) Configuration of Authentication Apparatus 3

Figure 4:
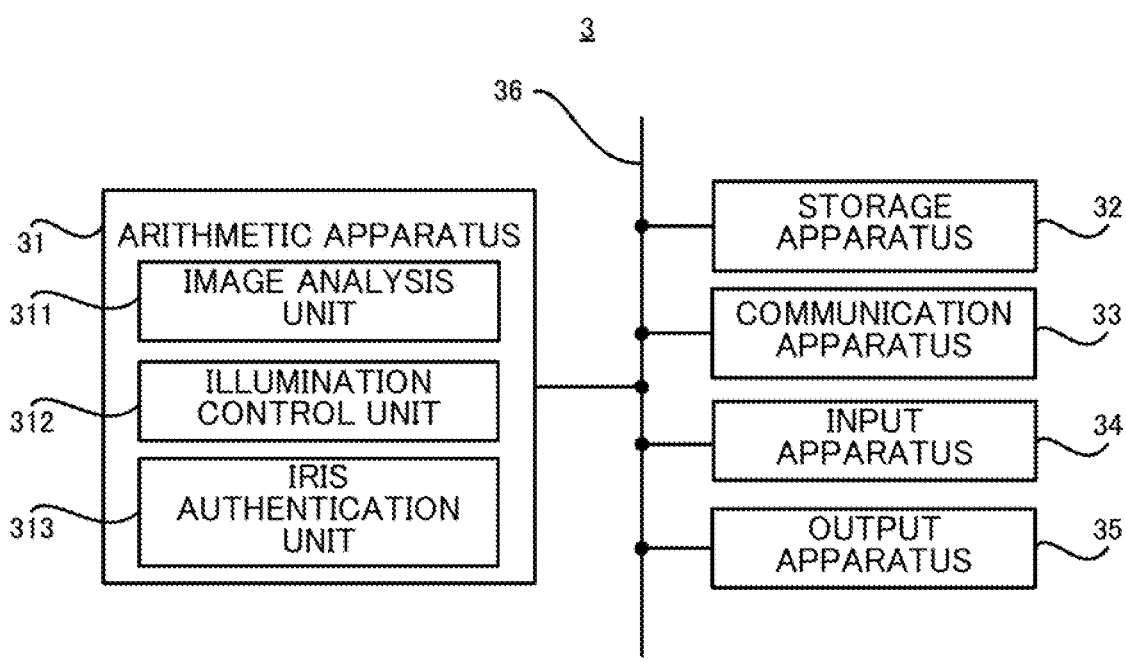
FIG. 4 is a block diagram showing a configuration of an authentication apparatus in the third example embodiment.

Subsequently, referring to FIG. 4, the configuration of the authentication apparatus 3 will be described. FIG. 4 is a block diagram showing the configuration of the authentication apparatus 3.

As shown in FIG. 4, the authentication apparatus 3 includes an arithmetic apparatus 31, a storage apparatus 32, and a communication apparatus 33. Further, the authentication apparatus 3 may include an input apparatus 34 and an output apparatus 35. However, the authentication apparatus 3 may not include at least one of the input apparatus 34 and the output apparatus 35. The arithmetic apparatus 31, the storage apparatus 32, the communication apparatus 33, the input apparatus 34, and the output apparatus 35 may be connected via a data bus 36.

The arithmetic apparatus 31 includes, for example, at least one of a CPU (Central Processing Unit), GPUs (Graphics Processing Unit), FPGA (Field Programmable Gate Array), DSPs (Demand-Side Platform) and ASIC (Application Specific Integrated Circuit). The arithmetic apparatus 31 reads a computer program. For example, the arithmetic apparatus 31 may read a computer program stored in the storage apparatus 32. For example, the arithmetic apparatus 31 may read a computer program stored in a computer-readable and non-temporary recording medium using a recording medium reading apparatus (not illustrated) provided in the authentication apparatus 3. The arithmetic apparatus 31 may acquire (i.e., may download or read) a computer program from an apparatus (not illustrated) arranged outside the authentication apparatus 3 via a communication apparatus 33 (or another communication apparatus). The arithmetic apparatus 31 implements the loaded computer program. As a result of that, in the arithmetic apparatus 31, realized are logical functional blocks for executing operation to be performed by the authentication apparatus 3 (e.g., the authentication operation described above). That is, the arithmetic apparatus 31 is capable of functioning as a controller for realizing the logical functional blocks for implementing operation (in other words, processes) to be performed by the authentication apparatus 3.

FIG. 4 shows an example of logical functional blocks implemented in the arithmetic apparatus 31 to perform the authentication operation. As shown in FIG. 4, there are realized in the arithmetic apparatus 31: an image analysis unit 311 which is a specific example of a "detection unit" in the supplementary notes to be described later; an illumination control unit 312 which is a specific example of an "illumination control unit" in the supplementary notes to be described later; and an iris authentication unit 313.

Each operation of the image analysis unit 311, the illumination control unit 312 and the iris authentication unit 313 will be described in detail with reference to FIG. 5 and the like later. Here, the outline of them will be briefly described. The image analysis unit 311 analyzes the eye image IMG_E generated by the imaging apparatus 1. Specifically, the image analysis unit 311 detects the iris area IA (see FIG. 6, described later) corresponding to the iris of the target person in the eye image IMG_E. Furthermore, the image analysis unit 311 detects, in the eye image IMG_E, the reflection area RA (see FIG. 6, described later) corresponding to the reflection image of the illumination light IL. The illumination control unit 312 controls the illumination apparatus 2 based on the analysis of eye image IMG_E by the image analysis unit 311. Specifically, the illumination control unit 312 controls the illumination apparatus 2 based on the overlap state between the reflection area RA and the iris area IA detected by the image analysis unit 311. The iris authentication unit 313 will authenticate the target person based on the eye image IMG_E.

The storage apparatus 32 is capable of storing desired data. For example, the storage apparatus 32 may temporarily store computer programs implemented by the arithmetic apparatus 31. The storage apparatus 32 may temporarily store data which is temporarily used by the arithmetic apparatus 31 while a computer program is being implemented by the arithmetic apparatus 31. The storage apparatus 32 may store data that the authentication apparatus 3 stores in a long term. The storage apparatus 32 may include at least one of a RAM (Random Access Memory), a ROM (Read Only Memory), a hard disk apparatus, a magnetic-optical disk apparatus, an SSD (Solid State Drive), and a disk array apparatus. That is, the storage apparatus 32 may include a non-temporary recording medium.

The communication apparatus 33 can communicate with an apparatus external to the authentication apparatus 3 via a communication network (not shown). For example, the communication apparatus 33 may be capable of receiving (i.e., acquiring) a person image IMG (specifically, the eye image IMG_E) from the imaging apparatus 1. For example, the communication apparatus 33 may be capable of transmitting an illumination control signal to the illumination apparatus 2 for controlling the illumination apparatus 2.

The input apparatus 34 is an apparatus that accepts the input of information to the authentication apparatus 3 from the outside of the authentication apparatus 3. For example, the input apparatus 34 may include an operation apparatus (e.g., at least one of a keyboard, a mouse, and a touch panel) that an operator of the authentication apparatus 3 can operate. For example, the input apparatus 34 may include a readable apparatus that is capable of reading information recorded as data on a recording medium that can be externally attached to the authentication apparatus 3.

The output apparatus 35 is an apparatus for outputting information to the outside of the authentication apparatus 3. For example, the output apparatus 35 may output the information as an image. In other words, the output apparatus 35 may include a display apparatus (so-called display) capable of displaying an image representing the information to be output. For example, the output apparatus 35 may output the information as audio. That is, the output apparatus 35 may include an audio apparatus (so-called a speaker) capable of outputting audio. For example, the output apparatus 35 may output information on a paper. That is, the output apparatus 35 may include a print apparatus (so-called printer) capable of printing the desired information on the paper.

(3-3) Authentication Operation Performed by Authentication Apparatus 3

Subsequently, referring to FIG. 5, the authentication operation performed by the authentication apparatus 3 will be described. FIG. 5 is a flowchart showing a flow of the authentication operation performed by the authentication apparatus 3.

Figure 5:
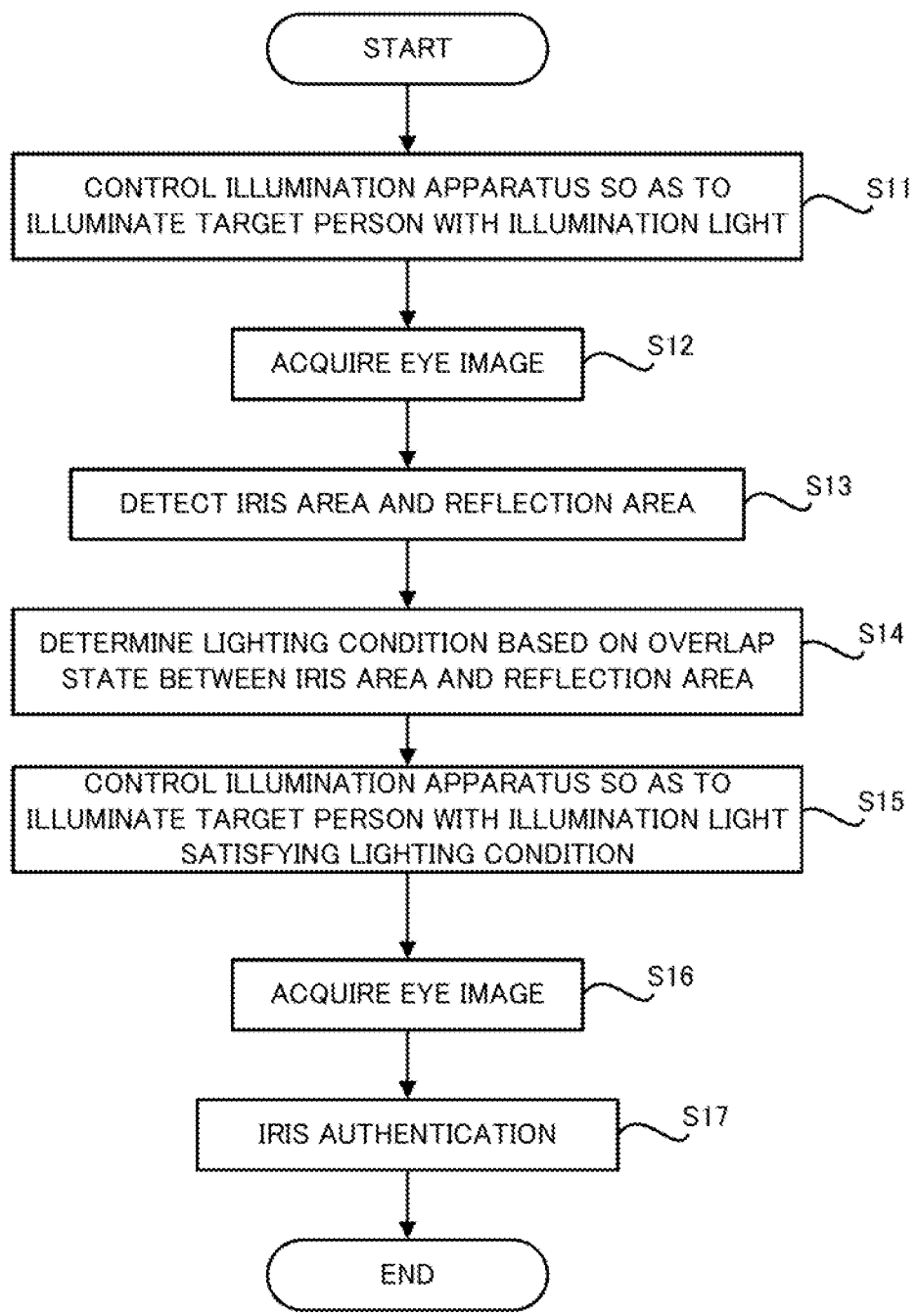
FIG. 5 is a flowchart showing a flow of authentication operation performed by the authentication apparatus according to the third example embodiment.

As shown in FIG. 5, the illumination control unit 312 controls the illumination apparatus 2 so as to illuminate the eyes of target person with the illumination light IL (step S11). In particular, in step S11, the illumination control unit 312 may control the illumination apparatus 2 based on the default lighting condition so as to illuminate the eyes of target person with the illumination light IL according to the default lighting condition. As an example, a lighting condition that "all of the plurality of light emitting elements 21 provided in the illumination apparatus 2 emit the illumination light IL" may be used as the default lighting condition. In this instance, the illumination control unit 312 may control the illumination apparatus 2 so that all of the plurality of light emitting elements 21 included in the illumination apparatus 2 emit the illumination light IL. As another example, an lighting condition in which "a part of the plurality of light emitting elements 21 provided in the illumination apparatus 2 emit the illumination light IL while the other part of the plurality of light emitting elements 21 provided in the illumination apparatus 2 do not emit the illumination light IL" may be used as the default lighting condition. In this instance, the illumination control unit 312 may control the illumination apparatus 2 so that a part of the plurality of light emitting elements 21 provided in the illumination apparatus 2 emit the illumination light IL and the other part of the plurality of light emitting elements 21 provided in the illumination apparatus 2 do not emit the illumination light IL.

Then, the imaging apparatus 1 images the eyes of target person. Consequently, the imaging apparatus 1 generates the eye image IMG_E. When the imaging apparatus 1 generates eye image IMG_E, the image analysis unit 311 receives (i.e., acquires) the eye image IMG_E from the imaging apparatus 1, using the communication apparatus 33 (step S12).

Thereafter, in Step S13, the image analysis unit 311 detects the iris area IA corresponding to the iris of target person and the reflection area RA corresponding to the reflection image of the illumination light IL in the eye image IMG_E acquired in step S12 (step S13). An example of the iris area IA and the reflection area RA detected in the eye image IMG_E is shown in FIG. 6.

Figure 6:
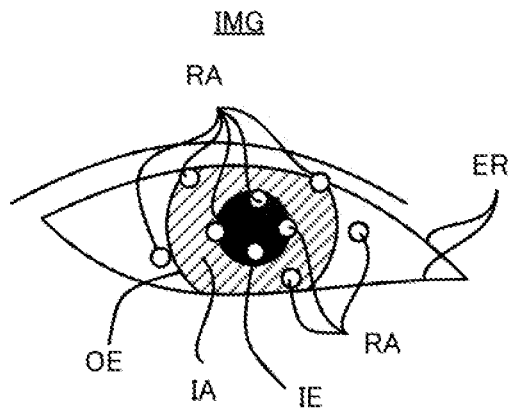
FIG. 6 shows an example of an iris area and a reflection area detected in an eye image.

As shown in FIG. 6, the iris area IA may include at least an annular (in other words, doughnut-shaped) area surrounded by the outer edge of the iris (i.e., the outer contour) OE and the inner edge of the iris (i.e., the inner contour) IE. For this reason, the image analysis unit 311 may detect the iris area IA by detecting from the eye image IMG_E, a feature point with respect to the outer edge OE of the iris and a feature point with respect to the inner edge IE of the iris. The outer edge of the pupil may be used as the inner edge IE of the iris. In addition, as shown in FIG. 6, a part of the iris is sometimes hidden by the eyelid. In this case, the image analysis unit 311 may detect the edge ER of the eyelid from the eye image IMG_E, and, based on the edge ER of the detected eyelid, the image analysis unit 311 may remove an area part hidden by the eyelid from the annular iris area IA.

In this case, the iris area IA may be an area surrounded by the outer edge OE of the iris, the inner edge IE of the iris, and the edge ER of the eyelid.

On the other hand, the reflection area RA is an area in which the reflection image of the illumination light IL emitted by the light emitting device 21 is reflected. The characteristics of the reflection area RA differ greatly from those of area except the reflection area RA in the eye image IMG_E. Therefore, the image analysis unit 311 may detect the reflection area RA based on the characteristics of the eye image IMG_E. For example, generally, the brightness (i.e., lightness) of the reflection area RA is higher than that of area except the reflection area RA in the eye image IMG_E. Therefore, the image analysis unit 311 may detect the reflection area RA based on the brightness of the eye image IMG_E. For example, the image analysis unit 311 may detect a set of pixels whose brightness exceeds a predetermined threshold as the reflection area RA. For example, the image analysis unit 311 may detect as the reflection area RA, a set of pixels having higher brightness than the surrounding pixels have.

The reflection image of the illumination light IL may include an image formed by the reflected light of the illumination light IL having been reflected on at least a part of the eyes of the target person. For example, the reflection image of the illumination light IL may include an image formed by the reflected light of the illumination light IL having been reflected on at least one of the cornea and the eyelid. The reflection image of the illumination light IL may include an image formed by the reflected light of the illumination light IL having been reflected on at least a part of eyeglasses the target person is wearing. The reflection image of the illumination light IL may include an image formed by the reflected light of the illumination light IL having been reflected on at least at a part of the contact lens the target person is wearing.

In the third example embodiment, since the illumination apparatus 2 includes a plurality of light emitting elements 21 as described above, the eyes of the target person are illuminated by a plurality of illumination lights IL emitted by the plurality of light emitting elements 21 respectively. Therefore, the eye image IMG_E would include a plurality of reflection images corresponding to the plurality of illumination lights IL respectively. Therefore, the image analysis unit 311 may detect a plurality of reflection areas RA corresponding to the plurality of illumination lights IL respectively.

When the illumination apparatus 2 includes a plurality of light emitting elements 21, the plurality of light emitting elements 21 may emit the plurality of illumination lights IL respectively so that the size of the plurality of reflection area RA is reduced. For example, as shown in FIG. 6, the plurality of light emitting elements 21 may emit the plurality of illumination lights IL respectively such that each reflection area RA forms a relatively small-size dot pattern. To reduce the size of the reflection area RA, the light emitting element 21 may emit the illumination light IL so that the spot diameter of the illumination light IL at the illuminated surface (e.g., the surface of eyes, eyeglasses, or contact lenses) to which the illumination light IL is illuminated is relatively small.

Again, in FIG. 5, the illumination control unit 312 then controls the illumination apparatus 2 based on the iris area IA detected in step S13 and the reflection area RA detected in step S13 (steps S14 through S15). Specifically, the illumination control unit 312 controls the illumination apparatus 2 based on the overlap state between the iris area IA and the reflection area RA.

To control the illumination apparatus 2, the illumination control unit 312 determines the lighting condition, which determines the operation state of the illumination apparatus 2, based on the overlap state between the iris area IA and the reflection area RA (step S14). The lighting condition may include, for example, a condition related to the number of light emitting elements 21 emitting the illumination light IL. In this case, the illumination control unit 312 may determine the number of light emitting elements 21 for emitting the illumination light IL based on the overlap state between the iris area IA and the reflection area RA. The lighting condition may include, for example, a condition related to the position of the light emitting element 21 emitting the illumination light IL. In this case, the illumination control unit 312 may determine the position of the light emitting elements 21 for emitting the illumination light IL based on the overlap state between the iris area IA and the reflection area RA. In other words, the illumination control unit 312 may determine (in this case, select) at least one light emitting element 21 for emitting the illumination light IL from the plurality of light emitting elements 21 based on the overlap state between the iris area IA and the reflection area RA. The lighting condition may include, for example, a condition regarding the angle at which the light emitting element 21 emits the illumination light IL. In this case, the illumination control unit 312 may determine the angle at which the light emitting element 21 emits the illumination light IL based on the overlap state between the iris area IA and the reflection area RA. The lighting condition may include, for example, a condition related to the intensity of the illumination light IL emitted by the light emitting element 21. In this case, the illumination control unit 312 may determine the intensity of the illumination light IL emitted by the light emitting element 21 based on the overlap state between the iris area IA and the reflection area RA.

When the operation state of the illumination apparatus 2 changes, there is a possibility that the illumination mode of the illumination light IL changes. For this reason, the lighting condition may be considered to determine the illumination mode of the illumination light IL emitted by the illumination apparatus 2.

Here, when at least one reflection area RA is at least partially overlapped with the iris area IA as shown in FIG. 6, the pattern image of the iris is not captured at a portion where at least one reflection area RA overlaps within the iris area IA. For this reason, the iris authentication unit 313, which will be described later, cannot extract feature values related to the pattern of the iris from the portion where the at least reflection area RA overlaps within the iris area IA. Consequently, there is a possibility that the authentication accuracy of the target person by the iris authentication unit 313 described later would be deteriorated.

Therefore, in the third example embodiment, the illumination control unit 312 may determine the lighting condition based on the overlap state between the iris area IA and the reflection area RA so as to reduce the impact that the overlap of the iris area IA and the reflection area RA has on the authentication accuracy of the target person provided by the iris authentication unit 313. For example, the illumination control unit 312 may determine the lighting condition so that the deterioration amount of authentication accuracy of the target person by the iris authentication unit 313 is reduced, the deterioration being caused by the overlap between the iris area IA and the reflection area RA. For example, the illumination control unit 312 may determine the lighting condition so that the authentication accuracy of the target person by the iris authentication unit 313 does not deteriorate due to the overlap between the iris area IA and the reflection area RA.

As an example method of determining the lighting condition, in a case the dimension of an overlap area where the iris area IA and the reflection area RA overlap each other is large (for example, larger than a predetermined dimension threshold), the illumination control unit 312 may determine the lighting condition (in particular, the lighting condition with respect to the number of light emitting elements 21 for emitting the illumination light IL) so that the number of light emitting elements 21 for emitting the illumination light IL is reduced. In this case, since the dimension of the overlap area where the iris area IA and the reflection area RA overlap each other gets smaller, there is reduced the impact of the overlap between the iris area IA and the reflection area RA on the authentication accuracy of the target person provided by the iris authentication unit 313.

As another example method of determining the lighting condition, in a case there is a large number of reflection areas RA overlapping with the iris area IA (e.g., more than a predetermined number threshold), the illumination control unit 312 may determine the lighting condition (in particular, the lighting condition with respect to the number of light emitting elements 21 for emitting the illumination light IL) so as to reduce the number of light emitting elements 21 for emitting the illumination light IL. In this case, since the number of reflection areas RA overlap the iris area IA decreases, the impact of the overlap between the iris area IA and the reflection area RA on the authentication accuracy of the target person provided by the iris authentication unit 313, is reduced.

As a further example method of determining the lighting condition, in a case the brightness of the reflection area RA overlapping with the iris area IA is high (e.g., higher than a predetermined brightness threshold), the illumination control unit 312 may determine the lighting condition (in particular, the lighting condition with respect to the number of the light emitting elements 21 for emitting the illumination light IL) so as to reduce the number of the light emitting elements 21 for emitting the illumination light IL. In this case, since the number of reflection areas RA overlapping the iris area IA decreases, the impact of the overlap between the iris area IA and the reflection area RA on the authentication accuracy of the target person provided by the iris authentication unit 313, is reduced.

As a further example method of determining the lighting condition, in a case that the dimension of an overlap area where the iris area IA and the reflection area RA overlap each other is large, the illumination control unit 312 may determine the lighting condition (in particular, the lighting condition with respect to the position of the light emitting element 21 for emitting the illumination light IL) so that the position of the light emitting element 21 for illuminating the iris with the illumination light IL changes. In this case, the illumination control unit 312 may change the position of the light emitting element 21 for illuminating the iris with the illumination light IL so that the dimension of the overlap area where the iris area IA and the reflection area RA overlap each other gets smaller. Consequently, since the dimension of the overlap area between the iris area IA and the reflection area RA gets smaller, the impact of the overlap between the iris area IA and the reflection area RA on the authentication accuracy of the target person provided by the iris authentication unit 313, is reduced.

As a further example method of determining the lighting condition, in a case where there is a large number of reflection areas RA overlapping with the iris area IA, the illumination control unit 312 may determine the lighting condition (in particular, the lighting condition with respect to the position of the light emitting element 21 for emitting the illumination light IL) so that the position of the light emitting element 21 for illuminating the iris with the illumination light IL changes. In this case, the illumination control unit 312 may change the position of the light emitting element 21 for illuminating the iris with the illumination light IL so that the number of the reflection areas RA overlapping the iris area IA decreases. Consequently, since the dimension of the overlap area between the iris area IA and the reflection area RA gets smaller, the impact of the overlap between the iris area IA and the reflection area RA on the authentication accuracy of the target person provided by the iris authentication unit 313, is reduced.

As a further example method of determining the lighting condition, in a case that the brightness of the reflection area RA overlapping with the iris area IA is high, the illumination control unit 312 may determine the lighting condition (in particular, the lighting condition with respect to the position of the light emitting element 21 for emitting the illumination light IL) so as to change the position of the light emitting element 21 for illuminating the iris with the illumination light IL. In this case, the illumination control unit 312 may change the position of the light emitting element 21 for illuminating the iris with the illumination light IL so that the brightness of the reflection area RA overlapping the iris area IA gets lower. The higher the brightness of the reflection area RA is, the more likely the reflection area RA is in an over-exposure state in the eye image IMG_E. For this reason, the higher the brightness of the reflection area RA is, the less likely the feature values related to the pattern of the iris are extracted from at least one part of the iris area IA, where the reflection area RA overlaps. Conversely, the lower the brightness of the reflection area RA is, the more likely the feature values related to the pattern of the iris are extracted from at least one part of the iris area IA, where the reflection area RA overlaps. Typically, the illumination control unit 312 may change the position of the light emitting element 21 for illuminating the iris with the illumination light IL so that the reflection area RA disappears by lowering the brightness of the reflection area RA overlapping the iris area IA. Consequently, since the dimension of the overlap area between the iris area IA and the reflection area RA gets smaller, the impact of the overlap between the iris area IA and the reflection area RA on the authentication accuracy of the target person provided by the iris authentication unit 313, is reduced.

As a further example method of determining the lighting condition, in a case that the dimension of an overlap area where the iris area IA and the reflection area RA overlap each other is large, the illumination control unit 312 may determine the lighting condition (in particular, the lighting condition with respect to an angle at which the light emitting element 21 emits the illumination light IL) so that the angle at which the light emitting element 21 emits the illumination light IL changes, the light emitting element 21 emitting the illumination light IL for illuminating the eyes of the target person. In this case, the illumination control unit 312 may change the angle at which the light emitting element 21 emits the illumination light IL so that the dimension of the overlap area where the iris area IA and the reflection area RA overlap each other gets smaller. Consequently, since the dimension of the overlap area between the iris area IA and the reflection area RA gets smaller, the impact of the overlap between the iris area IA and the reflection area RA on the authentication accuracy of the target person provided by the iris authentication unit 313, is reduced.

As a further example method of determining the lighting condition, in a case that the number of the reflection areas RA overlapping the iris area IA is large, the illumination control unit 312 may determine the lighting condition (in particular, the lighting condition with respect to an angle at which the light emitting element 21 emits the illumination light IL) so that the angle at which the light emitting element 21 emits the illumination light IL changes, the light emitting element 21 emitting the illumination light IL for illuminating the eyes of the target person. In this case, the illumination control unit 312 may change the angle at which the light emitting element 21 emits the illumination light IL so that the number of reflection areas RA overlapping the iris area IA decreases. Consequently, since the number of reflection areas RA overlapping the iris area IA decreases, the impact of the overlap between the iris area IA and the reflection area RA on the authentication accuracy of the target person provided by the iris authentication unit 313, is reduced.

As a further example method of determining the lighting condition, in a case the brightness of the reflection area RA overlapping with the iris area IA is high, the illumination control unit 312 may determine the lighting condition (in particular, the lighting condition with respect to an angle at which the light emitting element 21 emits the illumination light IL) so that the angle at which the light emitting element 21 emits the illumination light IL changes, the light emitting element 21 emitting the illumination light IL for illuminating the eyes of the target person. In this case, the illumination control unit 312 may change the angle at which the light emitting element 21 emits the illumination light IL so that the brightness of the reflection area RA overlapping the iris area IA gets lower. Consequently, since the dimension of the overlap area between the iris area IA and the reflection area RA gets smaller, the impact of the overlap between the iris area IA and the reflection area RA on the authentication accuracy of the target person provided by the iris authentication unit 313, is reduced.

As a further example method of determining the lighting condition, in a case that the dimension of an overlap area where the iris area IA and the reflection area RA overlap each other is large, the illumination control unit 312 may determine the lighting condition (in particular, the lighting condition with respect to an intensity of the illumination light IL the light emitting element 21 emits) so that the intensity of the illumination light IL illuminating the eyes of the target person changes. In this case, the illumination control unit 312 may change the intensity of the illumination light IL to be emitted by the light emitting element 21 so that the dimension of the overlap area where the iris area IA and the reflection area RA overlap each other gets smaller. For example, the illumination control unit 312 may change the intensity of the illumination light IL to be emitted by the light emitting element 21 so that the intensity of the illumination light IL illuminating the eyes (in particular, the iris) of the target person gets lower. As a result, as compared with the case where the intensity of the illumination light IL remains high, the reflection image is less likely to be formed. Therefore, since the dimension of the overlap area where the iris area IA and the reflection area RA overlap each other gets smaller, the impact of the overlap between the iris area IA and the reflection area RA on the authentication accuracy of the target person provided by the iris authentication unit 313, is reduced.

As a further example of a method of determining the lighting condition, in a case that the number of reflection areas RA overlapping the iris area IA is large, the illumination control unit 312 may determine the lighting condition (in particular, the lighting condition with respect to an intensity of the illumination light IL the light emitting element 21 emits) so that the intensity of the illumination light IL illuminating the eyes of the target person changes. In this case, the illumination control unit 312 may change the intensity of the illumination light IL to be emitted by the light emitting element 21 so that the number of reflection areas RA overlapping with the iris area IA decreases. For example, the illumination control unit 312 may change the intensity of the illumination light IL to be emitted by the light emitting element 21 so that the intensity of the illumination light IL illuminating the eyes (in particular, the iris) of the target person gets lower. As a result, as compared with the case where the intensity of the illumination light IL remains high, the reflection image is less likely to be formed. Therefore, since the number of reflection areas RA overlapping the iris area IA decreases, the impact of the overlap between the iris area IA and the reflection area RA on the authentication accuracy of the target person provided by the iris authentication unit 313, is reduced.

As a further example method of determining the lighting condition, in a case that the brightness of the reflection area RA overlapping with the iris area IA is high, the illumination control unit 312 may determine the lighting condition (in particular, the lighting condition with respect to an intensity of the illumination light IL the light emitting element 21 emits) so that the intensity of the illumination light IL illuminating the eyes of the target person changes. In this case, the illumination control unit 312 may change the intensity of the illumination light IL to be emitted by the light emitting element 21 so that the brightness of the reflection area RA overlapping the iris area IA gets lower. Consequently, since the dimension of the overlap area between the iris area IA and the reflection area RA gets smaller, the impact of the overlap between the iris area IA and the reflection area RA on the authentication accuracy of the target person provided by the iris authentication unit 313, is reduced.

As further example method of determining the lighting condition, for example, the illumination control unit 312 may determine the lighting condition so that the dimension of an overlap area where the iris area IA and the reflection area RA overlap each other gets smaller, as compared to a case that all of the plurality of light emitting elements 21 provided to the illumination apparatus 2 emit the illumination light IL (or, a case that the default lighting condition is applied; the same applies hereinafter). For example, in a case that the dimension of the overlap area where the iris area IA and the reflection area RA overlap is large, the illumination control unit 312 may determine the lighting condition so that the dimension of the overlap area where the iris area IA and the reflection area RA overlap gets smaller, as compared to the case that all of the plurality of light emitting elements 21 provided to the illumination apparatus 2 emit the illumination light IL. For example, in a case that the number of reflection areas RA overlapping the iris area IA is large, the illumination control unit 312 may determine the lighting condition so that, the number of reflection areas RA overlapping the iris area IA decreases (as a result, the dimension of the overlap area where the iris area IA and the reflection area RA overlap gets smaller), as compared to the case that all of the plurality of light emitting elements 21 provided to the illumination apparatus 2 emit the illumination light IL. For example, in a case that the brightness of the reflection area RA overlapping the iris area IA is high, the illumination control unit 312 may determine the lighting condition so that the brightness of the reflection area RA overlapping the iris area IA gets lower (as a result, the dimension of the overlap area where the iris area IA and the reflection area RA overlap gets smaller), as compared to the case that all of the plurality of light emitting elements 21 provided to the illumination apparatus 2 emit the illumination light IL.

Figure 7:
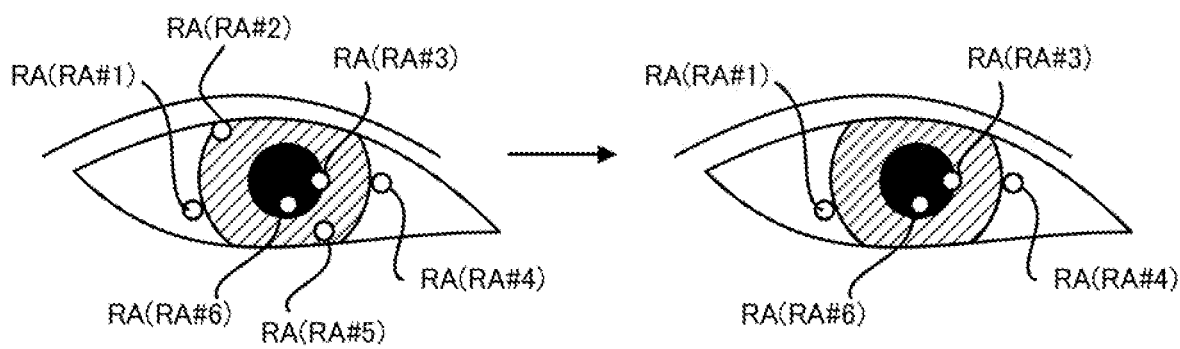
FIG. 7 shows an example of an iris area and a reflection area detected in an eye image.
Figure 8A:
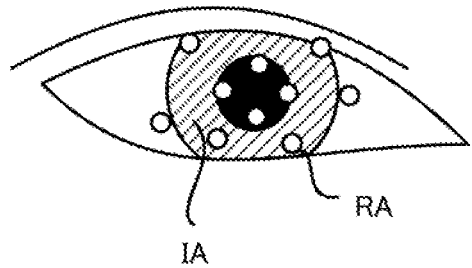
FIG. 8A shows an example of an iris area and a reflection area detected in an eye image and FIG. 8B shows an example of an iris area and a reflection area detected in an eye image.
Figure 8B:
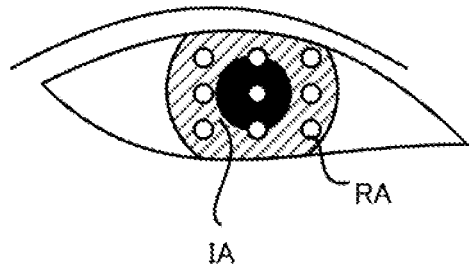

Here, as an example of the method of determining the lighting condition so that the dimension of the overlap area where the iris area IA and the reflection area RA overlap each other gets smaller, the description will be given, with reference to FIG. 7, of an example that the lighting condition is determined so that the number of reflection areas RA overlapping the iris area IA decreases as compared to the case where all of the plurality of light emitting elements 21 emit the illumination light IL. The left-hand figure in FIG. 7 shows the reflection areas RA detected in the case that all of the plurality of light emitting elements 21 emit illumination light IL. The right-hand figure in FIG. 7 shows the reflection areas RA detected in the case where the lighting condition is applied, the lighting condition having been determined so that the number of reflection areas RA overlapping the iris area IA decreases.

FIG. 7 shows an example where, within six reflection areas RA #1 to RA #6, three reflection areas RA #2, RA #3, and RA #5 each overlap the iris area IA when all of the plurality of light emitting elements 21 emit the illumination light IL. In this case, the illumination control unit 312 may determine the lighting condition so that less than three reflection areas RA overlap the iris area IA. FIG. 7 shows an example where the lighting condition has been determined so that only one reflection area RA #3 within the six reflection areas RA #1 to RA #6 overlaps the iris area IA. In other words, FIG. 7 shows an example where the lighting condition has been determined so that the two reflection areas RA #2 and RA #5 within the three reflection areas RA #2, RA #3 and RA #5 which overlapped the iris area IA when all of the plurality of light emitting elements 21 emitted the illumination light IL, no longer overlap the iris area IA. In this case, the more the number of reflection areas RA overlapping the iris area IA decreases, the smaller the dimension of the overlap area where the iris area IA and the reflection area RA overlap each other gets smaller.

Alternatively, for example, the illumination control unit 312 may determine the lighting condition so that the reflection area RA overlapping the iris area IA disappears (i.e., the number of reflection areas RA overlapping the iris area IA is reduced up to zero). In the example shown in FIG. 7, the illumination control unit 312 may determine the lighting condition so that all of the three reflection areas RA #2, RA #3 and RA #5 which overlapped the iris area IA in the case all of the plurality of light emitting elements 21 emitted the illumination light IL, no longer overlap the iris area IA.

In order to realize a state that one reflection area RA which overlapped the iris area IA no longer overlaps the iris area IA, the illumination control unit 312 may determine the lighting condition so that one illumination light IL forming the one reflection area RA is not illuminated toward the target person. Specifically, since a plurality of reflection areas RA correspond to a plurality of illumination lights IL respectively as described above, the illumination control unit 312 can specify one light emitting element 21 that emits one illumination light IL forming one reflection area RA. In this case, the illumination control unit 312 may generate the lighting condition "one light emitting element 21 that forms one reflection area RA that has overlapped the iris area IA does not emit one illumination light IL". In the example shown in FIG. 7, the illumination control unit 312 may generate as the lighting condition, the condition that "two light emitting elements 21 corresponding to the two reflection areas RA #2 and RA #5 respectively, do not emit the illumination light IL".

In the case that the lighting condition "all of the plurality of light emitting elements 21 provided to the illumination apparatus 2 emit the illumination light IL" is applied as the default lighting condition, all of the plurality of reflection areas RA that the illumination apparatus 2 could form are likely to be captured in the eye image IMG_E. Thus, in this case, the illumination control unit 312 can appropriately determine the lighting condition so that the number of reflection areas RA overlapping the iris area IA decreases. On the other hand, in the case that the lighting condition "a part of the plurality of light emitting elements 21 provided to the illumination apparatus 2 emit the illumination light IL (the other part of the plurality of light emitting elements 21 do not emit the illumination light IL)" is applied as the default lighting condition, there is some possibility that while a part of reflection areas RA the illumination apparatus 2 could form are captured in the eye image IMG_E, the other part of the reflection areas RA the illumination apparatus 2 could form are not captured in the eye image IMG_E. Consequently, only detecting the reflections areas RA actually captured in the eye image IMG_E would be insufficient for the illumination control unit 312 to determine the lighting condition so that the number of reflection areas RA overlapping the iris area IA decreases. Because, the illumination control unit 312 is not capable of determining, only by detecting the reflection areas RA actually captured in the eye image IMG_E, the lighting condition in consideration of the reflection areas RA the illumination apparatus 2 could form, but not captured in the eye image IMG_E. Therefore, the illumination control unit 312 may estimate, based on the positions of the reflection areas RA detected in the eye image IMG_E (i.e., a part of reflection areas RA the illumination apparatus 2 could form), the positions of the reflection areas RA that has not been detected in the eye image IMG_E (i.e., the other part of the reflection areas RA the illumination apparatus 2 could form). For example, the illumination control unit 312 may estimate the position of the reflection area RA not detected in the eye image IMG_E, based on: the positional relationship between the plurality of light emitting elements 21; the positional relationship between the plurality of light emitting elements 21 and the target person (typically, the positional relationship between the plurality of light emitting elements 21 and the position where the target person exists when the imaging apparatus 1 images the target person); and the positions of the reflection areas RA detected in the eye image IMG_E. After that, the illumination control unit 312 may determine the lighting condition based on the actual detection result of the positions of the reflection areas RA detected in the eye image IMG_E and the estimation result of the positions of the reflection areas RA not detected in the eye image IMG_E. Consequently, the illumination control unit 312 is capable of determining the lighting condition in consideration of all of the plurality of reflection areas RA the illumination apparatus 2 could form, even if a part of the plurality of reflection areas RA that the illumination apparatus 2 could form are not captured in the eye image IMG_E.

As further example method of determining the lighting condition, for example, the illumination control unit 312 may determine the lighting condition so that a plurality of reflection areas RA are distributed in a particular distribution pattern in the eye image IMG_E. For example, the illumination control unit 312 may determine the lighting condition so that the plurality of reflection areas RA are distributed in the eye image IMG_E in a particular distribution pattern in a case that the dimension of the overlap area where the iris area IA and the reflection area RA overlap each other is large. For example, the illumination control unit 312 may determine the lighting condition so that the plurality of reflection areas RA are distributed in the eye image IMG_E in a particular distribution pattern in the case that the number of reflection areas RA overlapping the iris area IA is large. For example, the illumination control unit 312 may determine the lighting condition so that the plurality of reflection areas RA are distributed in a particular distribution pattern in the eye image IMG_E in the case that the brightness of the reflection area RA overlapping the iris area IA is high.

For example, as shown in FIG. 78A, the illumination control unit 312 may determine the lighting condition so that the plurality of reflection areas RA are distributed in a random distribution pattern within the eye image IMG_E. That is, the illumination control unit 312 may determine the lighting condition so that the plurality of reflection areas RA are randomly distributed in the eye image IMG_E. In other words, the illumination control unit 312 may determine the lighting condition so that the plurality of reflection areas RA form a random noise pattern (e.g., a dot pattern) in the eye image IMG_E.

Alternatively, for example, as shown in FIG. 7B, the illumination control unit 312 may determine the lighting condition so that the plurality of reflection areas RA are distributed at regular intervals in the eye image IMG_E. That is, the illumination control unit 312 may determine the lighting condition so that the plurality of reflection areas RA are distributed in a periodic distribution pattern in the eye image IMG_E. As one example, the illumination control unit 312 may determine the lighting condition so that the plurality of reflection areas RA are distributed in a two-dimensional matrix in the eye image IMG_E.

As another example method of determining the lighting condition, for example, the illumination control unit 312 may determine the lighting condition so that in a plurality of eye images IMG_E that the imaging apparatus 1 generates as time-series data, at least one of the plurality of reflection areas RA blinks at particular time intervals. For example, the brightness (i.e., the lightness) of the reflection area RA in the eye image IMG_E depends on the intensity of the illumination light IL forming the reflection area RA. Typically, the higher the intensity of the illumination light IL is, the higher the brightness of the reflection area RA formed by the illumination light IL is. For this reason, the illumination control unit 312 may determine the lighting condition so that the intensity of at least one illumination light IL forming at least one reflection area RA repeats increasing and decreasing at particular time intervals. In this case, since the brightness of the reflection area RA in the eye image IMG_E repeats increasing and decreasing at the particular time intervals, the reflection area RA could be considered to be blinking.

Again, in FIG. 5, thereafter, the illumination control unit 312 controls the illumination apparatus 2 based on the lighting condition determined in step S14 so that the eyes of the target person are illuminated with the illumination light IL according to the lighting condition determined in step S14 (step S15).

Then, the imaging apparatus 1 images the eyes of the target person. Consequently, the imaging apparatus 1 generates the eye image IMG_E. When the imaging apparatus 1 generates the eye image IMG_E, the iris authentication unit 313 receives (i.e., acquires) the eye image IMG_E from the imaging apparatus 1, using the communication apparatus 33 (step S16).

The eye image IMG_E the image analysis unit 311 acquires in step S12 described above and the eye image IMG_E the iris authentication unit 313 acquires in step S16 may be generated by different imaging apparatuses respectively.

The iris authentication unit 313 then authenticates the target person based on the eye image IMG_E acquired in step S16 (step S17). Specifically, the iris authentication unit 313 detects the iris area IA based on the eye image IMG_E. The operation in which the iris authentication unit 313 detects the iris area IA may be the same as the operation in which the image analysis unit 311 detects the iris area IA in step S13 described above. Thereafter, the iris authentication unit 313 extracts the feature values related to the pattern of the iris from the iris area IA. The iris authentication unit 313 then authenticates the target person by comparing the extracted feature values to the feature values of the iris of the registered person.

The iris authentication unit 313 may detect the reflection area RA from the eye image IMG_E and remove the detected reflection area RA from the eye image IMG_E. Here, in a case that the lighting condition is determined so that the plurality of reflection areas RA form the random noise pattern in the eye image IMG_E as described above, the plurality of reflection areas RA detected by the iris authentication unit 313 are likely to form the random noise pattern. In this case, the iris authentication unit 313 could remove the reflection areas RA corresponding to the noise relatively easily, by performing a simple processing for removing the noise (e.g., processing using the median filter). Accordingly, it is possible to reduce the processing load of the iris authentication unit 313, compared to a case that the plurality of reflection areas RA do not form the random noise pattern.

The iris authentication unit 313 may perform an interpolation processing that detects the reflection areas RA from the eye image IMG_E and interpolates the reflection areas RA detected. For example, the iris authentication unit 313 may perform the interpolation processing that interpolates the reflection areas RA using an area (e.g., the iris area IA) around the reflection areas RA. Here, when the lighting condition is determined so that the plurality of reflection areas RA are distributed at regular intervals in the eye image IMG_E as described above, the plurality of reflection areas RA detected by the iris authentication unit 313 are likely to be distributed at regular intervals. In this case, the iris authentication unit 313 is capable of interpolating the reflection areas RA relatively easily by performing the pre-existing processing for interpolating images (e.g., the demosaicing processing).

(3-4) Technical Effects of Authentication System SYSa

As described above, the authentication apparatus 3 of the third example embodiment controls the illumination apparatus 2 based on the overlap state between the iris area IA and the reflection area RA in the eye image IMG_E. Consequently, the authentication apparatus 3 can reduce the effect that the overlap between the iris area IA and the reflection area RA in the eye image IMG_E has on the authentication accuracy, compared to an authentication apparatus of the comparative example, which does not consider the condition of the overlap state between the iris area IA and the reflection area RA.

Accordingly, the authentication apparatus 3 (the authentication system SYSa) can authenticate the target person with higher accuracy, compared to the authentication apparatus of the comparative example (the authentication system of the comparative example) which does not consider the overlap state between the iris area IA and the reflection area RA. In a case that the authentication apparatus 3 controls the illumination apparatus 2, the authentication apparatus 3 may be referred to as the illumination control apparatus.

Further, the authentication apparatus 3 is capable of determining the lighting condition including at least one of the number of the light emitting elements 21 for emitting the illumination light IL and the position of the light emitting element 21 for emitting the illumination light IL, based on the overlap state between the iris area IA and the reflection area RA in the eye image IMG_E. Therefore, the illumination apparatus 2 can illuminate target person's eyes with the illumination light IL according to the light condition determined. Consequently, the authentication apparatus 3 (the authentication system SYSa) can authenticate the target person with higher accuracy, in comparison with the authentication apparatus of the comparative example (the authentication system of the comparative example) where the lighting condition is not determined based on the overlap state between the iris area IA and the reflection area RA.

Further, the authentication apparatus 3 is capable of determining the lighting condition so that the dimension of the overlap area where the iris area IA and the reflection area RA overlap each other gets smaller, the number of reflection areas RA overlapping with the iris area IA decreases, and/or the brightness of the reflection area RA overlapping with the iris area IA gets lower, in comparison with the case where all of the plurality of light emitting elements 21 provided to the illumination apparatus 2 emit the illumination light IL. Here, as described above, it is impossible for the authentication apparatus 3 to extract the feature values related to the pattern of the iris from the part of the iris area IA where at least one reflection area RA overlaps. In this case, the smaller the dimension of the overlap area between the iris area IA and the reflection area RA is, the smaller the number of reflection areas RA overlapping the iris area IA is, and/or the lower the brightness of the reflection area RA overlapping the iris area IA is; the smaller the dimension of the area within the iris area IA where the feature values related to the pattern of the iris is impossible to be extracted. For this reason, the authentication apparatus 3 can extract relatively many feature values related to the pattern of the iris. Consequently, the authentication apparatus 3 (the authentication system SYSa) can authenticate the target person with higher accuracy compared to the authentication apparatus of the comparative example (the authentication system of the comparative example) which does not consider the overlap state between the iris area IA and the reflection area RA.

Also, the authentication apparatus 3 is capable of determining the lighting condition so that a plurality of reflection areas RA form a random noise pattern in the eye image IMG_E. In this case, the authentication apparatus 3 can reduce the processing load of the removal processing that removes the reflection areas RA as noise, in comparison with a case that a plurality of reflection areas RA do not form the random noise pattern.

Also, the authentication apparatus 3 is capable of determining the lighting condition so that a plurality of reflection areas RA are distributed at regular intervals in the eye image IMG_E. In this case, the authentication apparatus 3 can reduce the processing load of the interpolation processing that interpolates the reflection areas RA, in comparison with a case that a plurality of reflection areas RA are not distributed at regular intervals.

(4) Fourth Example Embodiment

Subsequently, a fourth example embodiment with respect to the illumination control apparatus, the illumination control method, the recording medium, and the imaging system will be described. Hereinafter, the illumination control apparatus, the illumination control method, the recording medium, and the imaging system according to the fourth example embodiment will be described using an authentication system SYSb where the illumination control apparatus, the illumination control method, the recording medium, and the imaging system according to the fourth example embodiment are applied.

(4-1) Configuration of Authentication System SYSb

Figure 9:
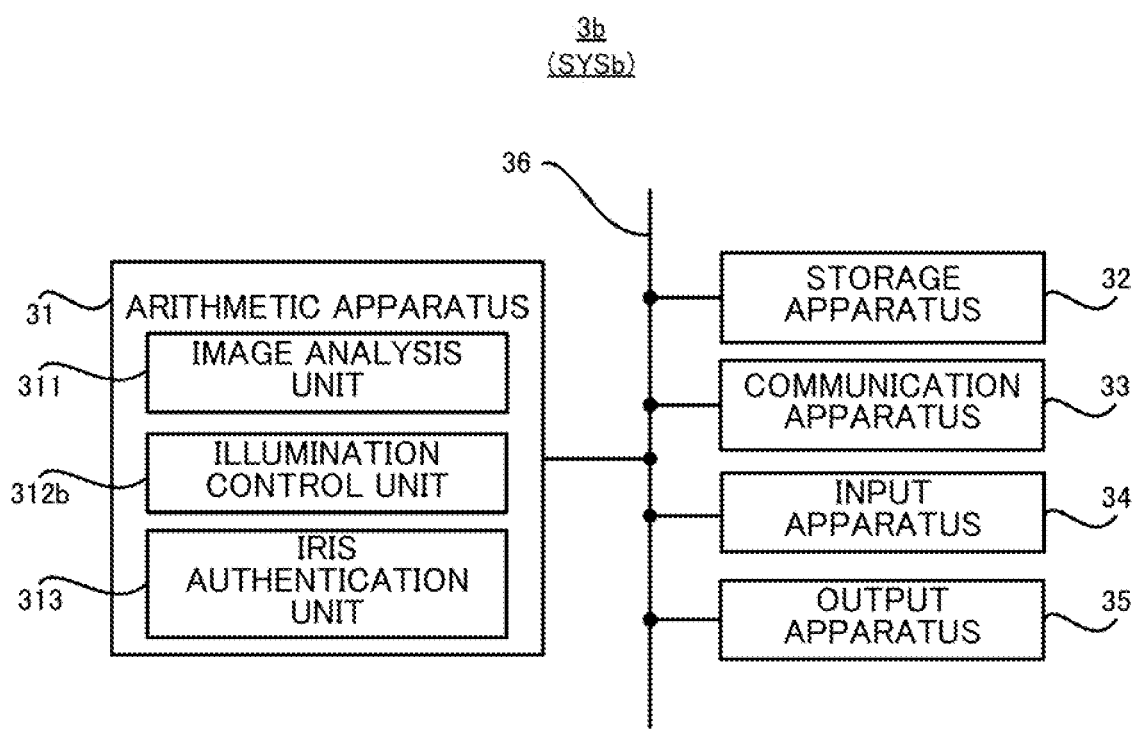
FIG. 9 is a block diagram showing a configuration of an authentication apparatus according to the fourth example embodiment.

The authentication system SYSb differs from the authentication system SYSa described above in that the authentication system SYSb includes the authentication apparatus 3b instead of the authentication apparatus 3. The other features of the authentication system SYSb may be identical to those of the authentication system SYSa. Hereinafter, referring to FIG. 9, the description will be given of the authentication apparatus 3b in the fourth example embodiment. FIG. 9 is a block diagram showing a configuration of the authentication apparatus 3b according to the fourth example embodiment. In the following description, the components already described will not be described in detail by denoting the same reference signs.

As shown in FIG. 9, the authentication apparatus 3b, as compared with the authentication apparatus 3 described above, differs in that the authentication apparatus 3b includes an illumination control unit 312b instead of the illumination control unit 312. The other features of the authentication apparatus 3b may be identical to those of the authentication apparatus 3. The illumination control unit 312b differs from the illumination control unit 312 in that an intensity condition described later is determined in addition to the lighting condition. The other features of the illumination control unit 312 b may be identical to those of the illumination control unit 312.

(4-2) Authentication Operation Performed by Authentication Apparatus 3b

Figure 10:
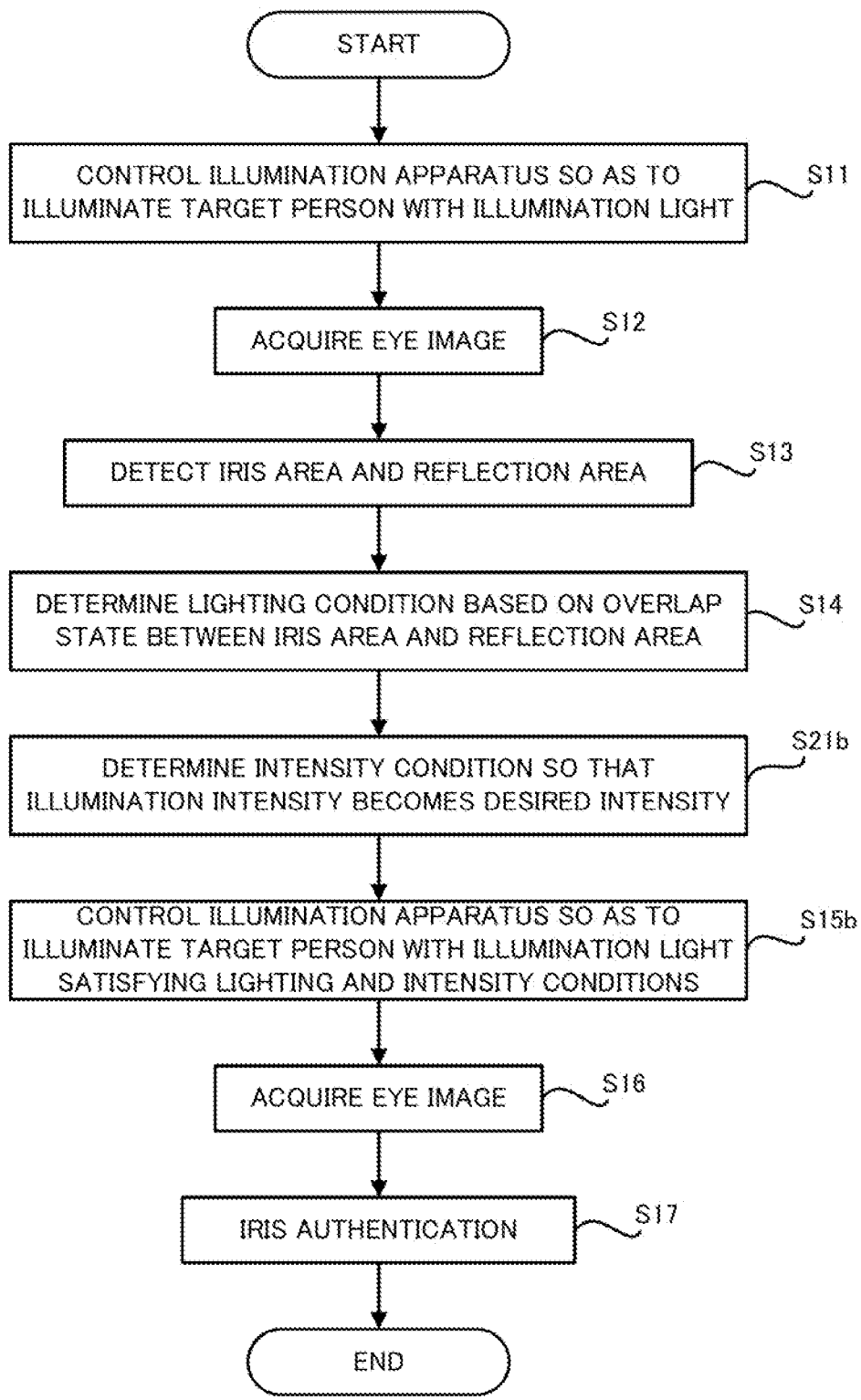
FIG. 10 is a flowchart showing a flow of authentication operation performed by the authentication apparatus according to the fourth example embodiment.

Subsequently, referring to FIG. 10, the authentication operation performed by the authentication apparatus 3b will be described. FIG. 10 is a flowchart showing a flow of the authentication operation performed by the authentication apparatus 3b. Note that to the processes already described, the same step numbers are assigned respectively, and detailed descriptions thereof will be omitted.

As shown in FIG. 10, also in the fourth example embodiment, similarly to the third example embodiment, the authentication apparatus 3b performs the processes from step S11 to step S14. That is, the illumination control unit 312b controls the illumination apparatus 2 so as to illuminate the eyes of the target person with the illumination light IL (step S11). The image analysis unit 311 receives (i.e., acquires) the eye image IMG_E from the imaging apparatus 1 (step S12). The image analysis unit 311 detects the iris area IA and the reflection area RA (step S13). The illumination control unit 312b determines the lighting condition based on the iris area IA and the reflection area RA (step S14).

Here, depending on the content of the lighting condition determined in step S14, the illumination intensity at which the illumination apparatus 2 illuminates the target person may differ from the target intensity set in terms of imaging appropriately the target person. The illumination intensity means the intensity of the entire illumination apparatus 2. For example, in a case that the illumination apparatus 2 illuminates the target person with a plurality of illumination lights IL, the illumination intensity may mean the intensity of a single light when the plurality of illumination lights IL are considered as the single light. For example, in a case that the number of light emitting elements 21 emitting the illumination light IL is reduced so that the number of reflection areas RA overlapping the iris area IA is reduced, the illumination intensity may be short of the target intensity. In this situation, the brightness of the iris area IA in the eye image IMG_E may be different from a desired brightness. Consequently, the authentication accuracy of the target person by the iris authentication unit 313 may be deteriorated, compared with a case where the brightness of the iris area IA in eye image IMG_E is the desired brightness.

Therefore, after determining the lighting condition based on the iris area IA and the reflection area RA, the illumination control unit 312b determines the intensity condition with respect to the illumination intensity so that the illumination intensity becomes the target intensity (step S21b). That is, the illumination control unit 312b determines the intensity condition so that the illumination intensity is maintained constant regardless of the difference in the lighting condition (step S21b).

The intensity condition may include, for example, conditions related to the intensity of the illumination light IL to be emitted by at least one light emitting element 21. In this case, the illumination control unit 312b may determine the intensity of the illumination light IL to be emitted by at least one light emitting element 21 so that the illumination intensity becomes the target intensity. If the intensity of the illumination light IL to be emitted by at least one light emitting element 21 is lowered, the illumination intensity is also lowered. That is, if the intensity of the illumination light IL to be emitted by the at least one light emitting element 21 is increased, the illumination intensity is also increased. The intensity condition may also include, for example, conditions related to the number of light emitting elements 21 for emitting the illumination light IL. In this case, the illumination control unit 312b may determine the number of light emitting elements 21 for emitting the illumination light IL so that the illumination intensity becomes the target intensity. If the number of light emitting elements 21 for emitting the illumination light IL is reduced, the illumination intensity is lowered. In other words, if the number of light emitting elements 21 for emitting the illumination light IL is increased, the illumination intensity is increased. The intensity condition may also include, for example, conditions related to the position of the light emitting element 21 for emitting the illumination light IL. In this case, the illumination control unit 312b may determine the position of the light emitting element 21 for emitting the illumination light IL so that the illumination intensity becomes the target intensity.

The illumination control unit 312b may determine the intensity condition so that the dimension of the overlap area where the iris area IA and the reflection area RA overlap each other gets smaller while the illumination intensity becomes the target intensity, similarly to the case of determining the lightning condition. For example, if the illumination intensity is lower than the target intensity, the illumination control unit 312b typically determines the intensity condition so that the illumination intensity gets higher. In this case, as a method of increasing the illumination intensity, there are a method of increasing the intensity of the illumination light IL to be emitted by at least one light emitting element 21, and a method of increasing the number of light emitting elements 21 for emitting the illumination light IL. However, when the number of light emitting elements 21 for emitting the illumination light IL increase, the number of reflection areas RA overlapping with the iris area IA could increase (as a result of that, the dimension of the overlap area where the iris area IA and the reflection area RA overlap each other could get larger). Therefore, as the method of increasing the illumination intensity, the illumination control unit 312b may preferentially use the method of increasing the intensity of the illumination light IL to be emitted by at least one light emitting element 21 more than the method of increasing the number of light emitting elements 21 for emitting the illumination light IL. On the other hand, for example, if the illumination intensity is higher than the target intensity, the illumination control unit 312b typically determines the intensity condition so that the illumination intensity gets lower. In this case, as a method of lowering the illumination intensity, there are a method of lowering the intensity of the illumination light IL to be emitted by at least one light emitting element 21, and a method of reducing the number of light emitting elements 21 for emitting the illumination light IL. In this situation, when the number of light emitting elements 21 for emitting the illumination light IL decreases, the number of reflection areas RA overlapping the iris area IA decreases (as a result of that, the dimension of the overlap area where the iris area IA and the reflection area RA overlap each other gets smaller). Therefore, as a method of lowering the illumination intensity, the illumination control unit 312b may preferentially use the method of reducing the number of light emitting elements 21 for emitting the illumination light IL more than the method of lowering the intensity of the illumination light IL to be emitted by at least one light emitting element 21. Consequently, the illumination control unit 312b can determine the intensity condition so that the dimension of the overlap area where the iris area IA and the reflection area RA overlap each other gets smaller while the illumination intensity becomes the target intensity.

The illumination control unit 312b, when determining at least one of the intensity condition and the lighting condition, may preferentially use the method of reducing the number of light emitting elements 21 for emitting the illumination light IL more than the method of changing the position of the light emitting element 21 for emitting the illumination light IL. Consequently, the dimension of the overlap area where the iris area IA and the reflection area RA overlap each other is likely to gets smaller. Therefore, it is possible to more appropriately reduce the impact the overlap between the iris area IA and reflection area RA in the eye image IMG_E has on the authentication accuracy.

The target intensity may be a fixed value. Alternatively, the target intensity may be a variable value. For example, the illumination control unit 312b may change the target intensity. As an example, the illumination control unit 312b may vary the target intensity based on a distance from the imaging apparatus 1 to the target person (or a distance from the illumination apparatus 2 to the target person, substantially, the position of the target person). Specifically, the longer the distance from the imaging apparatus 1 to the target person (or the distance from the illumination apparatus 2 to the target person) is, the more attenuated illumination light IL would reach the target person. For this reason, the longer the distance from the imaging apparatus 1 to the target person (or the distance from the illumination apparatus 2 to the target person) is, the relatively lower intensity illumination light IL would illuminate the target person. Therefore, the illumination control unit 312b may change the target intensity so that the longer the distance from the imaging apparatus 1 to the target person (or the distance from the illumination apparatus 2 to the target person) is, the higher the target intensity gets. As another example, the illumination control unit 312b may change the target intensity based on the moving velocity of the target person. Specifically, because the distance from the target person to the imaging apparatus 1 changes (typically shortens) according to move of the target person, the optimal target intensity could change according to the move of the target person. Therefore, the illumination control unit 312 may change the target intensity so that the target intensity is gradually lowered according to the move of the target person. Here, in a case that the target person is approaching toward the imaging apparatus 1 at a relatively fast moving velocity, the reduction speed with respect to the distance from the imaging apparatus 1 to the target person is relatively faster compared to a case that the target person is approaching toward the imaging apparatus 1 at a relatively slow moving velocity. Therefore, the illumination control unit 312b may change the target intensity so that the faster the moving velocity of the target person is, the faster the reduction speed of the target intensity gets. In other words, the illumination control unit 312b may change the target intensity so that the slower the moving velocity of the target person is, the slower the reduction speed of the target intensity gets. As another example, the illumination control unit 312b may change the target intensity based on the appearance of the target person. Specifically, the reflectance of the illumination light IL could differ depending on the color of the eyes (or the skin, etc.) of the target person. Therefore, light having relatively high intensity from the iris of one person may propagate toward the imaging apparatus, while light having relatively low intensity from the iris of another person may propagate toward the imaging apparatus. Consequently, the brightness of the iris area IA in the eye image IMG_E could vary depending on the appearance of the target person. Therefore, the illumination control unit 312b may change the target intensity so that the brightness of the iris area IA in the eye image IMG_E becomes the desired brightness regardless of the difference in the appearance of the target person.

Thereafter, in the fourth example embodiment, similarly to the third example embodiment, the illumination control unit 312b controls the illumination apparatus 2 so as to illuminate the eyes of the target person with the illumination light IL according to the lighting condition determined (step S15b). However, in step S15b, the illumination control unit 312b controls the illumination apparatus 2 so as to illuminate the eyes of the target person with the illumination light IL according to the intensity condition determined in step S21b in addition to the lighting condition determined in step S14 (step S15b). Thereafter, also in the fourth example embodiment, similarly to the third example embodiment, the authentication apparatus 3b performs the processes from step S16 to step S17. That is, the iris authentication unit 313 receives (i.e., acquires) the eye image IMG_E from the imaging apparatus 1 (step S16). The iris authentication unit 313 authenticates the target person based on the eye image IMG_E acquired (step S17).

As described above, the authentication apparatus 3b of the fourth example embodiment is capable of determining the intensity condition in addition to the lighting condition. Therefore, when the imaging apparatus 1 images the target person, the illumination intensity becomes the target intensity (that is, the illumination intensity is maintained constant) regardless of the difference in the lighting condition. Therefore, the brightness of the iris area IA in the eye image IMG_E becomes the desired brightness regardless of the difference in the lighting condition. Consequently, the authentication apparatus 3b can authenticate the target person with higher accuracy, compared to the case that the brightness of the iris area IA in the eye image IMG_E is not the desired brightness.

In particular, in the fourth example embodiment, the authentication apparatus 3b is capable of determining the intensity condition based on at least one of the position of the target person and the appearance of the target person. That is, the authentication apparatus 3b can determine the intensity condition suitable for each individual target person. Consequently, the authentication apparatus 3b can authenticate the target person with higher accuracy, compared with the case where the target person is authenticated without considering the position of the target person and the appearance of the target person.

(5) Fifth Example Embodiment

Subsequently, a fifth example embodiment with respect to the illumination control apparatus, the illumination control method, the recording medium, and the imaging system will be described. Hereinafter, the illumination control apparatus, the illumination control method, the recording medium, and the imaging system according to the fifth example embodiment will be described using an authentication system SYSc where the illumination control apparatus, the illumination control method, the recording medium, and the imaging system according to the fifth example embodiment are applied.

(5-1) Configuration of Authentication System SYSc

Figure 11:
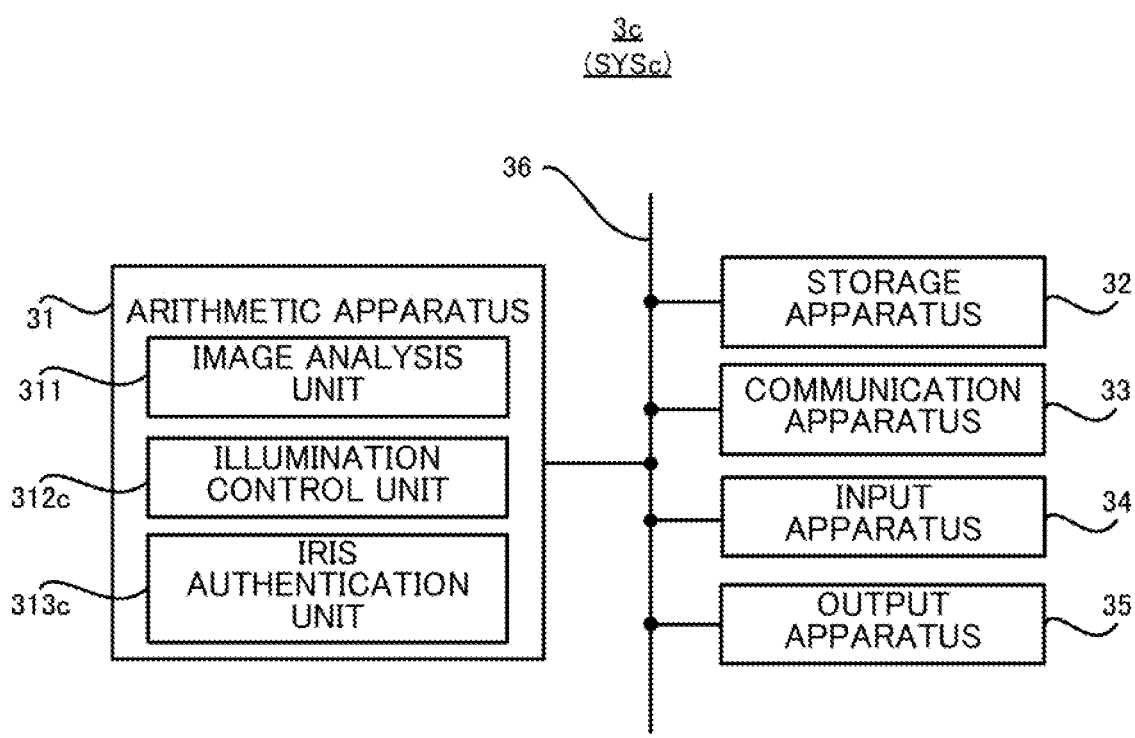
FIG. 11 is a block diagram showing a configuration of an authentication apparatus according to the fifth example embodiment.

The authentication system SYSc differs from the authentication system SYSa described above in that the authentication system SYSc includes the authentication apparatus 3c instead of the authentication apparatus 3. The other features of the authentication system SYSc may be identical to those of the authentication system SYSa. Hereinafter, referring to FIG. 11, the description will be given of the authentication apparatus 3c in the fifth example embodiment. FIG. 11 is a block diagram showing a configuration of the authentication apparatus 3c according to the fifth example embodiment As shown in FIG. 11, the authentication apparatus 3c, as compared with the authentication apparatus 3 described above, differs in that the authentication apparatus 3c includes an illumination control unit 312c and an iris authentication unit 313c instead of the illumination control unit 312 and the iris authentication unit 313. The other features of the authentication apparatus 3c may be identical to those of the authentication apparatus 3. The illumination control unit 312c differs from the illumination control unit 312 in that the illumination control unit 312c changes the lighting condition each time the imaging apparatus 1 images the target person. The other features of the illumination control unit 312 $c$ may be identical to those of the illumination control unit 312. The iris authentication unit 313$c$ differs from the iris authentication unit 313 in that the iris authentication unit 313$c$ authenticate the target person based on a plurality of eye images IMG_E. The other features of the iris authentication unit 313 $c$ may be identical to those of the iris authentication unit 313.

(5-2) Authentication Operation Performed by Authentication Apparatus 3$c$

Figure 12:
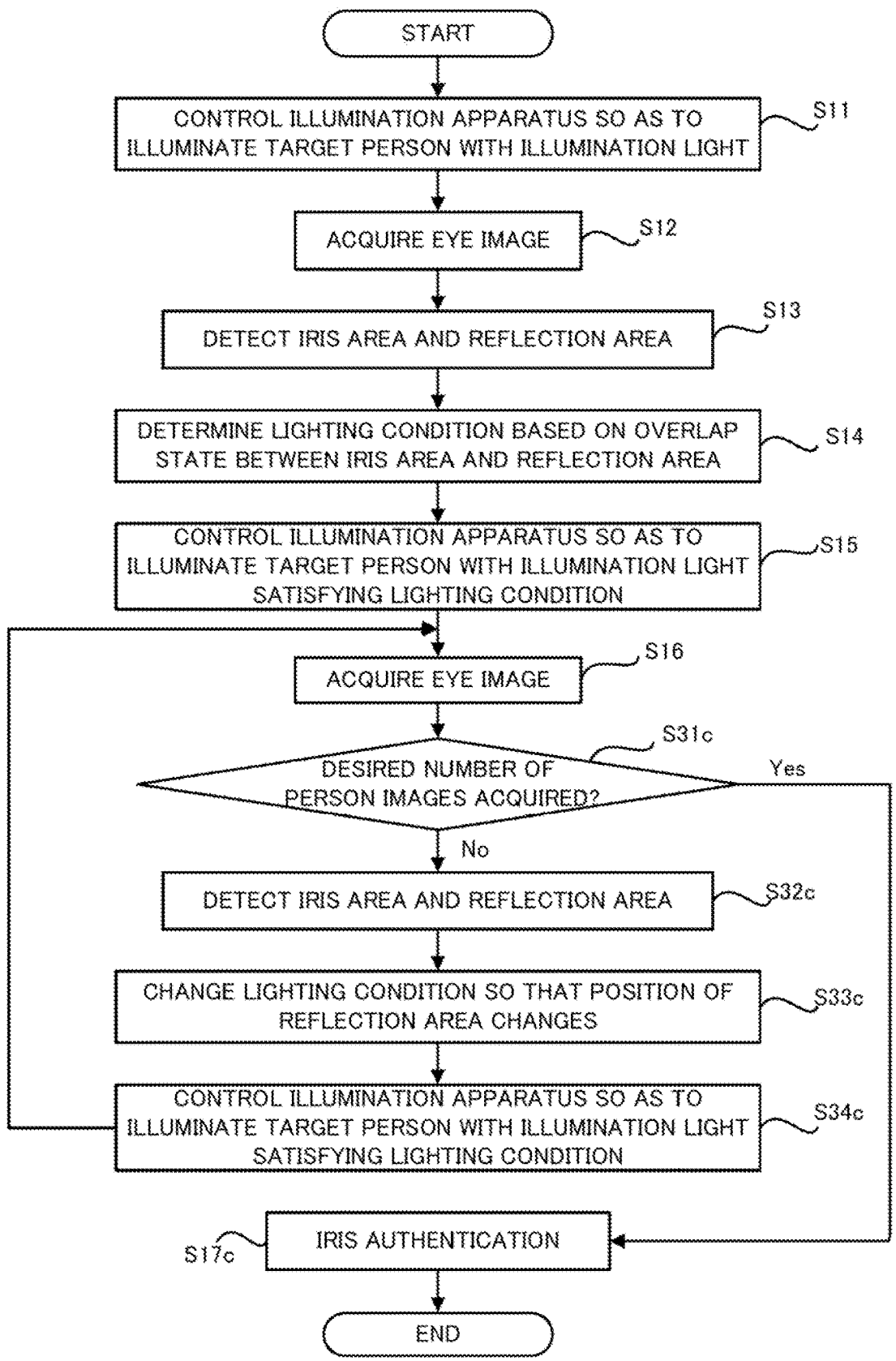
FIG. 12 is a flowchart showing a flow of authentication operation performed by authentication apparatus according to the fifth example embodiment.

Next, the authentication operation performed by the authentication apparatus 3$c$ will be described with reference to FIG. 12. FIG. 12 is a flowchart showing a flow of the authentication operation performed by the authentication apparatus 3$c$.

As shown in FIG. 12, also in the fifth example embodiment, similarly to the third example embodiment, the authentication apparatus 3$c$ performs the processes from step S11 to step S16. That is, the illumination control unit 312$c$ controls the illumination apparatus 2 so as to illuminate the eyes of the target person with the illumination light IL (step S11). The image analysis unit 311 receives (i.e., acquires) the eye image IMG_E from the imaging apparatus 1 (step S12). The image analysis unit 311 detects the iris area IA and the reflection area RA (step S13). The illumination control unit 312$c$ determines the lighting condition based on the iris area IA and the reflection area RA (step S14). The illumination control unit 312$c$ controls the illumination apparatus 2 to illuminate the eyes of the target person with the illumination light IL according to the lighting condition determined (step S15). The iris authentication unit 313$c$ receives (i.e., acquires) the eye image IMG_E from the imaging apparatus 1 (step S16).

Thereafter, the image analysis unit 311 detects the iris area IA and reflection area RA within the eye image IMG_E acquired in step S16 (step S32$c$).

Figure 13A:
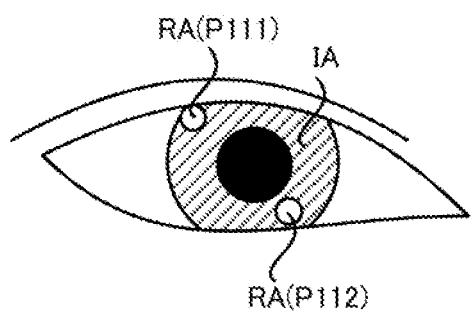
FIG. 13A shows an example of an iris area and a reflection area detected in an eye image and FIG. 13B shows an example of an iris area and a reflection area detected in an eye image.
Figure 13B:
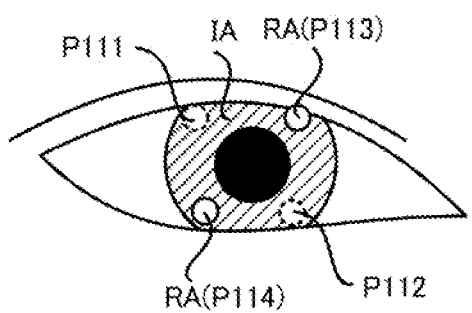

Thereafter, the illumination control unit 312$c$ changes the lighting condition based on the iris area IA detected in step S32$c$ and the reflection area RA detected in step S32$c$ so that the relative position of the reflection area RA relative to the iris area IA changes (step S33$c$). In particular, the illumination control unit 312$c$ may change the lighting condition so that the relative position, relative to the iris area IA, of the reflection area RA overlapping the iris area IA changes. For example, FIG. 13A shows an example of the iris area IA and the reflection areas RA detected in step S32$c$ in FIG. 12. In the example shown in FIG. 13A, two reflection areas RA are located in the positions P111 and P112 within the iris area IA, respectively. In this case, as shown in FIG. 13B, the illumination control unit 312$c$ may change the lighting condition so that the two reflection areas RA are positioned at positions P113 and P114 different from the positions P111 and P112 within the iris area IA, respectively.

The illumination control unit 312$c$ may change the lighting condition so that the relative position of the reflection area RA relative to the iris area IA changes by changing the lighting condition related to the position of the light emitting element 21 for emitting the illumination light IL. When the position of the light emitting element 21 for emitting the illumination light IL changes, the position of the reflection area RA in the eye image IMG_E changes. Thus, the illumination control unit 312$c$ is capable of relatively easily changing the lighting condition so that the relative position, relative to the iris area IA, of the reflection area RA changes.

Figure 14A:
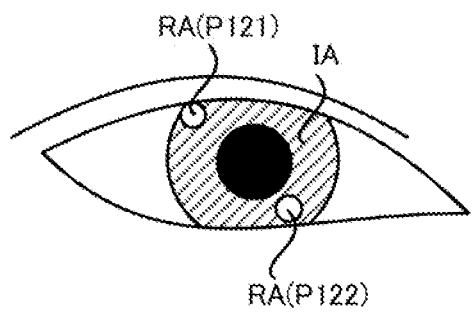
FIG. 14A shows an example of an iris area and a reflection area detected in an eye image and FIG. 14B shows an example of an iris area and a reflection area detected in an eye image.
Figure 14B:
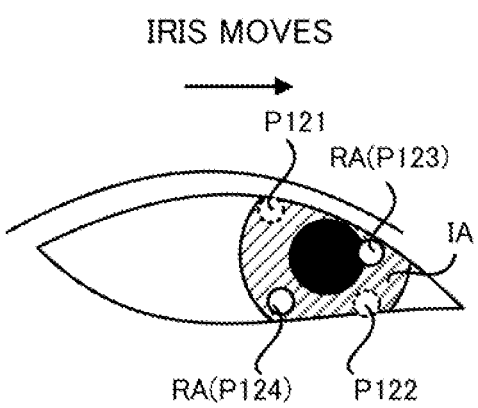

However, in a case that the eyes of the target person are moving, even if the position of the light emitting element 21 for emitting the illumination light IL has changed (that is, the position of the reflection area RA in the eye image IMG_E has changed), the relative position of the reflection area RA relative to the iris area IA may not change. This is because the position of the iris area IA could change in the eye image IMG_E according to the motion of the eyes (eyes motion) of the target person. Thus, the illumination control unit 312$c$ may predict eyes motion of the target person and change the lighting condition so that the relative position of the reflection area RA relative to the iris area IA changes according to the eyes motion predicted. In this case, the illumination control unit 312$c$ may have a function to predict the eyes motion of the target person in addition to the function to change the lighting condition. As an example of a method of predicting motion of an object, an existing method (e.g., a method using an optical flow, etc.) may be applied. For example, FIG. 14A shows an example the iris area IA and the reflection area RA detected in step S32$c$ in FIG. 12. In the example shown in FIG. 14A, two reflection areas RA are located at the positions P121 and P122 within the iris area IA, respectively. In this case, as shown in FIG. 14B, the illumination control unit 312$c$ may change the lighting condition so that the two reflection areas RA are positioned at positions P123 and P124 different from the positions P121 and P122 in the iris area IA, respectively.

Referring back to FIG. 12, after that, the illumination control unit 312$c$ then controls the illumination apparatus 2 based on the lighting condition changed in step S33$c$ to illuminate the eyes of the target person with the illumination light IL according to the lighting condition changed in step S33$c$ (step S34$c$). Thereafter, the iris authentication unit 313$c$ receives (i.e., acquires) the eye image IMG_E from the imaging apparatus 1 (step S16). Hereinafter, the processes from step S32$c$ to step S34$c$ and step S16 are repeated until the iris authentication unit 313$c$ acquires the desired number of eye images IMG_E (Step S16).

Figure 15:
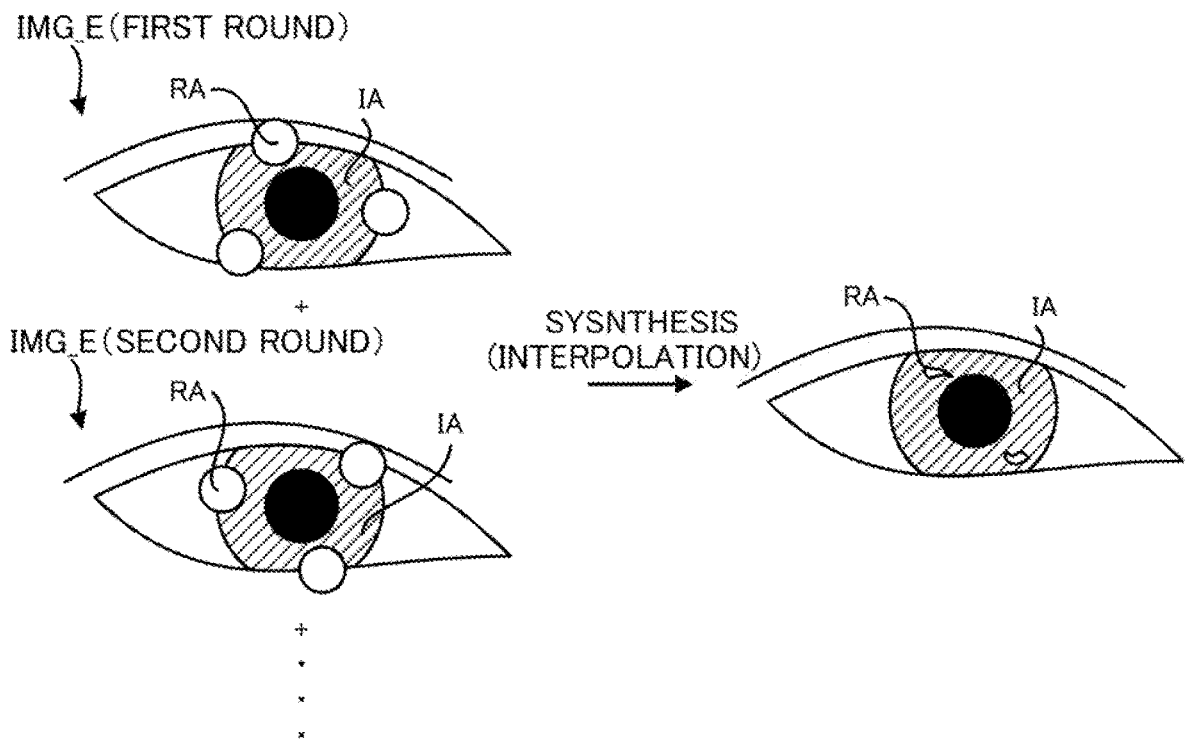
FIG. 15 schematically shows a state that a plurality of eye images are synthesized.

Thereafter, the iris authentication unit 313$c$ authenticates the target person based on the plurality of eye images IMG_E acquired in step S16 (step S17$c$). Here, on the left side of FIG. 15, an example of the plurality of eye images IMG_E acquired in step S16 is shown. As shown in FIG. 15, due to the change of the lighting condition described above, the relative positions of the reflection areas RA relative to the iris area IA in the eye image IMG_E acquired in the first round differ from the relative positions of the reflection areas RA relative to the iris area IA in the eye image IMG_E acquired in the second round. Therefore, the part of the iris area IA of the eye image IMG_E acquired in the first round where the reflection area RA overlaps can be interpolated by the part of the iris area IA of the eye image IMG_E acquired in the second round where the reflection area RA does not overlap. Thus, the iris authentication unit 313$c$ may synthesize a plurality of eye images IMG_E so that missing portions (i.e., the portions overlapped by the reflection areas RA) of the iris area IA in one eye image IMG_E are interpolated by non-missing portions (i.e., the portions not overlapped by the reflection areas RA) of the iris area in the other eye image IMG_E. As a result of that, as shown on the right side of FIG. 15, it is possible to acquire the eye image IMG_E where the missing portions of the iris area IA have been reduced. In other words, it is possible to acquire the eye image IMG_E equivalent of an image acquired by synthesizing the non-missing portions of the plurality of eye images IMG_E. The iris authentication unit 313$c$ authenticates the target person based on the eye image IMG_E where the missing portions of the iris area IA have been reduced in this manner (i.e., the eye image IMG_E corresponding to the image acquired by synthesizing the non-missing portions of the plurality of eye images IMG_E).

Figure 16:
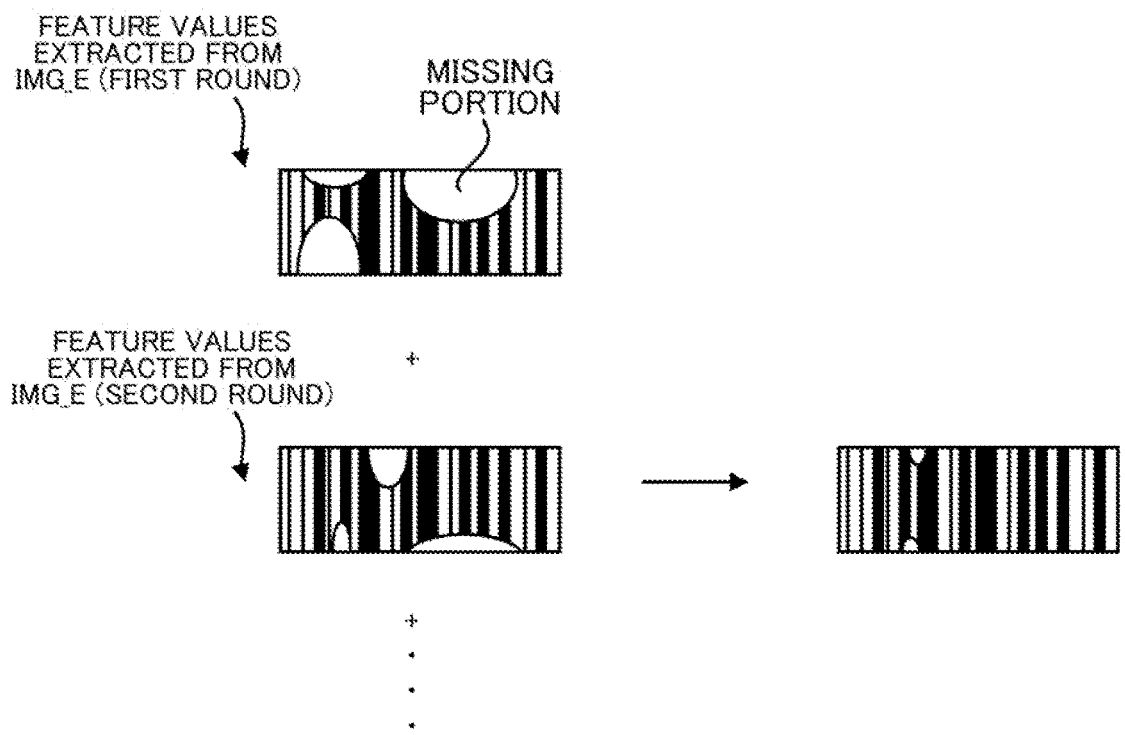
FIG. 16 schematically shows a state that a plurality of feature values extracted from the respective eye images are synthesized.

Alternatively, as shown in FIG. 16, the iris authentication unit 313c may synthesize a plurality of feature values extracted from the respective eye images IMG_E, in addition to or instead of synthesizing the eye images IMG_E. Also in this case, the iris authentication unit 313c may synthesize a plurality of feature values such that missing portions of the feature values extracted from one eye image IMG_E (i.e., the feature values that could not be extracted due to the reflection areas RA) are interpolated by the feature values extracted from another eye image IMG_E. As a result of that, as shown in the right side of FIG. 16, the feature values where missing portions thereof have been reduced are obtained. That is, it is possible to acquire the feature values which can be acquired by synthesizing a plurality of feature values extracted from the respective eye images IMG_E. The iris authentication unit 313c may authenticate the target person based on the feature quantities the missing portions of which have been reduced in this manner.

Thus, in the fifth example embodiment, the authentication apparatus 3c is capable of controlling the illumination apparatus 2 to change the lighting condition. Consequently, the illumination apparatus 2 illuminates, after illuminating the eyes of the target person with the illumination light based on one lighting condition, the eyes of the target person with the illumination light based on the other lighting condition different from the one lighting condition. Consequently, the authentication apparatus 3c can authenticate the target person using a plurality of eye images IMG_E each acquired using different lighting conditions from each other. Consequently, the authentication apparatus 3c can authenticate the target person with higher accuracy compared to the case that the target person is authenticated using a single eye image IMG_E.

Also, in the fifth example embodiment, the authentication apparatus 3c is capable of changing the lighting condition so that the relative position of the reflection area RA relative to the iris area IA changes. That is, the authentication apparatus 3c is capable of changing the lighting condition so that the relative position of the reflection area RA relative to the iris area IA changes. Therefore, as described above, the missing part of the iris area IA of one eye image IMG_E (that is, the part hidden by the reflection area RA) can be interpolated by the non-missing part of the iris area IA of the other eye image IMG_E (that is, the part not hidden by the reflection area RA). Consequently, the authentication apparatus 3c can authenticate the target person with higher accuracy compared to the case where the lighting condition is not changed so that the relative position of the reflection area RA relative to the iris area IA changes.

Further, in the fifth example embodiment, the authentication apparatus 3c is capable of authenticate the target person by using non-missing portions of the plurality of eye images IMG_E (that is, the portions where the reflection areas RA do not overlap). Therefore, substantially, the authentication apparatus 3c can authenticate the target person using the eye image IMG_E with a relatively small number of missing portions. Consequently, the authentication apparatus 3c can authenticate the target person with higher accuracy.

Further, in the fifth example embodiment, the authentication apparatus 3c predicts the eyes motion of the target person and can change the lighting condition so that the relative position of the reflection area RA relative to the iris area IA changes according to the predicted eyes motion. Consequently, even when the eyes of the target person move, the authentication apparatus 3c can change the lighting condition so that the relative position of the reflection area RA relative to the iris area IA changes.

The authentication system SYSb in the fourth example embodiment described above may employ components unique to the fifth example embodiment. The components unique to the fifth example embodiment may include the components related to the illumination control unit 312c and the iris authentication unit 313c.

(6) Sixth Example Embodiment

Subsequently, a sixth example embodiment with respect to the illumination control apparatus, the illumination control method, the recording medium, and the imaging system will be described. Hereinafter, the illumination control apparatus, the illumination control method, the recording medium, and the imaging system according to the sixth example embodiment will be described using an authentication system SYSd where the illumination control apparatus, the illumination control method, the recording medium, and the imaging system according to the sixth example embodiment are applied.

(6-1) Configuration of Authentication System SYSd

Figure 17:
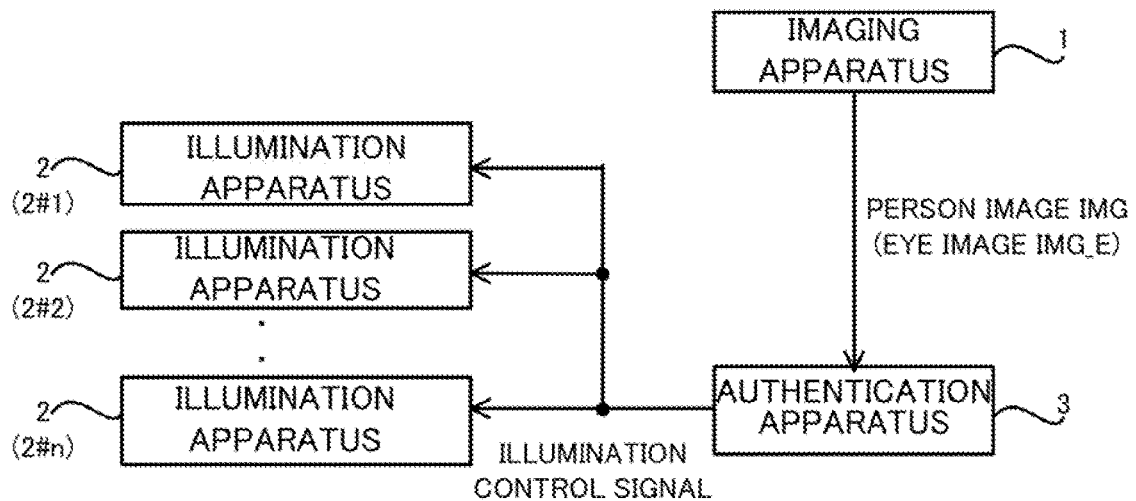
FIG. 17 is a block diagram showing an entire configuration of an authentication system according to the sixth example embodiment.

First, a configuration of the authentication system SYSd according to the sixth example embodiment will be described with reference to FIG. 17. FIG. 17 is a block diagram showing the configuration of the authentication system SYSd according to the sixth example embodiment.

As shown in FIG. 17, the authentication system SYSd differs in that the authentication system SYSd includes a plurality of illumination apparatuses 2 compared to the authentication system SYSa described above. In the example shown in FIG. 17, the authentication system SYSd includes n pieces of (where, n is a constant indicating an integer of 2 or more) illumination apparatuses 2 (specifically, the illumination apparatus 2 #1 to 2 #n). The other features of the authentication system SYSd may be identical to those of the authentication system SYSa.

Figure 18:
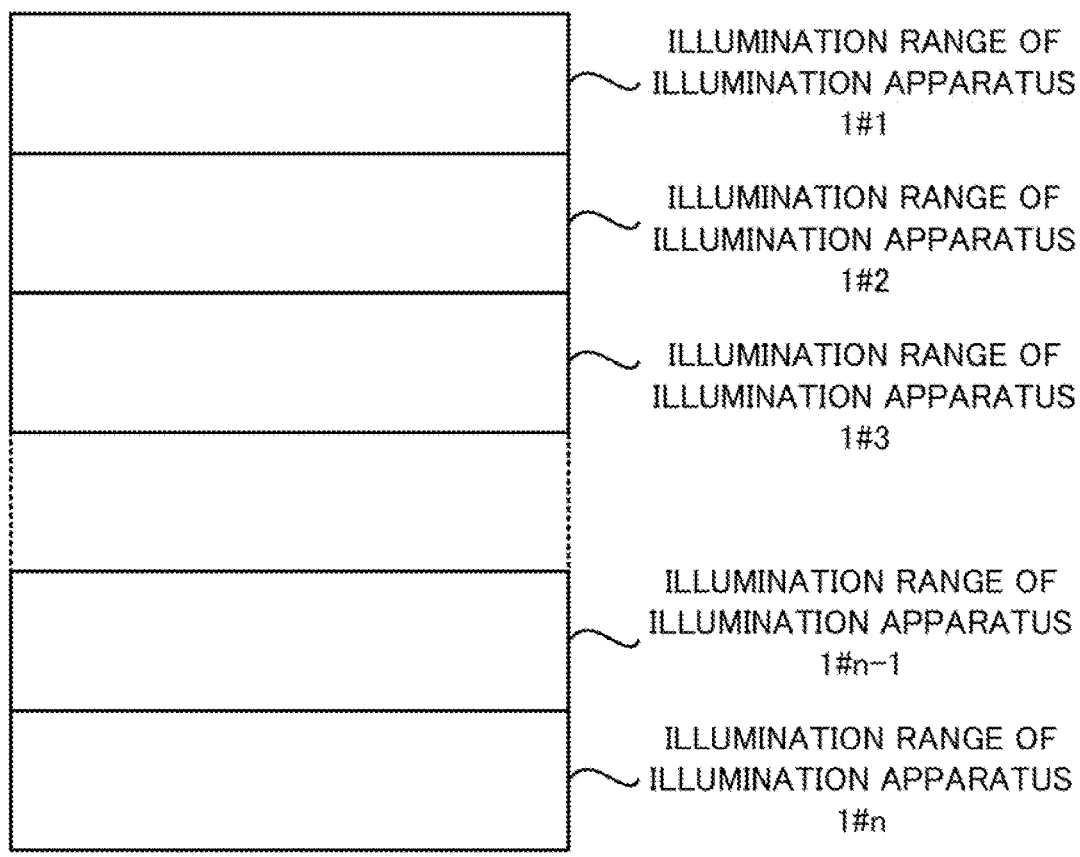
FIG. 18 shows a positional relation of a plurality of illumination apparatuses in the sixth example embodiment.

The plurality of illumination apparatus 2 are arranged in such a manner that a plurality of illumination ranges where the plurality of illumination apparatuses 2 illuminate with the illumination lights IL respectively, at least partially differ from each other along the vertical direction, as shown in FIG. 18. In the example shown in FIG. 18, the plurality of illumination apparatuses 2 are arranged in such a manner: the illumination range of illumination apparatus 2 #2 is located under the illumination range of illumination apparatus 2 #1; the illumination range of illumination apparatus 2 #3 is located under the illumination range of illumination apparatus 2 #2; . . . ; and the illumination range of illumination apparatus 2 #n is located under the illumination range of illumination apparatus 2 #n-1. Since each of the illumination apparatuses from 2 #1 to 2 #n is the same as the illumination apparatus 2 described above, each of the illumination apparatuses from 2 #1 to 2 #n is provided with the plurality of light emitting elements 21 similarly to the illumination apparatus 2.

(6-2) Authentication Operation in the Sixth Example Embodiment

Figure 19:
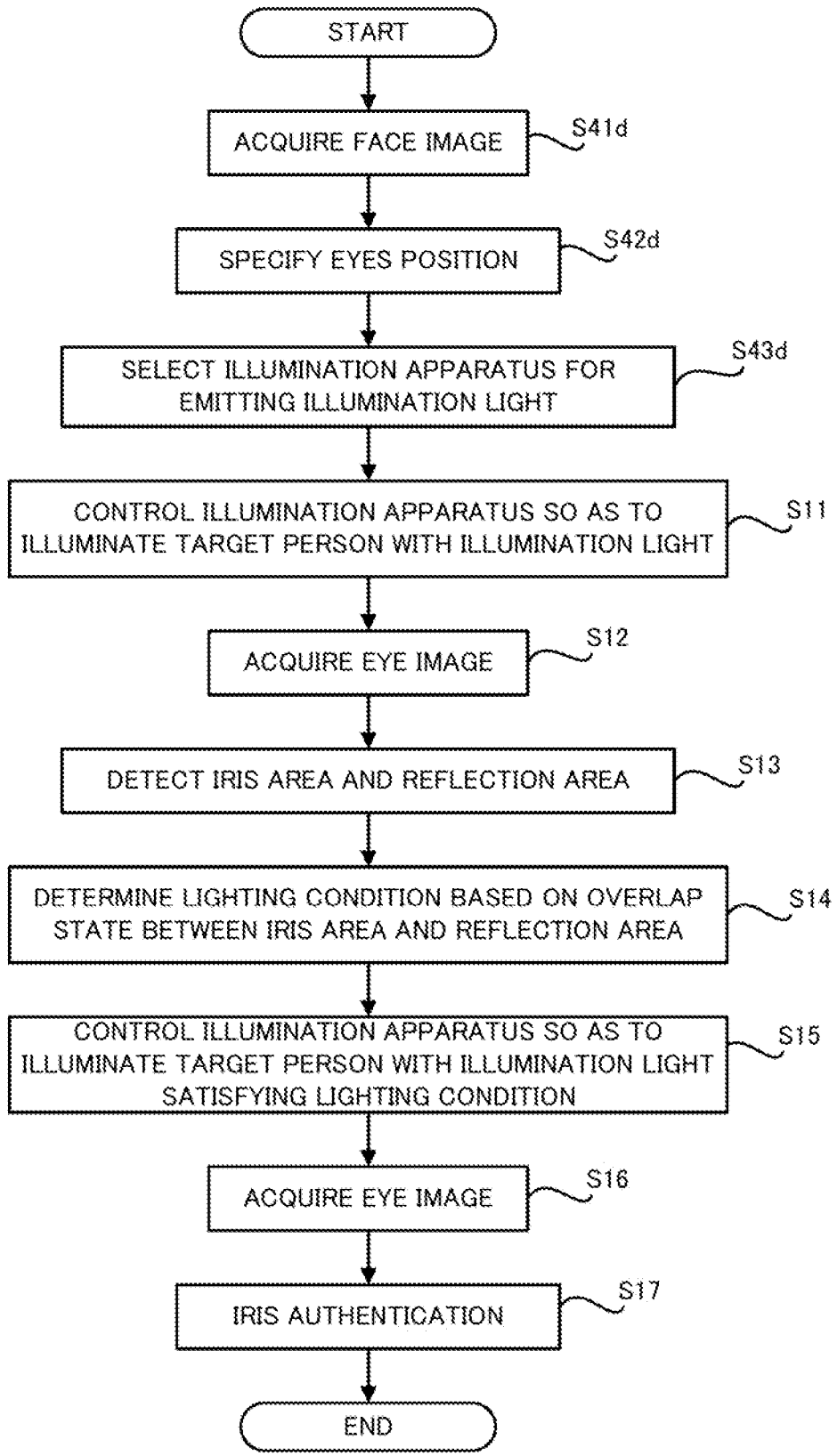
FIG. 19 is a flowchart showing a flow of authentication operation performed by an authentication apparatus in the sixth example embodiment.

Subsequently, referring to FIG. 19, a description will be given of authentication operation in the sixth example embodiment. FIG. 19 is a flow chart showing a flow of the authentication operation in the sixth example embodiment.

As shown in FIG. 19, the illumination control unit 312d acquires a face image IMG-F generated by imaging the face of the target person (step S41d). For example, in a case that the imaging apparatus 1 is capable of generating the face image IMG_F by imaging the face of the target person, then illumination control unit 312 may receive (i.e., acquire) the face image IMG_F from the imaging apparatus 1, using the communication apparatus 33. For example, if the other imaging apparatus different from the imaging apparatus 1 can generate the face image IMG_F by imaging the face of the target person, the illumination control unit 312 may receive (i.e., acquire) the face image IMG_F from the other imaging apparatus, using the communication apparatus 33.

Thereafter, the illumination control unit 312d specifies the position of eyes of the target person based on the facial image IMG-F acquired in step S41d (step S42d). Specifically, the illumination control unit 312d specifies the position (i.e., height) of the eyes (the eyes position) of the target person in the vertical direction.

Figure 20:
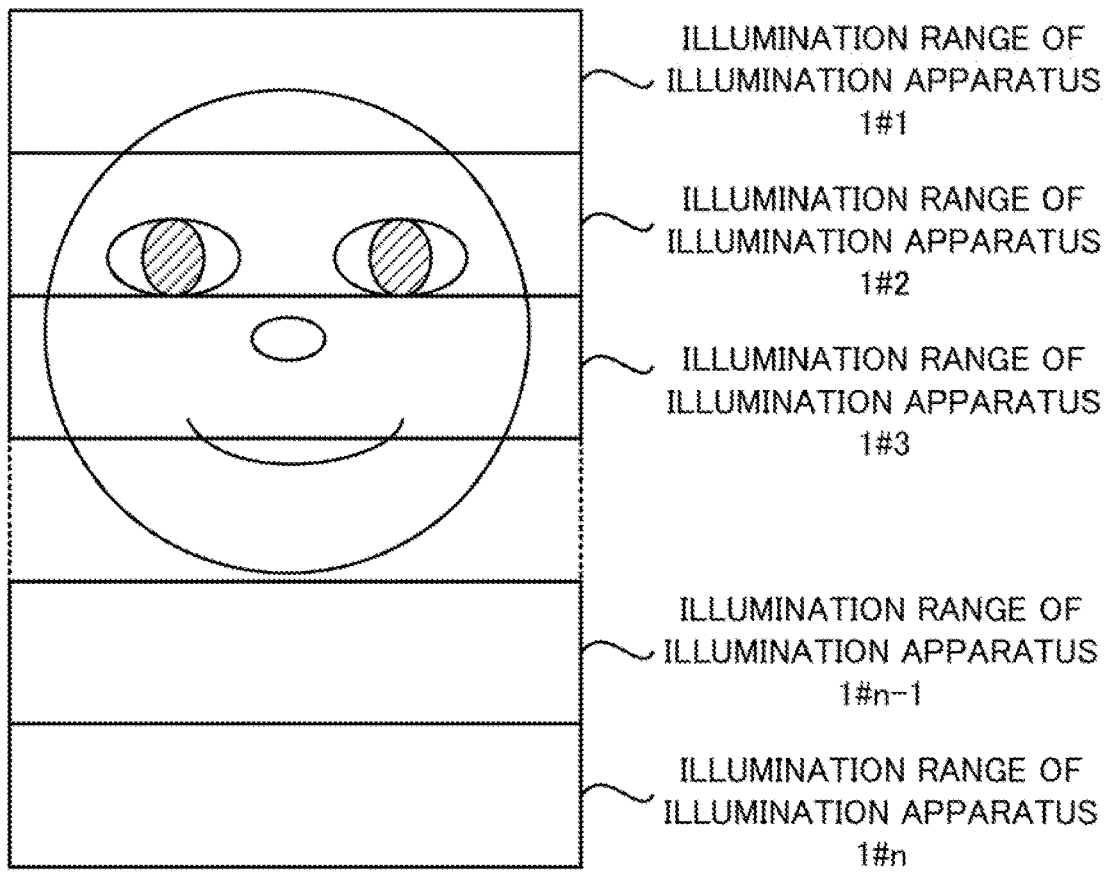
FIG. 20 shows a positional relation between the illumination ranges of a plurality of illumination apparatuses and eyes of a target person.

Thereafter, the illumination control unit 312d selects from the plurality of illumination apparatuses 2, at least one illumination apparatus 2 for actually emitting the illumination light IL, based on the eyes position specified in step S42d (step S43d). Specifically, the illumination control unit 312d selects at least one illumination apparatus 2 that is capable of illuminating, with the illumination light IL, the eyes located at the position specified in step S42d. In other word, the illumination control unit 312d selects at least one illumination apparatus 2, whose illumination range includes the eyes located at the position specified in step S42d. For example, FIG. 20 shows an example in which the illumination range of illumination apparatus 2 #2 includes the eyes of the target person. In this case, in step S43d, the illumination control unit 312d may select the illumination apparatus 2 #2.

Consequently, in the sixth example embodiment, the at least one illumination apparatus 2 selected in step S43d illuminates the eyes of the target person with the illumination light IL. On the other hand, at least one illumination apparatus 2, which was not selected in step S43d, may not illuminate the eyes of the target person with the illumination light IL.

Thereafter, also in the sixth example embodiment, similarly to the third example embodiment, the authentication apparatus 3d performs the processes from step S11 to step S17.

As described above, the authentication system SYSd of the sixth example embodiment is capable of selecting at least one illumination apparatus 2 for illuminating the eyes of the target person with the illumination light IL according to the position (height) of the eyes of the target person. For this reason, the authentication system SYSd can appropriately illuminate target person's eyes with the illumination light IL regardless of difference in the eyes position (height) of the target person.

At least one of the authentication system SYSb in the fourth example embodiment and the authentication system SYSc in the fifth example embodiment described above, may employ components unique to the sixth example embodiment. The components unique to the sixth example embodiment may include the components related to the plurality of illumination apparatus 2.

(7) Seventh Example Embodiment

Subsequently, a seventh example embodiment with respect to the illumination control apparatus, the illumination control method, the recording medium, and the imaging system will be described. Hereinafter, the illumination control apparatus, the illumination control method, the recording medium, and the imaging system according to the seventh example embodiment will be described using an authentication system SYSe where the illumination control apparatus, the illumination control method, the recording medium, and the imaging system according to the seventh example embodiment are applied.

(7-1) Configuration of Authentication System SYSe

Figure 21:
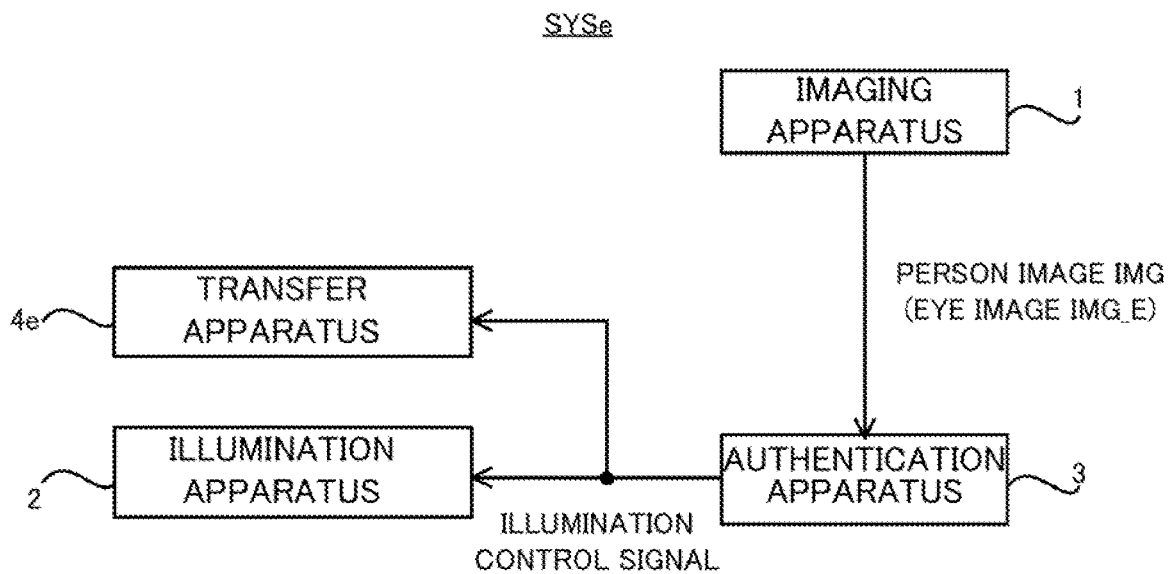
FIG. 21 is a block diagram showing an entire configuration of an authentication system according to the seventh example embodiment.

First, a configuration of the authentication system SYSe according to the seventh example embodiment will be described with reference to FIG. 21. FIG. 21 is a block diagram showing a configuration of the authentication system SYSe according to the seventh example embodiment;

As shown in FIG. 21, the authentication system SYSe differs from the authentication system SYSa described above in that the authentication system SYSe includes a transfer apparatus 4e which is capable of transferring the illumination apparatus 2. The transfer apparatus 4e includes, for example, a power source such as an actuator, and may transfer the illumination apparatus 2 using the power generated by the power source. The other features of the authentication system SYSe may be identical to those of the authentication system SYSa.

(7-2) Authentication Operation in Seventh Example Embodiment

Figure 22:
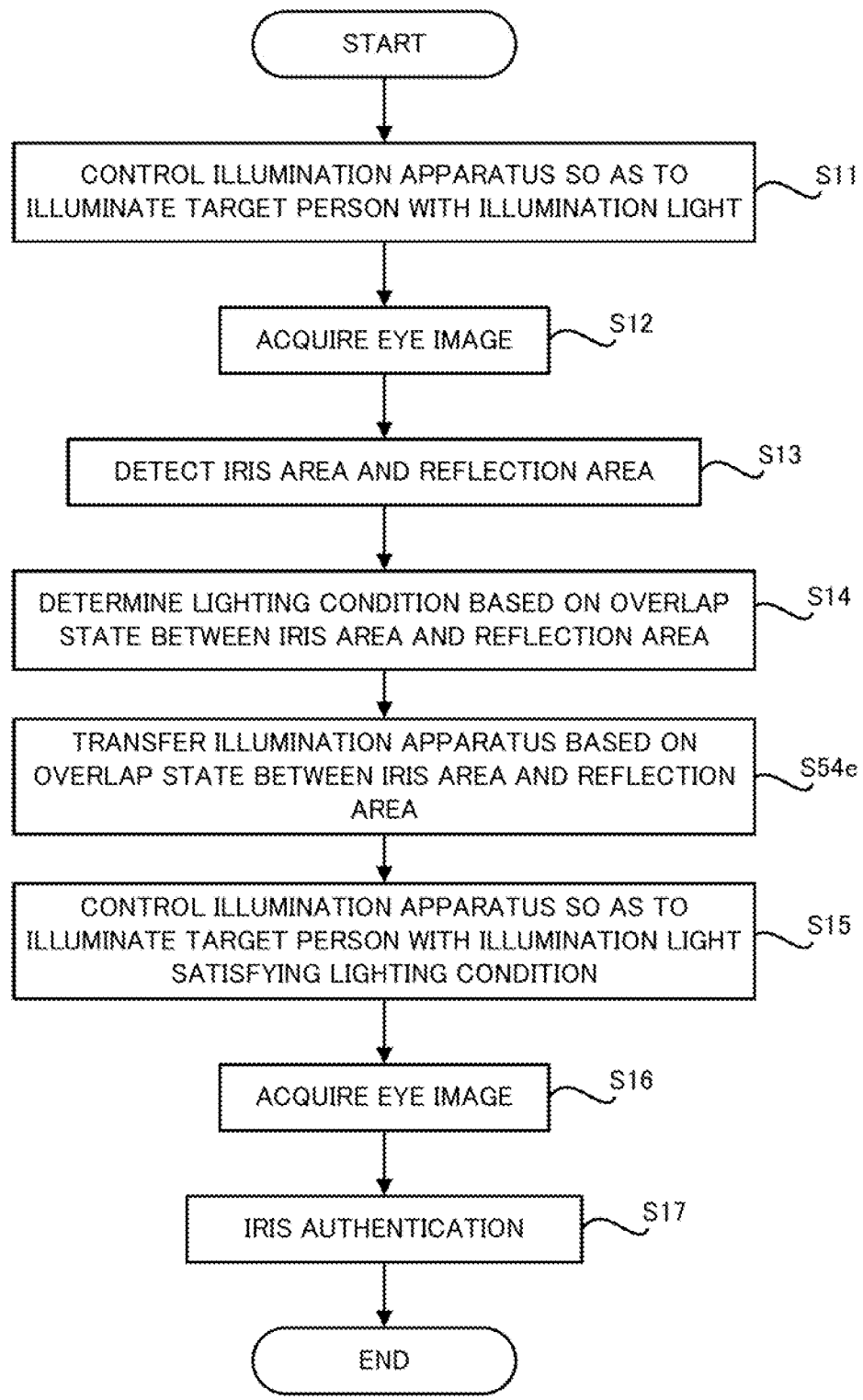
FIG. 22 is a flowchart showing a flow of authentication operation performed by an authentication apparatus in the seventh example embodiment.

Subsequently, referring to FIG. 22, authentication operation in the seventh example embodiment will be described. FIG. 22 is a flow chart showing a flow of the authentication operation in the seventh example embodiment.

As shown in FIG. 22, also in the seventh example embodiment, similarly to the third example embodiment, the authentication apparatus 3 performs the processes from step S11 to step S14.

Thereafter, the illumination control unit 312 transfers the illumination apparatus 2 by controlling the transfer apparatus 4e based on the iris area IA and the reflection area RA (step S54e). In this case, the illumination control unit 312 may transfer the illumination apparatus 2 to achieve the same objective as in the case of determining the lighting condition. For example, the illumination control unit 312 may transfer the illumination apparatus 2 so as to reduce the impact of the overlap between the iris area IA and the reflection area RA on the authentication accuracy. The illumination control unit 312 may transfer the illumination apparatus 2 so that the deterioration amount of authentication accuracy is reduced due to the overlap between the iris area IA and the reflection area RA. For example, the illumination control unit 312 may transfer the illumination apparatus 2 so that the authentication accuracy does not deteriorate due to the overlap between the iris area IA and the reflection area RA. For example, the illumination control unit 312 may transfer the illumination apparatus 2 so that the dimension of the overlap area where the iris area IA and the reflection area RA overlap each other gets smaller as compared to the case before the illumination apparatus 2 is transferred. For example, the illumination control unit 312 may transfer the illumination apparatus 2 so that the reflection area RA overlapping the iris area IA disappears. For example, the illumination control unit 312 may transfer the illumination apparatus 2 so that a plurality of reflection areas RA are distributed in a particular distribution pattern in the eye image IMG_E.

For example, the illumination control unit 312 may transfer the illumination apparatus 2 upwards, in a case that, when the illumination apparatus 2 illuminates the target person with the illumination light IL from a position upper than the current position, the impact the overlap between the iris area IA and the reflection area RA has on the authentication accuracy can be reduced. For example, the illumination control unit 312 may transfer the illumination apparatus 2 downwards, in a case that, when the illumination apparatus 2 illuminates the target person with the illumination light IL from a position lower than the current position, the impact the overlap between the iris area IA and the reflection area RA has on the authentication accuracy can be reduced. For example, the illumination control unit 312 may transfer the illumination apparatus 2 rightward, in a case that, when the illumination apparatus 2 illuminates the target person with the illumination light IL from a further right position than the current position, the impact the overlap between the iris area IA and the reflection area RA has on the authentication accuracy can be reduced. For example, the illumination control unit 312 may transfer the illumination apparatus 2 leftward, in a case that, when the illumination apparatus 2 illuminates the target person with the illumination light IL from a further left position than the current position, the impact the overlap between the iris area IA and the reflection area RA has on the authentication accuracy can be reduced.

Alternatively, the illumination control unit 312 may transfer the illumination apparatus 2 according to the move of the target person. For example, the illumination control unit 312 may transfer the illumination apparatus 2 in a moving direction same as a moving direction of the target person at a moving velocity made to match a moving velocity of the target person, so that the positional relation between the target person and the illumination apparatus 2 is maintained (i.e., not changed). As an example, the illumination control unit 312 may transfer the illumination apparatus 2 in the moving direction same as the moving direction of the target person at the moving velocity made to match the moving velocity of the target person, so that the illumination apparatus 2 is positioned on the side of the target person moving. As an example of operation for transferring the illumination apparatus 2 at the moving velocity made to match the moving velocity of the target person, there is operation for transferring the illumination apparatus 2 at the moving velocity same as the moving velocity of the target person. As an example of operation for transferring the illumination apparatus 2 at the moving velocity made to match the moving velocity of the target person, there is operation for transferring the illumination apparatus 2 at the moving velocity getting faster, as the moving velocity of the target person gets faster. In other words, as an example of operation for transferring the illumination apparatus 2 at the moving velocity made to match the moving velocity of the target person, there is operation for transferring the illumination apparatus 2 at the moving velocity getting slower, as the moving velocity of the target person gets slower. In this case, when the target person is moving relatively fast, then the illumination apparatus 2 would also move relatively fast. Similarly, when the target person is moving at a relatively low velocity (e.g., moving slowly), then the illumination apparatus 2 would also move at a relatively low velocity (e.g., moves slowly).

In a case that the illumination apparatus 2 moves, the illumination control unit 312 may not determine the lighting condition based on the iris area IA and the reflection area RA in step S14. For example, the illumination control unit 312 may not determine the lighting condition based on the iris area IA and the reflection area RA in step S14, if the impact the overlap between the iris area IA and the reflection area RA has on the authentication accuracy can be sufficiently reduced due to the move of the illumination apparatus 2. In this case, the default lighting condition may be used.

Thereafter, also in the seventh example embodiment, similarly to the third example embodiment, the authentication apparatus 3 performs the processes from step S15 to step S17.

As described above, the authentication system SYSe of the seventh example embodiment may transfer the illumination apparatus 2 in addition to or in place of determining the lighting conditions. Therefore, even in a case that the impact the overlap between the iris area IA and the reflection area RA has on target person's authentication accuracy cannot be sufficiently reduced only by determining the lighting condition, the authentication system SYSe can reduce the impact the overlap between the iris area IA and the reflection area RA has on the authentication accuracy by transferring the illumination apparatus 2. Alternatively, the authentication system SYSe can reduce the impact the overlap between the iris area IA and the reflection area RA has on the authentication accuracy, by transferring the illumination apparatus 2 without determining the lighting condition.

The operation for transferring the illumination apparatus 2 is equivalent to the operation for changing the positional relation between the illumination apparatus 2 and the target person. In this case, the positional relation between the illumination apparatus 2 and the target person can be also changed by making the target person move relatively to the illumination apparatus 2 in addition to or in place of transferring the illumination apparatus 2. For this reason, the illumination control unit 312 may use the output apparatus 35 to output to the target person the information prompting the target person to move relative to the illumination apparatus 2 based on the iris area IA and the reflection area RA. In this case, the illumination control unit 312 may output the information for making the target person move so as to achieve the objective same as in the case of determining the lighting condition. Consequently, the authentication system SYSe can reduce the impact the overlap between iris area IA and reflection area RA has on the authentication accuracy, by making the target person move.

Further, at least one of the authentication system SYSb in the fourth example embodiment to the authentication system SYSd in the sixth example embodiment, may employ components unique to the seventh example embodiment. The components unique to the seventh example embodiment may include the components related to the move of the illumination apparatus 2.

(8) Eighth Example Embodiment

Subsequently, an eighth example embodiment with respect to the illumination control apparatus, the illumination control method, the recording medium, and the imaging system will be described. Hereinafter, the illumination control apparatus, the illumination control method, the recording medium, and the imaging system according to the eighth example embodiment will be described using an authentication system SYSf where the illumination control apparatus, the illumination control method, the recording medium, and the imaging system according to the eighth example embodiment are applied.

(8-1) Configuration of Authentication System SYSf

Figure 23:
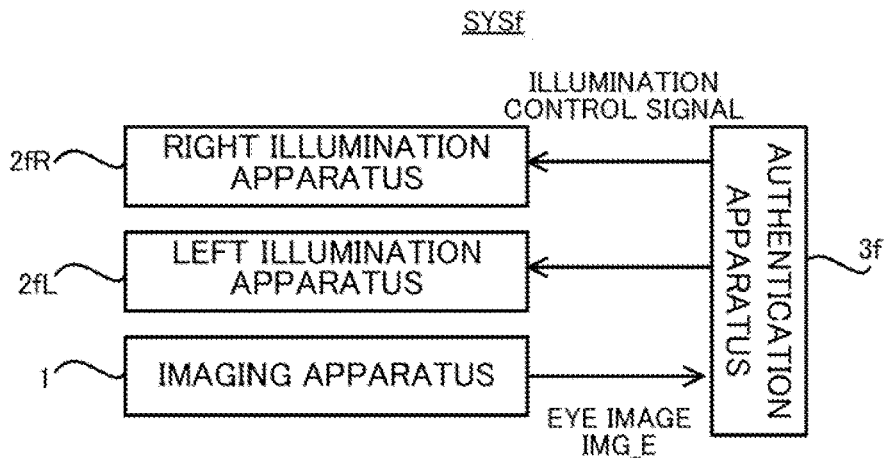
FIG. 23 is a block diagram illustrating an entire configuration of an authentication system according to the eighth example embodiment.

First, a configuration of the authentication system SYSf according to the eighth example embodiment will be described with reference to FIG. 23. FIG. 23 is a block diagram showing the configuration of the authentication system SYSf according to the eighth example embodiment.

As shown in FIG. 23, the authentication system SYSf includes the imaging apparatus 1, a right illumination apparatus 2/R, a left illumination apparatus 2/L, and an authentication apparatus 3f. A system including: the imaging apparatus 1; the right illumination apparatus 2/R; and the left illumination apparatus 2/L, may be referred to as an imaging system.

The right illumination apparatus 2/R is capable of illuminating the target person (particularly the eyes) with the illumination light IL, similarly to the illumination apparatus 2. However, the right illumination apparatus 2/R may be capable of illuminating at least the right eye of the target person with the illumination light IL. That is, the right illumination apparatus 2/R may not be capable of illuminating the left eye of the target person with the illumination light IL. However, the right illumination apparatus 2/R may be capable of illuminating the left eye of the target person with the illumination light IL.

The left illumination apparatus 2/L is capable of illuminating the target person (particularly the eyes) with the illumination light IL, similarly to the illumination apparatus 2. However, the left illumination apparatus 2/L may be capable of illuminating at least the left eye of the target person with the illumination light IL. That is, the left illumination apparatus 2/L may not be capable of illuminating the right eye of the target person with the illumination light IL. However, the left illumination apparatus 2/L may be capable of illuminating the right eye of the target person with the illumination light IL.

In the following description, the illumination light IL emitted by the right illumination apparatus 2/R is referred to as the "illumination light ILR", and the illumination light IL emitted by the left illumination apparatus 2/L is referred to as the "illumination light ILL", to distinguish between the two kinds of illumination lights IL.

Figure 24:
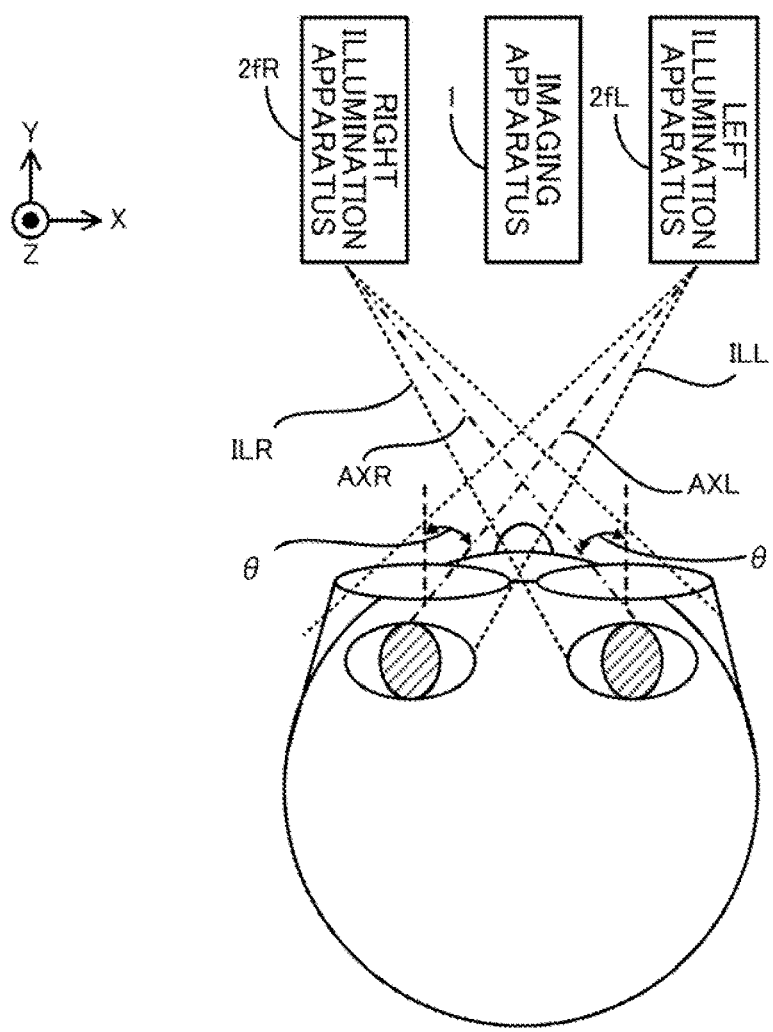
FIG. 24 is a block diagram showing a configuration of a right illumination apparatus, a left illumination apparatus, an imaging apparatus and an imaging system according to the eighth example embodiment.

In the eighth example embodiment, the imaging apparatus 1, the right illumination apparatus 2/R, and the left illumination apparatus 2/L are arranged in an arrangement mode shown in FIG. 24. Specifically, as shown in FIG. 24, the right illumination apparatus 2/R is arranged on the left side of the imaging apparatus 1 viewed from the front of the imaging apparatus 1 (in the example shown in FIG. 24, the −X side). That is, the right illumination apparatus 2/R is arranged on the left side (in the example shown in FIG. 24, the −X side) of the imaging apparatus 1 as viewed from the target person who is going to be imaged by the imaging apparatus 1. On the other hand, the left illumination apparatus 2/L is arranged on the right side of the imaging apparatus 1 viewed from the front of the imaging apparatus 1 (in the example shown in FIG. 24, the +X side). That is, the left illumination apparatus 2/L is arranged on the right side (in the example shown in FIG. 24, the +X side) of the imaging apparatus 1 as viewed from the target person who is going to be imaged by the imaging apparatus 1. Further, at the timing when the imaging apparatus 1 images the right eye and the left eye, the optical axis AXR of the right illumination apparatus 2/R (for example, the optical axis of an optical system such as a lens provided in the right illumination apparatus 2/R) and the optical axis AXL of the left illumination apparatus 2/L (for example, the optical axis of an optical system such as a lens provided in the left illumination apparatus 2/L) intersect each other between the imaging apparatus 1 and the target person.

The right illumination apparatus 2/R may be arranged in the imaging apparatus 1. The right illumination apparatus 2/R may be arranged at a position different from the position of the imaging apparatus 1. The right illumination apparatus 2/R may be integrated with the imaging apparatus 1. The right illumination apparatus 2/R may be independently arranged from the imaging apparatus 1. The left illumination apparatus 2/L may be arranged in the imaging apparatus 1. The left illumination apparatus 2/L may be arranged at a position different from the position of the imaging apparatus 1. The left illumination apparatus 2/L may be integrated with the imaging apparatus 1. Alternatively, the left illumination apparatus 2/L may be independently arranged from the imaging apparatus 1.

In a case that a gate apparatus through which the target person can pass through is arranged, at least one of the right illumination apparatus 2/R and the left illumination apparatus 2/L may be arranged at the gate apparatus. In a case that a gate apparatus which the target person can pass through is arranged, the imaging apparatus 1 may image the target passing through the gate apparatus. The gate apparatus may include a gate (e.g., a flapper gate) that goes into an open state when the target person is allowed to pass through the gate apparatus, and goes into a close state when the target person is not allowed to pass through the gate apparatus.

The authentication apparatus 3f, similarly to the authentication apparatus 3, acquires the eye image IMG_E from the imaging apparatus 1, and performs using the eye image IMG_E, the authentication operation for authenticating the target person. However, the authentication operation performed by the authentication apparatus 3f is partially different from the authentication operation performed by the authentication apparatus 3. Specifically, the authentication apparatus 3f authenticates the target person using both of the eye images IMG_E: one is generated by the imaging apparatus 1 that images the target person being illuminated by the right illumination apparatus 2/R with the illumination light ILR; and the other one is generated by the imaging apparatus 1 that images the target person being illuminated by the left illumination apparatus 2/L with the illumination light ILL. However, the authentication apparatus 3f may authenticate the target person using at least one of the eye images IMG_E: one is generated by the imaging apparatus 1 that images the target person being illuminated by the right illumination apparatus 2/R with the illumination light ILR; and the other one is generated by the imaging apparatus 1 that images the target person being illuminated by the left illumination apparatus 2/L with the illumination light ILL.

Figure 25:
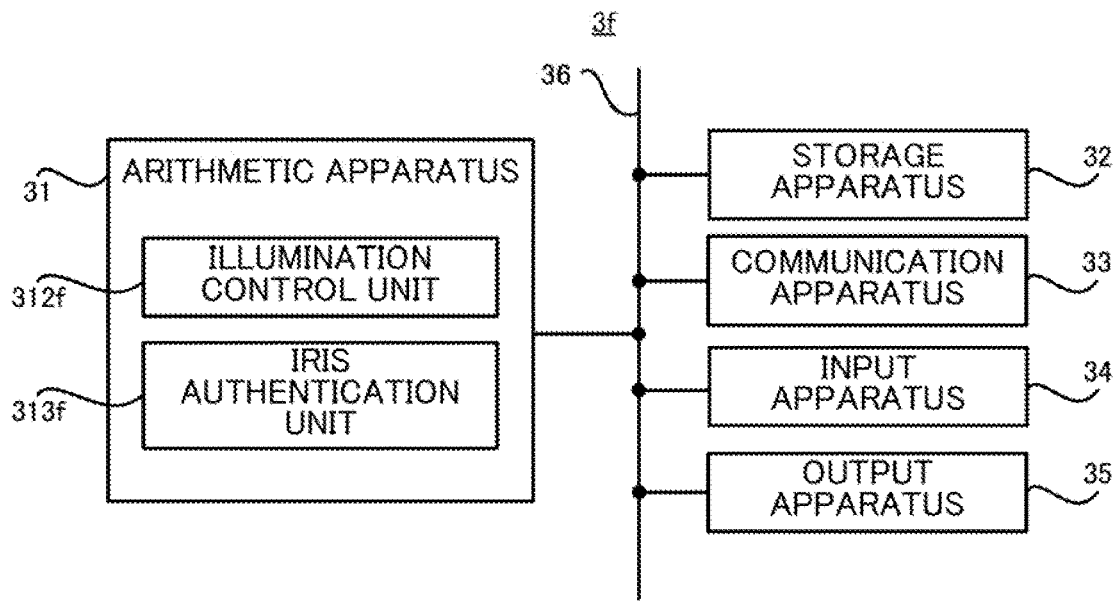
FIG. 25 is a block diagram showing a configuration of an authentication apparatus according to the eighth example embodiment.

The configuration of such an authentication apparatus 3f is shown in FIG. 25. As shown in FIG. 25, the authentication apparatus 3f differs from the authentication apparatus 3 in that the authentication apparatus 3f may not be provided with the image analysis unit 311. Furthermore, the authentication apparatus 3f differs from the authentication apparatus 3 in that the authentication apparatus 3f includes an illumination control unit 312f and an iris authentication unit 313f instead of the illumination control unit 312 and the iris authentication unit 313 respectively. The other features of the authentication apparatus 3f may be identical to those of the authentication apparatus 3.

(8-2) Authentication Operation Performed by Authentication Apparatus 3f

Figure 26:
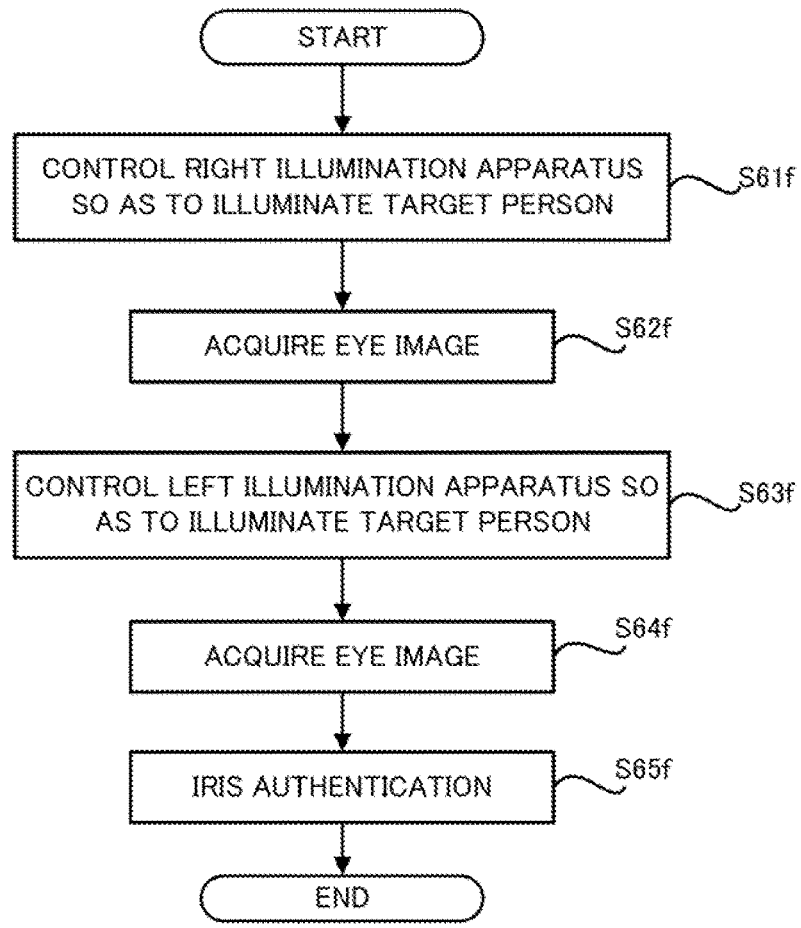
FIG. 26 is a flowchart showing a flow of authentication operation performed by the authentication apparatus according to the eighth example embodiment.

Subsequently, referring to FIG. 26, authentication operation performed by the authentication apparatus 3f will be described. FIG. 26 is a flowchart showing a flow of the authentication operation performed by the authentication apparatus 3f.

As shown in FIG. 26, the illumination control unit 312f controls the right illumination apparatus 2/R and the left illumination apparatus 2/L so that any one of the right illumination apparatus 2/R and the left illumination apparatus 2/L illuminates the eyes of the target person with the illumination light IL (step S61f). In the example shown in FIG. 26, in step S61f, the illumination control unit 312f controls the right illumination apparatus 2/R and the left illumination apparatus 2/L so that the right illumination apparatus 2/R illuminates the eyes of the target person with the illumination light ILR. That is, the illumination control unit 312f controls the right illumination apparatus 2/R so that the right illumination apparatus 2/R illuminates the eyes of the target person (in particular, at least the right eye) with the illumination light ILR, and controls the left illumination apparatus 2/L so that the left illumination apparatus 2/L does not illuminate the eyes of the target person with the illumination light ILL. In other words, the illumination control unit 312f controls the right illumination apparatus 2/R so that the right illumination apparatus 2/R emits the illumination light ILR, and controls the left illumination apparatus 2/L so that the left illumination apparatus 2/L does not emit the illumination light ILL.

Then, the imaging apparatus 1 images the eyes of the target person. In this case, the eyes (particularly, the right eye) of the target person are illuminated by the illumination light ILR emitted from the right illumination apparatus 2/R. Accordingly, the imaging apparatus 1 images at least the eyes (particularly, the right eye) of the target person being illuminated by the illumination light ILR. Consequently, the imaging apparatus 1 generates the eye image IMG_E. That is, the imaging apparatus 1 generates the eye image IMG_E where the eyes (particularly, the right eye) of the target person illuminated by the illumination light ILR are captured. In the eighth example embodiment, as necessary, the eye image IMG_E where the eyes (particularly, the right eye) of the target person illuminated by the illumination light ILR is captured is referred to as the "eye image IMG_ER". When the imaging apparatus 1 has generated the eye image IMG_ER, then the iris authentication unit 313f receives (i.e., acquires) the eye image IMG_ER from the imaging apparatus 1, using the communication apparatus 33 (step S62f).

Thereafter, the illumination control unit 312f controls the right illumination apparatus 2/R and the left illumination apparatus 2/L so that the other one of the right illumination apparatus 2/R and the left illumination apparatus 2/L illuminates the eyes of the target person with the illumination light IL (step S63f). In the example shown in FIG. 26, in step S63f, the illumination control unit 312f controls the right illumination apparatus 2/R and the left illumination apparatus 2/L so that the left illumination apparatus 2/L illuminates the eyes of the target person with the illumination light ILL. That is, the illumination control unit 312f controls the left illumination apparatus 2/L so that the left illumination apparatus 2/L illuminates the eyes of the target person (particularly, at least the left eye) with the illumination light ILL, and controls the right illumination apparatus 2/R so that the right illumination apparatus 2/R does not illuminate the eyes of the target person with the illumination light ILR. In other words, the illumination control unit 312 controls the left illumination apparatus 2/L so that the left illumination apparatus 2/L emits the illumination light ILL, and controls the right illumination apparatus 2/R so that the right illumination apparatus 2/R does not emit the illumination light ILR.

Then, the imaging apparatus 1 images the eyes of the target person. In this case, the eyes of the target person (particularly, the left eye) are illuminated by the illumination light ILL emitted from the left illumination apparatus 2/L. Accordingly, the imaging apparatus 1 images at least the eyes (particularly, the left eye) of the target person being illuminated by the illumination light ILL. Consequently, the imaging apparatus 1 generates the eye image IMG_E. That is, the imaging apparatus 1 generates the eye image IMG_E where the eyes (particularly, the left eye) of the target person illuminated by the illumination light ILL are captured. In the eighth example embodiment, as necessary, the eye image IMG_E where the eyes (particularly, the left eye) of the target person illuminated by the illumination light ILL is captured is referred to as the "eye image IMG_EL". When the imaging apparatus 1 generates the eye image IMG_EL, the iris authentication unit 313f receives (i.e., acquires) the eye image IMG_EL from the imaging apparatus 1, using the communication apparatus 33 (step S64f).

Thereafter, the iris authentication unit 313f authenticates the target person based on the eye image IMG_ER acquired in step S62f and the eye image IMG EL acquired in step S64f (step S65f). Specifically, the iris authentication unit 313f detects the iris area IA (hereinafter referred to as the "iris area IAR" as necessary) corresponding to the iris of the right eye of the target person in the eye image IMG_ER acquired in step S62f. Further, the iris authentication unit 313f detects the iris area IA (hereinafter referred to as the "iris area IAL" as necessary) corresponding to the iris of the left eye of the target person in the eye image IMG_EL acquired in step S64f. The operation of detecting the iris area IA by the iris authentication unit 313f may be similar to the operation of detecting the iris area IA by the iris authentication unit 313 described above. Thereafter, the iris authentication unit 313f extracts the feature values related to the pattern of the iris from the iris area IAR of the eye image IMG_ER and the iris area IAL of the eye image IMG_EL. Thereafter, the iris authentication unit 313f compares the extracted feature values to the feature values of the iris of the registered person to authenticate the target person.

(8-3) Technical Effects of Authentication System SYSf

The authentication system SYSf of the eighth example embodiment can reduce the impact the overlap between the iris area IA and the reflection area RA has on the authentication accuracy. In particular, when the person wears eyeglasses, the authentication system SYSf can reduce the impact the overlap between the iris area IA and the reflection area RA has on the authentication accuracy. The reason will be described below.

Figure 27:
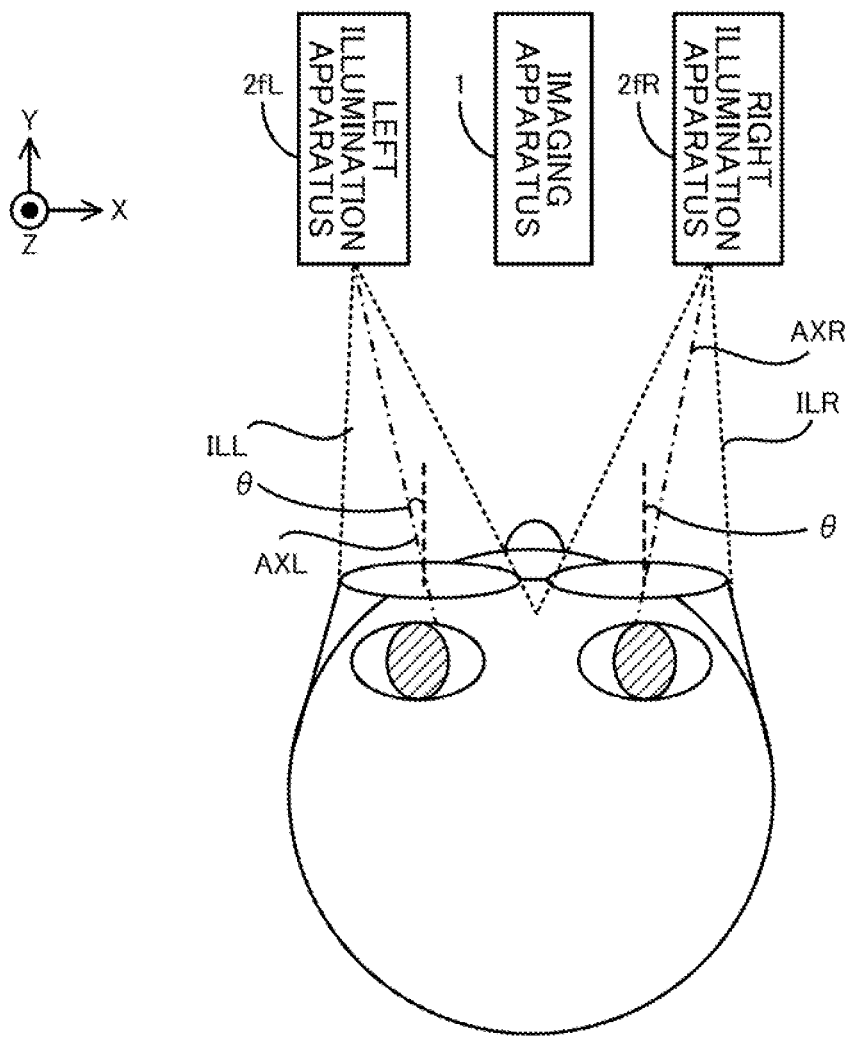
FIG. 27 is a block diagram showing a configuration of a right illumination apparatus, a left illumination apparatus, an imaging apparatus and an imaging system in a comparative example.

First, if the target person is wearing eyeglasses, the reflection area RA is more likely to overlap the iris area IA in the eye image IMG_E generated by the imaging apparatus 1, compared to the case that the target person is not wearing eyeglasses. Because, the illumination light IL for illuminating the target person is reflected by the eyeglasses (e.g., reflected by the lens of the eyeglasses). The possibility that the iris area IA and the reflection area RA overlap each other increases as the angle of incidence θ (see FIGS. 24 and 27)

of the illumination light IL with respect to the lens of the eyeglasses covering the eyes decreases. That is, the possibility that the iris area IA and the reflection area RA overlap each other becomes higher as the incident mode of the illumination light with respect to the lens of the eyeglasses covering the eyes becomes closer to the normal incidence.

Figure 28A:
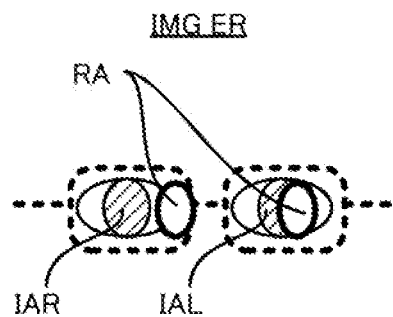
FIG. 28A shows an example of eye image and FIG. 28B shows an example of eye image.

In the eighth example embodiment, the right illumination apparatus 2fR is arranged on the left side of the imaging apparatus 1, and the optical axis AXR of the right illumination apparatus 2fR and the optical axis AXL of the left illumination apparatus 2fL intersect each other at a position between the imaging apparatus 1 and the target person. Consequently, as compared to the case where the right illumination apparatus 2fR is arranged on the right side of the imaging apparatus 1 and/or the optical axis AXR and the optical axis AXL do not intersect each other (refer to FIG. 27), the incident angle θ of the illumination light ILR with respect to the right lens of the eyeglasses covering the right eye is increased as shown in FIG. 24. Consequently, as shown in FIG. 28A indicating the eye image IMG_ER, it is unlikely that the reflection area RA corresponding to the reflection image of the illumination light ILR overlaps the iris area IAR corresponding to the iris of the right eye in the eye image IMG_ER.

Figure 28B:
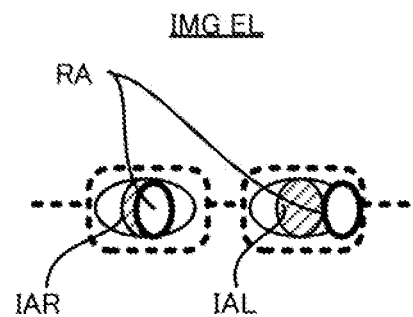

Similarly, in the eighth example embodiment, the left illumination apparatus 2fL is arranged on the right side of the imaging apparatus 1, and the optical axis AXR of the right illumination apparatus 2fR and the optical axis AXL of the left illumination apparatus 2fL intersect each other between the imaging apparatus 1 and the target person. Consequently, as compared to the case where the left illumination apparatus 2fL is arranged on the left side of the imaging apparatus 1 and/or the optical axis AXR and the optical axis AXL do not intersect each other (see FIG. 27), the incident angle θ of the illumination light ILL with respect to the left lens of the eyeglasses covering the left eye is increased as shown in FIG. 24. Consequently, as shown in FIG. 28B indicating the eye image IMG_EL it is unlikely that the reflection area RA corresponding to the reflection image of the illumination light ILR overlaps the iris area IAL corresponding to the iris of the left eye in the eye image IMG_EL.

Therefore, in an environment where the right illumination apparatus 2fR is illuminating the target person with the illumination light ILR while the left illumination apparatus 2fL is not illuminating the target person with the illumination light ILL, the imaging apparatus 1 can generate the eye image IMG_ER where the reflection area RA does not overlap the iris area IAR. Similarly, in an environment where the left illumination apparatus 2fL is illuminating the target person with the illumination light ILL while the right illumination apparatus 2fR is not illuminating the target person with the illumination light ILR, the imaging apparatus 1 can generate the eye image IMG_EL where the reflection area RA does not overlap the iris area IAL.

On the other hand, in the environment where the right illumination apparatus 2fR is illuminating the target person with the illumination light ILR while the left illumination apparatus 2fL is not illuminating the target person with the illumination light ILL, the angle of incidence of the illumination light ILR with respect to the left lens of the eyeglasses covering the left eye is not always large enough. Therefore, in the eye image IMG_ER, as shown in FIG. 28A, there is a possibility that the reflection area RA would overlap the iris area IAL corresponding to the iris of the left eye. Similarly, in the environment where the left illumination apparatus 2fL is illuminating the target person with the illumination light ILL while the right illumination apparatus 2fR is not illuminating the target person with the illumination light ILR, the angle of incidence of the illumination light ILL with respect to the right lens of the eyeglasses covering the right eye is not always large enough. Therefore, as shown in FIG. 28B, the reflection area RA would appear in the iris area IAR corresponding to the iris of the right eye in the eye image IMG_EL. In view of this point, in the eighth example embodiment, with respect to the eye image IMG_ER, the iris authentication unit 313f may not extract the feature values related to the pattern of the iris from the iris area IAL where the reflection area RA is likely to overlap, while extracting the feature values related to the pattern of the iris from the iris area IAR where the reflection area RA is unlikely to overlap. Similarly, with respect to the eye image IMG_EL, the iris authentication unit 313f may not extract the feature values related to the pattern of the iris from the iris area IAR where the reflection area RA is likely to overlap, while extracting the feature values related to the pattern of the iris from the iris area IAL where the reflection area RA is unlikely to overlap. Then, the iris authentication unit 313 authenticates the target person using the feature values extracted from the iris area IAR of the eye image IMG_ER and the feature values extracted from the iris area IAL of the eye image IMG EL. In other words, the iris authentication unit 313 authenticates the target person without the feature values extracted from the iris area IAL of the eye image IMG_ER where the reflection area RA is likely to overlap, and also without the feature values extracted from the iris area IAR of the eye image IMG_EL where the reflection area RA is likely to overlap. Therefore, the iris authentication unit 313 can authenticate the target person with the higher accuracy compared to the case that the target person is authenticated by using the feature values extracted from the iris area IA where reflection area RA is likely to overlap.

However, the iris authentication unit 313 may authenticate the target person using any one of the feature values extracted from the iris area IAR of the eye image IMG_ER and the feature values extracted from the iris area IAL of the eye image IMG_EL. In other words, the iris authentication unit 313 does not need to authenticate the target person using both of the feature values extracted from the iris area IAR of the eye image IMG_ER and the feature values extracted from the iris area IAL of the eye image IMG_EL. Even in such a case, the iris authentication unit 313 can authenticate the target person with a reasonably high degree of accuracy.

The authentication apparatus 3f may perform authentication operation of face authentication in addition to the authentication operation of the iris authentication. The authentication operation related to the face authentication may include operation of: acquiring the face image IMG_F (cf. the sixth example embodiment) generated by imaging the face of the target person; and determining whether or not the target person captured in the acquired face image IMG_F is the same as the registered person based on the feature points (the feature values) of the face of the target person captured in the face image IMG_F. In this case, the authentication apparatus 3f may perform the authentication operation of the face authentication before and after, or in parallel with, the authentication operation of the iris authentication. The same could also apply to, not limited to the eighth example embodiment, at least one of the example embodiments from the first one to the seventh one and the example embodiments from the ninth one to the tenth one described later.

In a case that the authentication operation related to the iris authentication is performed after the authentication operation related to the face authentication, the authentication apparatus 3f may control the illumination intensity for generating the eye image IMG_E, based on the result of the face authentication. For example, the authentication apparatus 3f may set (e.g., change) a threshold Th corresponding to an allowable value of the size of the overlap area between the iris area IA and the reflection area RA, based on the result of the face authentication. Here, in the case that the threshold Th is used, typically the authentication apparatus 3f may set the lighting condition (e.g., the number of light emitting elements 21 for emitting the illumination light IL described in the third example embodiment, or the like) of the right illumination apparatus 2fR and the left illumination apparatus 2fL, so that the size of the overlap area becomes smaller than the threshold Th. Alternatively, the authentication apparatus 3f may output the information for prompting the target person to move, so that the size of the overlap area becomes smaller than the threshold Th. In this case, the smaller the threshold Th is, the smaller the overlap area between the iris area IA and the reflection area RA gets. Thereby, the authentication apparatus 3f can authenticate the target person with higher accuracy by the iris authentication. Conversely, the larger the threshold Th is, the overlap between the iris area IA and the reflection area RA is allowed to some extent. Accordingly, the load of setting the lighting condition with respect to the right illumination apparatus 2fR and left illumination apparatus 2fL is reduced. On this assumption, if the face authentication is failed, it is preferable to prioritize reliable authentication of the target person by the iris authentication, because the authentication of the target person has not been completed.

Therefore, if the face authentication has been failed, the authentication apparatus 3f may set the threshold Th smaller as compared to the case that the face authentication has been successful. Consequently, the imaging apparatus 1 can image the eyes of the target person in an appropriate imaging environment (i.e., the environment where the overlap area between the iris area IA and the reflection area RA becomes smaller) to generate the eye image IMG_E where the iris of the target person is appropriately captured. Consequently, the authentication apparatus 3f can more reliably determine whether or not the target person is the same as the registered person by performing the iris authentication. Conversely, in the case that the face authentication has been successful, the authentication of the target person has been already completed by the face authentication. Therefore, even if the reduction of the load of setting for the iris authentication the lighting condition with respect to the right illumination apparatus 2fR and the left illumination apparatus 2fL, is prioritized over the improvement of authentication accuracy of the target person, no big problem would occur. Therefore, the authentication apparatus 3f may set the threshold Th larger when the face authentication has been successful, compared to the case when the face authentication has been failed.

At least any one of the right illumination apparatus 2fR and the left illumination apparatus 2fL, similarly to the illumination apparatus 2 described above, may be configured to change the illumination mode of the illumination light IL to the eyes of the target person. At least any one of the right illumination apparatus 2fR and left illumination apparatus 2fL, similarly to the illumination apparatus 2 described above, may be provided with a plurality of light emitting elements 21. In this case, the authentication apparatus 3f may include the image analysis unit 311 that detects the iris area IA and the reflection area RA. Further, the illumination control unit 312f may determine the lighting condition based on the iris area IA and the reflection area RA, similarly to the illumination control unit 312 described above.

Further, at least one of the authentication systems from the authentication system SYSa in the third example embodiment to the authentication system SYSe in the seventh example embodiment may employ components unique to the eighth example embodiment. The components unique to the eighth example embodiment may include the components related to the right illumination apparatus 2fR and left illumination apparatus 2fL.

(9) Ninth Example Embodiment

Subsequently, a ninth example embodiment with respect to the illumination control apparatus, the illumination control method, the recording medium, and the imaging system will be described. Hereinafter, the illumination control apparatus, the illumination control method, the recording medium, and the imaging system according to the ninth example embodiment will be described using an authentication system SYSg where the illumination control apparatus, the illumination control method, the recording medium, and the imaging system according to the ninth example embodiment are applied.

(9-1) Configuration of Authentication System SYSg

Figure 29:
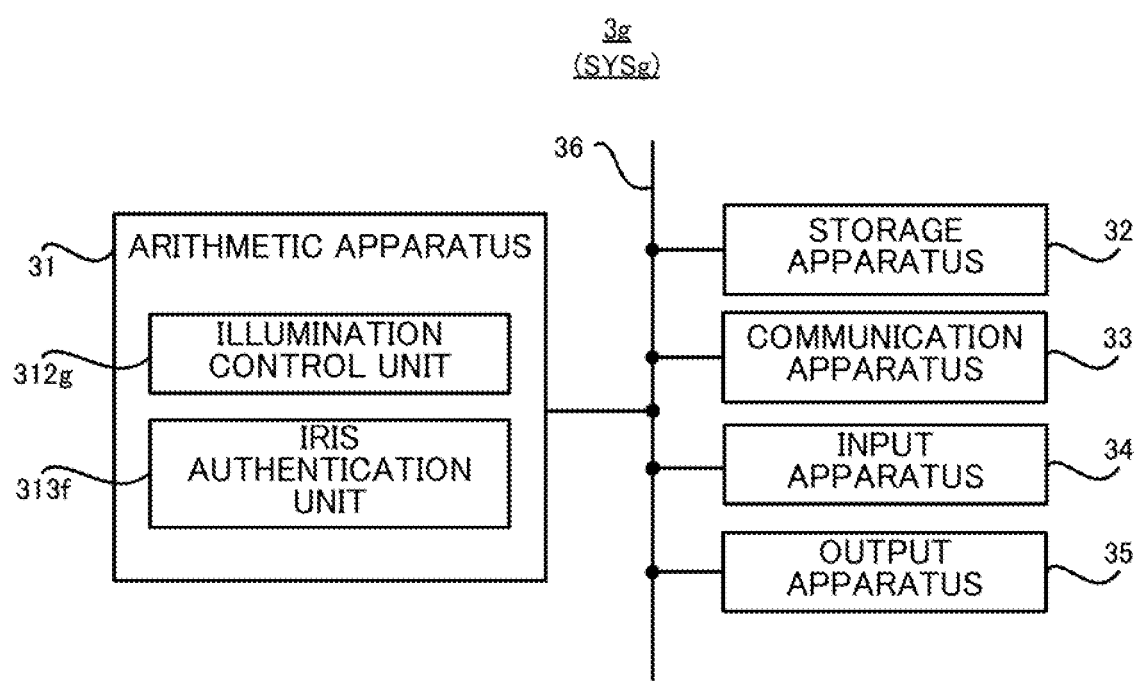
FIG. 29 is a block diagram showing a configuration of an authentication apparatus according to the ninth example embodiment.

The authentication system SYSg differs from the authentication system SYSf described above in that the authentication system SYSg includes an authentication apparatus 3g instead of the authentication apparatus 3f. The other features of the authentication system SYSg may be identical to those of the authentication system SYSf. Hereinafter, referring to FIG. 29, a description will be given of the authentication apparatus 3g in the ninth example embodiment. FIG. 29 is a block diagram showing a configuration of the authentication apparatus 3g according to the ninth example embodiment;

As shown in FIG. 29, the authentication apparatus 3g differs from the authentication apparatus 3f described above in that the authentication apparatus 3g includes an illumination control unit 312g instead of the illumination control unit 312f. The other features of the authentication apparatus 3g may be identical to those of the authentication apparatus 3f. The illumination control unit 312g differs from the illumination control unit 312f in that the illumination control unit 312g controls the right illumination apparatus 2fR and the left illumination apparatus 2fL so that both of the right illumination apparatus 2fR and the left illumination apparatus 2fL illuminate the eyes of the target person with the illumination light IL. The other features of the illumination control unit 312g may be the same as those of the illumination control unit 312f.

(9-2) Authentication Operation Performed by Authentication Apparatus 3g

Figure 30:
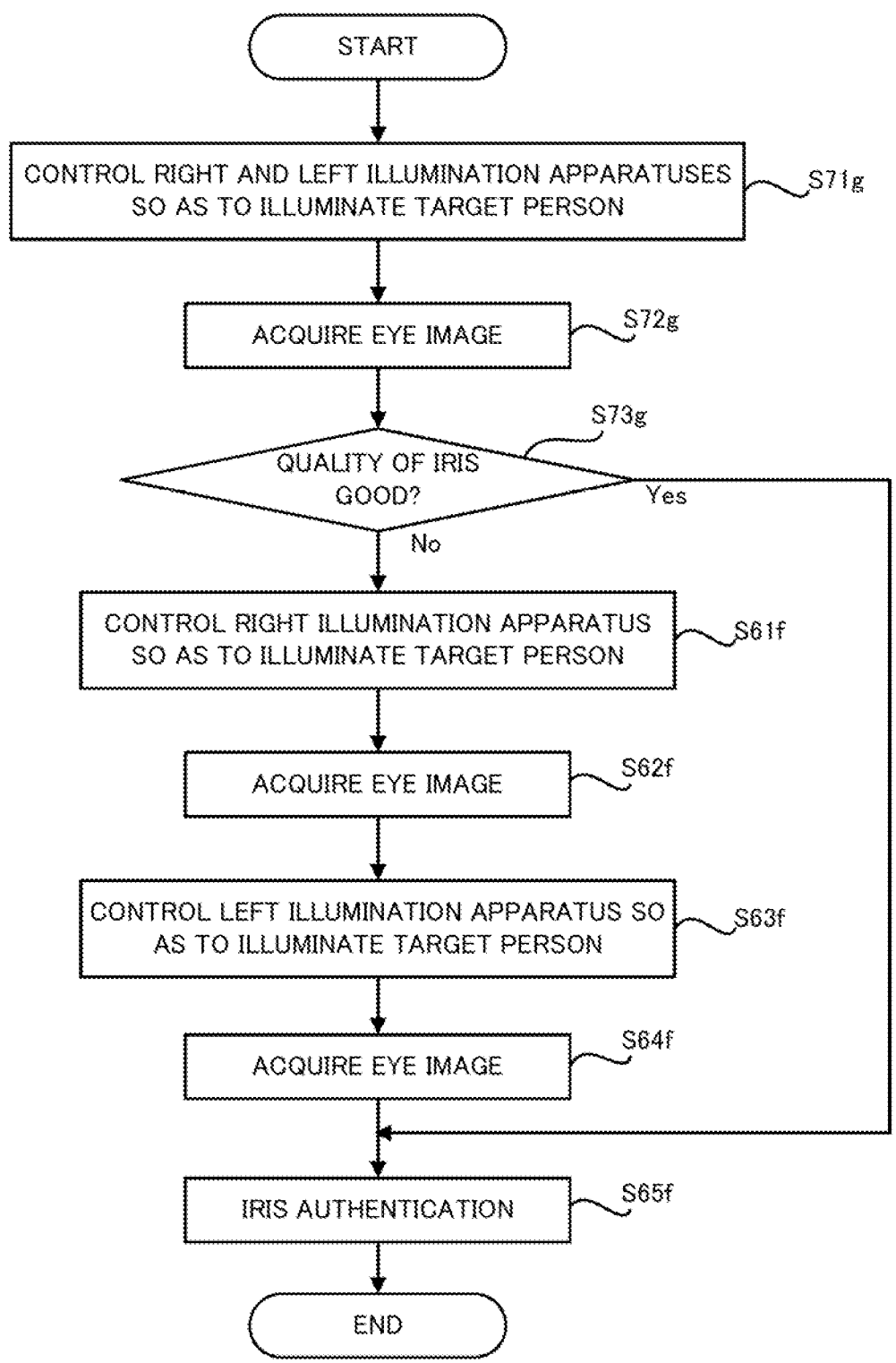
FIG. 30 is a flowchart showing a flow of authentication operation performed by the authentication apparatus according to the ninth example embodiment.

Subsequently, referring to FIG. 30, authentication operation performed by the authentication apparatus 3g will be described. FIG. 30 is a flowchart showing a flow of the authentication operation performed by the authentication apparatus 3g.

As shown in FIG. 30, the illumination control unit 312g controls the right illumination apparatus 2fR and the left illumination apparatus 2fL so that both of the right illumination apparatus 2fR and the left illumination apparatus 2fL illuminate the eyes of the target person with the illumination light IL (step S71g). That is, the illumination control unit 312g controls the right illumination apparatus 2fR so that the right illumination apparatus 2fR illuminates the eyes of the target person with the illumination light ILR, and controls the left illumination apparatus 2fL so that the left illumination apparatus 2fL illuminates the eyes of the target person with the illumination light ILL. In other words, the illumination control unit 312f controls the right illumination apparatus 2fR so that the right illumination apparatus 2fR emits the illumination light ILR, and controls the left illumination apparatus 2fL so that the left illumination apparatus 2fL emits the illumination light ILL.

Then, the imaging apparatus 1 images the eyes of the target person (in this case, both of the right and left eyes). Consequently, the imaging apparatus 1 generates the eye image IMG_E. That is, the imaging apparatus 1 generates the eye image IMG_E where the eyes (in this case, both of the right and left eyes) of the target person are captured, the eyes being illuminated by the illumination light ILR and the illumination light ILL. In the ninth example embodiment, the eye image IMG_E where the eyes (in this case, both of the right and left eyes) of the target person are captured, the eyes being illuminated by the illumination light ILR and the illumination light ILL, is referred to as the "eye image IMG_EB", as necessary. When the imaging apparatus 1 generates the eye image IMG_EB, the illumination control unit 312g receives (i.e., acquires) the eye image IMG_EB from the imaging apparatus 1, using the communication apparatus 33 (step S72g).

Thereafter, the illumination control unit 312g determines whether or not the quality of the iris captured in the eye image IMG_EB is good (step S73g). For example, the illumination control unit 312g may detect the iris area IA and the reflection area RA in the eye image IMG_EB and determine whether or not the ratio of the overlap area where the iris area IA and the reflection area RA overlap each other to the iris area IA is less than or equal to an allowable upper limit. In this case, the illumination control unit 312g may determine that the quality of the iris captured in the eye image IMG_EB is good, when the ratio of the overlap area where the iris area IA and the reflection area RA overlap each other to the iris area IA is less than or equal to the allowable upper limit. For example, the illumination control unit 312g may detect the iris area IA in the eye image IMG_EB and determine whether or not the feature values related to the pattern of the iris can be extracted from the iris area IA detected. In this case, the illumination control unit 312g may determine that the quality of the iris captured in in the eye image IMG_EB is good, when the feature values related to the pattern of the iris can be extracted from the iris area IA. For example, the illumination control unit 312g may determine whether or not the target person can be authenticated by using the eye image IMG-EB. In this case, the illumination control unit 312g may determine that the quality of the iris captured in the eye image IMG_EB is good, when the target person can be authenticated by using the eye image IMG_EB.

In a case that it is determined that the quality of the iris is not good as the determination result in step S73g (step S73g: No), it is likely that the reflection area RA would overlap the iris area IA so much as to adversely affect the authentication accuracy of the target person. Therefore, in this case, the authentication apparatus 3g, similarly to the eighth example embodiment, performs the processes from step 61f to step S64f described above. As a result, the iris authentication unit 313f acquires the eye image IMG_ER where the reflection area RA does not overlap the iris area IAR, and the eye image IMG_EL where the reflection area RA does not overlap the iris area IAL. Thereafter, the iris authentication unit 313f performs the process of step S65f described above. That is, the iris authentication unit 313f authenticates the target person using the feature values related to the pattern of the iris extracted from the iris area IAR in the eye image IMG_ER and the iris area IAL in the eye image IMG_EL. However, as described above in the eighth example embodiment, the authentication apparatus 3f may authenticate the target person using any one of the feature values related to the pattern of the iris extracted from the iris area IAR of the eye image IMG_ER and the feature values extracted from the iris area IAL of the eye image IMG_EL.

On the other hand, in a case that it is determined that the quality of the iris is good as a determination result in step S73g (step S73g: YES), it is assumed that the iris authentication unit 313f can authenticate the target person using the eye image IMG_EB (that is, it is possible to extract the feature values of the iris sufficiently for the target person to be authenticated from the eye image IMG_EB). That is, it is assumed that iris authentication unit 313f can authenticate the target person without newly acquiring the eye images IMG_ER and IMG_EL. Therefore, in this case, the authentication apparatus 3g may not perform the processes from step S61f to step S64f described above. In this case, the iris authentication unit 313f may authenticate the target person using the feature values related to the pattern of the iris extracted from at least one of the iris areas IAR and IAL of the eye image IMG_EB (step S65f).

As described above, the authentication system SYSg according to the ninth example embodiment does not necessarily generate the eye images IMG_ER and IMG_EL. For this reason, it is possible to shorten time required for authenticating the target person, compared to the case where the eye images IMG_ER and IMG_EL are always generated.

Specifically, as described above, in a case that the eyes of the target person are being illuminated by the illumination light ILR and the illumination light ILL as described above, there is a possibility, in the eye image IMG_EB, that the reflection area RA of the illumination light ILR overlaps the iris area IAL corresponding to the iris of the left eye and/or the reflection area RA of the illumination light ILL overlaps the iris area IAR corresponding to the iris of the right eye. Therefore, the authentication system SYSg generally generates the eye image IMG_ER where no reflection area RA overlaps the iris area IAR and the eye image IMG_EL where no reflection area RA overlaps the iris area IAL independently from each other. However, for some reason, such a case also could occur in the eye image IMG_EB that no reflection area RA of the illumination light ILR overlaps the iris area IAL and also no reflection area RA of the illumination light ILL overlaps the iris area IAR. Alternatively, such a case also could occur that, in the eye image IMG_EB, while the reflection area RA of the illumination light ILR overlaps the iris area IAL, no reflection area RA of the illumination light ILL overlaps the iris area IAR. Alternatively, such a case also could occur that, in the eye image IMG_EB, while no reflection area RA of the illumination light ILR overlaps the iris area IAL, the reflection area RA of the illumination light ILL overlaps the iris area IAR. In these cases, the quality of the iris is assumed to be good, because the reflection area RA of the illumination light ILR and the reflection area RA of the illumination light ILL do not overlap at least one of the iris area IAR and the iris area IAL in the eye image IMG_EB. Accordingly, in these cases, the authentication system SYSg does not have to generate the eye image IMG_ER and the eye image IMG_EL separately from the eye image IMG_EB. Consequently, the number of times that eye image IMG_E is generated is reduced, compare to the case that the eye image IMG_ER and the eye image IMG_EL are always generated. For this reason, the authentication system SYSg can shorten the time required for authenticating the target person.

(10) Tenth Example Embodiment

Subsequently, a tenth example embodiment with respect to the illumination control apparatus, the illumination control method, the recording medium, and the imaging system will be described. Hereinafter, the illumination control apparatus, the illumination control method, the recording medium, and the imaging system according to the tenth example embodiment will be described using an authentication system SYSh where the illumination control apparatus, the illumination control method, the recording medium, and the imaging system according to the tenth example embodiment are applied.

(10-1) Configuration Authentication System SYSh

Figure 31:
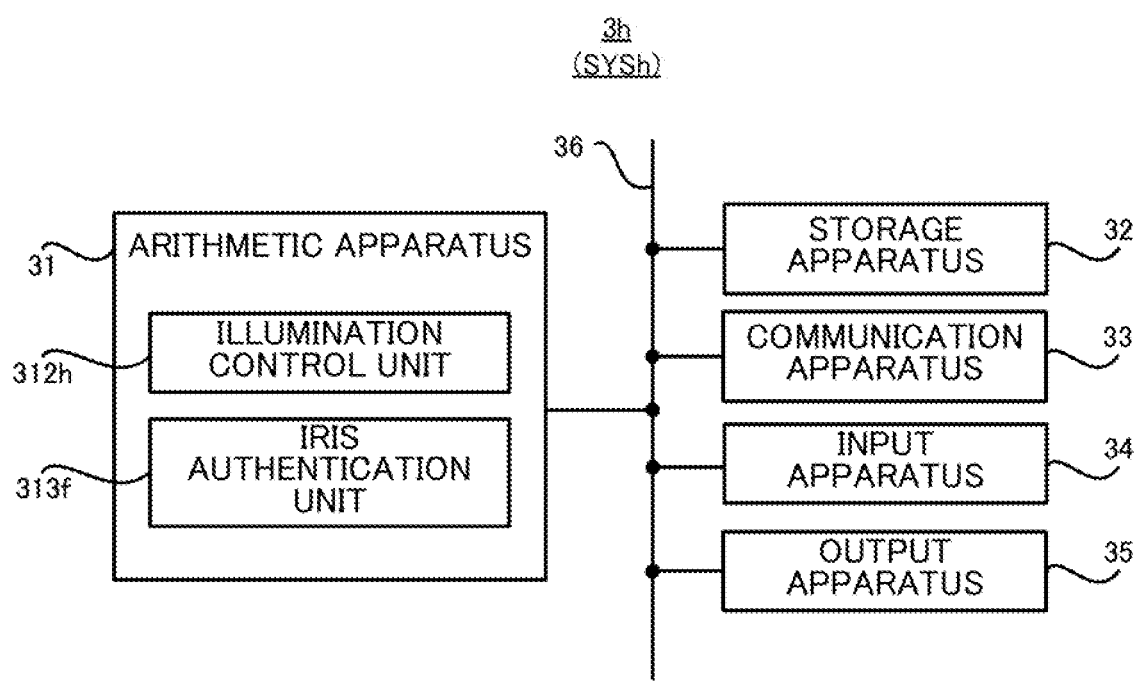
FIG. 31 is a block diagram showing a configuration of an authentication apparatus according to the tenth example embodiment.

The authentication system SYSh differs from the authentication system SYSf described above in that the authentication system SYSh includes an authentication apparatus 3h instead of the authentication apparatus 3f. The other features of the authentication system SYSh may be identical to those of the authentication system SYSf. Hereinafter, referring to FIG. 31, a description will be given of the authentication apparatus 3h in the tenth example embodiment. FIG. 31 is a block diagram showing a configuration of the authentication apparatus 3h according to the tenth example embodiment;

As shown in FIG. 31, the authentication apparatus 3h differs from the authentication apparatus 3f described above in that the authentication apparatus 3h includes an illumination control unit 312h instead of the illumination control unit 312f. The other features of the authentication apparatus 3h may be identical to those of the authentication apparatus 3f. The illumination control unit 312h differs from the illumination control unit 312f in that the illumination control unit 312f can adjust the illumination intensity of the illumination apparatus 2 for illuminating the target person, so that the brightness of an eyes area EA (see FIG. 33 to be described later) in the face image IMG_F becomes a target brightness. The other features of the illumination control unit 312h may be the same as those of the illumination control unit 312f.

(10-2) Authentication Operation Performed by Authentication Apparatus 3h

Figure 32:
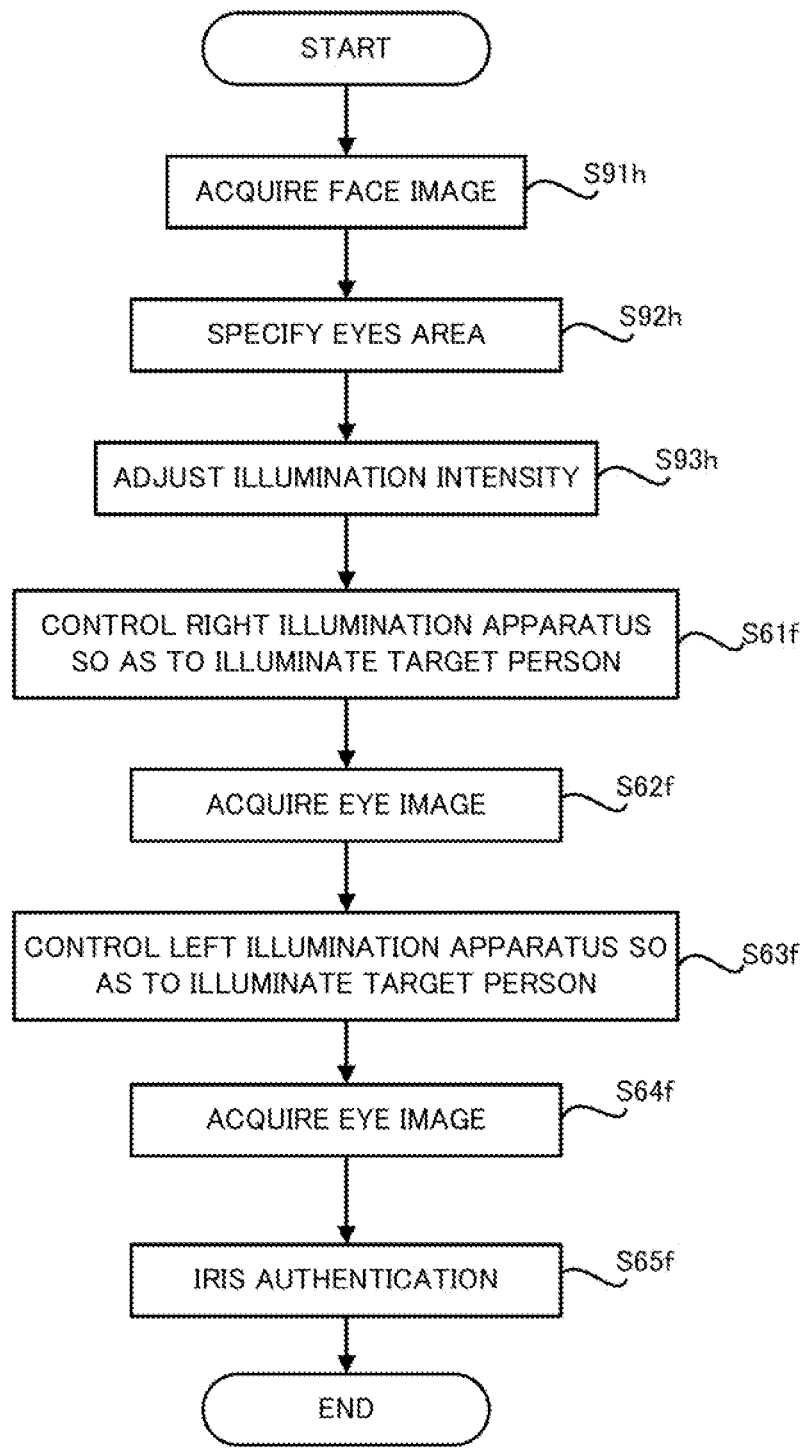
FIG. 32 is a flowchart showing a flow of authentication operation performed by the authentication apparatus according to the tenth example embodiment.

Subsequently, referring to FIG. 32, authentication operation performed by the authentication apparatus 3h will be described. FIG. 32 is a flow chart showing a flow of the authentication operation performed by the authentication apparatus 3h.

As shown in FIG. 32, the illumination control unit 312h acquires the face image IMG-F generated by imaging the face of the target person (step S91h). For example, when the imaging apparatus 1 images the face of the target person to generate the face image IMG_F, the illumination control unit 312h may receive (i.e., acquire) the face image IMG_F from the imaging apparatus 1, using the communication apparatus 33. For example, if the other imaging apparatus different from the imaging apparatus 1 images the face of the target person to generate the face image IMG_F, the illumination control unit 312h may receive (i.e., acquire) the face image IMG_F from the other imaging apparatus, using the communication apparatus 33.

Figure 33:
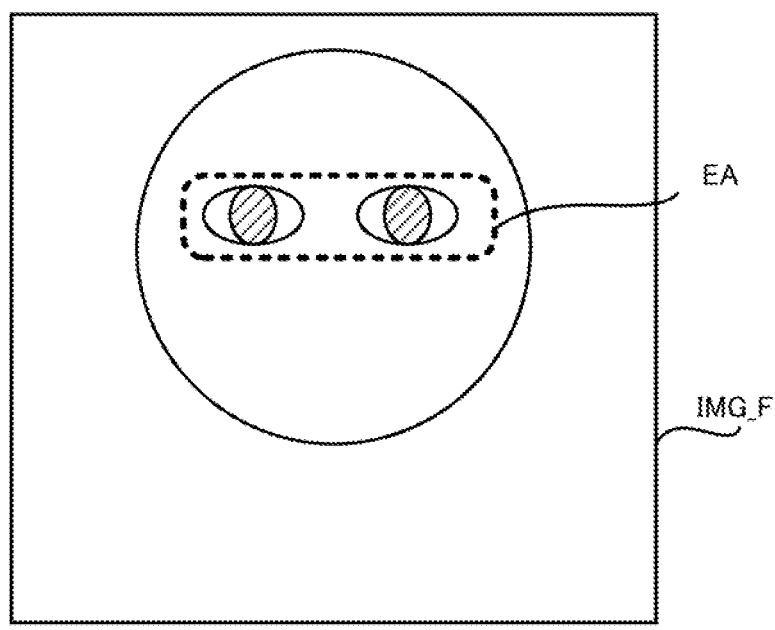
FIG. 33 shows an eyes area specified within a face image.

Thereafter, the illumination control unit 312h specifies the eyes area EA, which is a predetermined shaped area including the eyes of the target person in the face image IMG_F, based on the face image IMG_F acquired in step S91h (step S92h). An example of the eyes area EA is shown in FIG. 33. As shown in FIG. 33, the eyes area EA may be a rectangular shaped area containing the eyes. The eyes area EA may be a rectangular shaped area containing the eyes and the neighborhood area of the eyes. The size of the eyes area EA may be set depending on the size of the eyes.

Thereafter, the illumination control unit 312h calculates the brightness of the eyes area EA as a calculated brightness, and adjusts the illumination intensity at which the illumination apparatus 2 illuminates the target person, based on the calculated brightness of the eyes area EA and the target brightness preset as the target value of the brightness of the eyes area EA in the eye image IMG_E (step S93h). Specifically, the illumination control unit 312h adjusts the illumination intensity by setting the target value of the illumination intensity based on the calculated brightness and the target brightness. For example, in a case that the calculated brightness is higher than the target brightness, the current illumination intensity is assumed to be high for the ideal intensity. Therefore, in this case, the illumination control unit 312h may adjust the illumination intensity so that the present illumination intensity gets lower. Typically, the illumination control unit 312h may adjust the illumination intensity so that the current illumination intensity gets lower by setting a new target value of the illumination intensity which is lower than the current illumination intensity. On the other hand, for example, in a case that the calculated brightness is lower than the target brightness, the current illumination intensity is assumed to be low for the ideal intensity. Therefore, in this case, the illumination control unit 312h may adjust the illumination intensity so that the present illumination intensity gets higher. Typically, the illumination control unit 312h may adjust the illumination intensity so that the current illumination intensity gets higher by setting a new target value of the illumination intensity which is higher than the current illumination intensity. In this case, the illumination control unit 312h may adjust the illumination intensity using a mathematical expression "new target value of illumination intensity=(target brightness/calculated brightness)×present illumination intensity".

Thereafter, the authentication apparatus 3h performs the processes from step S61f to step S65f, which are similar to those performed by the authentication apparatus 3f.

As described above, in the tenth example embodiment, the authentication apparatus 3h can adjust the illumination intensity so that the brightness of the eyes area EA of the face image IMG_F becomes the target brightness. Consequently, the brightness of the iris area IA of the eye image IMG_E becomes a desired brightness according to the target brightness. Therefore, the authentication apparatus 3h can authenticate the target person, using the eye image IMG_E where the brightness of the iris area IA has become the desired brightness. For this reason, the authentication apparatus 3h can authenticate the target persons with higher accuracy, compared to the case that the target person is authenticated using the eye image IMG_E where the brightness of the iris area IA is not the target brightness.

When adjusting the illumination intensity, the illumination control unit 312h may adjust the illumination intensity so that the following three kinds of brightness are equal to each other: the brightness of the iris area IA obtained under a first illumination environment where while the right illumination apparatus 2/R is illuminating the target person with the illumination light ILR, the left illumination apparatus 2/L is not illuminating the target person with the illumination light ILL; the brightness of the iris area IA of the eye image IMG_EL obtained under a second illumination environment where while the left illumination apparatus 2/L is illuminating the target person with the illumination light ILL, the right illumination apparatus 2/R is not illuminating the target person with the illumination light ILR; and the brightness of the iris area IA of the eye image IMG_EB where the right illumination apparatus 2/R is illuminating the target person with the illumination light ILR and also the left illumination apparatus 2/L is illuminating the target person with the illumination light ILL. In this case, the illumination control unit 312h may set the target value of the illumination intensity for the first illumination environment by performing the processes from step S91h to step S93h described above under the first illumination environment; may set the target value of the illumination intensity for the second illumination environment by performing the processes from step S91h to step S93h described above under the second illumination environment; and may set the target value of the illumination intensity for the third illumination environment by performing the processes from step S91h to step S93h described above under the third illumination environment. Consequently, the brightness of the iris area IA of the eye image IMG_EB is maintained constant regardless of the difference in the illumination environment. For this reason, the authentication apparatus 3h can authenticate the target person with higher accuracy, compared to the case that the brightness of the iris area IA of the eye image IMG_EB fluctuates depending on the difference in the illumination environment.

At least one of the authentication system SYSa in the third example embodiment to the authentication system SYSe in the seventh example embodiment, may employ components unique to the tenth example embodiment. The components unique to the tenth example embodiment may include the components related to the adjustment of the illumination intensity.

(11) Supplementary Note

With respect to the example embodiments described above, further discloses the following supplementary notes.

[Supplementary Note 1]

An illumination control apparatus including: a detection unit that detects an iris area and a reflection area in an eye image generated by imaging eyes of a target being illuminated with illumination light from an illumination apparatus, the iris area and the reflection area corresponding to an iris of the eyes and a reflection image of the illumination light respectively; and an illumination control unit that controls the illumination apparatus based on an overlap state between the iris area and the reflection area.

[Supplementary Note 2]

The illumination control apparatus according to the supplementary note 1, wherein the illumination apparatus includes a plurality of light emitting portions each capable of emitting the illumination light, and the illumination control unit determines based on the overlap state, a lighting condition including at least one of: a number of the light emitting portions for emitting the illumination light; a position of the light emitting portion for emitting the illumination light; an angle at which the light emitting portion emits the illumination light; and an intensity of the illumination light that the light emitting portion emits, and controls the illumination apparatus based on the lighting condition determined.

[Supplementary Note 3]

The illumination control apparatus according to the supplementary note 1 or 2, wherein the illumination control unit controls the illumination apparatus so that a dimension of an overlap area where the iris area and the reflection area overlap each other gets smaller.

[Supplementary Note 4]

The illumination control apparatus according to any one of the supplementary notes 1 to 3, wherein the illumination control unit controls the illumination apparatus so that the reflection area is distributed in a particular distribution pattern.

[Supplementary Note 5]

The illumination control apparatus according to any one of the supplementary notes 1 to 4, wherein the illumination control unit controls the illumination apparatus so that the reflection area blinks at particular intervals.

[Supplementary Note 6]

The illumination control apparatus according to any one of the supplementary notes 1 to 5, wherein the illumination apparatus includes a plurality of light emitting portions each capable of emitting the illumination light, and the illumination control unit determines an intensity condition including at least one of a number and a position with respect to the light emitting portion for emitting the illumination light, based on at least one of a position, an appearance and a moving velocity with respect to the target, and controls the illumination apparatus based on the intensity condition determined.

[Supplementary Note 7]

The illumination control apparatus according to any one of the supplementary notes 1 to 6, wherein the illumination control unit controls the illumination apparatus so as to illuminate the eyes with the illumination light based on a second lighting condition different from a first lighting condition after illuminating the eyes with the illumination light based on the first lighting condition.

[Supplementary Note 8]

The illumination control apparatus according to the supplementary note 7, wherein the illumination control unit determines the first lighting condition and the second lighting condition so that a position of the reflection area relative to the iris area in a first eye image differs from a position of the reflection area relative to the iris area in a second eye image, the first eye image being generated by imaging the eyes being illuminated with the illumination light based on the first lighting condition and the second eye image being generated by imaging the eyes being illuminated with the illumination light based on the second lighting condition.

[Supplementary Note 9]

The illumination control apparatus according to the supplementary note 8, wherein the illumination control unit predicts motion of the eyes and determines the first lighting condition and the second lighting condition based on the motion predicted.

[Supplementary Note 10]

The illumination control apparatus according to the supplementary note 8 or 9, wherein the target is authenticated by using an area portion at which no reflection area overlaps within the iris area included in the first eye image and an area portion at which no reflection area overlaps within the iris area included in the second eye image.

[Supplementary Note 11]

The illumination control apparatus according to any one of the supplementary notes 1 to 10, wherein the illumination control unit transfers the illumination apparatus based on the overlap state.

[Supplementary Note 12]

The illumination control apparatus according to any one of the supplementary notes 1 to 11, further including an output unit that outputs based on the overlap state to the target, information for prompting the target to move relative to the illumination apparatus.

[Supplementary Note 13]

An illumination control method including: detecting an iris area and a reflection area in an eye image generated by imaging eyes of a target being illuminated with illumination light from an illumination apparatus, the iris area and the reflection area corresponding to an iris of the eyes and a reflection image of the illumination light respectively; and controlling the illumination apparatus based on an overlap state between the iris area and the reflection area.

[Supplementary Note 14]

A recording medium storing a computer program that allows a computer to implement an illumination control method including: detecting an iris area and a reflection area in an eye image generated by imaging eyes of a target being illuminated with illumination light from an illumination apparatus, the iris area and the reflection area corresponding to an iris of the eyes and a reflection image of the illumination light respectively; and controlling the illumination apparatus based on an overlap state between the iris area and the reflection area.

[Supplementary Note 15]

An imaging system including: a right illumination apparatus that emits right illumination light capable of illuminating at least a right eye of a target; a left illumination apparatus that emits left illumination light capable of illuminating at least a left eye of the target; and an imaging apparatus that images the right eye illuminated with the right illumination light and the left eye illuminated with the left illumination light, wherein the right illumination apparatus is arranged on a left side of the imaging apparatus viewed from the front of the imaging apparatus, the left illumination apparatus is arranged on a right side of the imaging apparatus viewed from the front of the imaging apparatus, and an optical axis of the right illumination apparatus and an optical axis of the left illumination apparatus intersect each other at a position between the imaging apparatus and the target at a timing when the imaging apparatus images the right eye and the left eye.

[Supplementary Note 16]

The imaging system according to the supplementary note 15, wherein the imaging apparatus images the right eye under a first illumination environment where, while the right illumination apparatus emits the right illumination light, the left illumination apparatus does not emit the left illumination light, and the imaging apparatus images the left eye under a second illumination environment where, while the left illumination apparatus emits the left illumination light, the right illumination apparatus does not emit the right illumination light.

[Supplementary Note 17]

The imaging system according to the supplementary note 16, wherein the target is authenticated based on: information related to an iris of the right eye captured in a first eye image generated by the imaging apparatus that images the right eye under the first illumination environment; and information related to an iris of the left eye captured in a second eye image generated by the imaging apparatus that images the left eye under the second illumination environment.

[Supplementary Note 18]

The imaging system according to the supplementary note 16 or 17, wherein the imaging apparatus images both of the right eye and the left eye under a third illumination environment where the right illumination apparatus emits the right illumination light and also the left illumination apparatus emits the left illumination light, and the imaging apparatus (i) images the right eye under the first illumination environment and also images the left eye under the second illumination environment, in a case that quality of an iris with respect to the right eye and the left eye captured in a third eye image does not satisfy a desired condition, the third eye image having been generated by the imaging apparatus that images both of the right eye and the left eye under the third illumination environment, and (ii) neither images the right eye under the first illumination environment nor images the left eye under the second illumination environment, in a case that the quality satisfies the desired condition.

[Supplementary Note 19]

The imaging system according to any one of the supplementary notes 16 to 18, wherein the right illumination apparatus and the left illumination apparatus emit the right illumination light and the left illumination light respectively, so that equal to each other are the brightness of the iris of the right eye in a first eye image generated by the imaging apparatus that images the right eye under the first illumination environment, the brightness of the iris of the left eye in a second eye image generated by the imaging apparatus that images the left eye under the second illumination environment, and the brightness of the iris with respect to the right eye and the left eye in a third eye image generated by the imaging apparatus that images both of the right eye and the left eye under a third illumination environment where the right illumination apparatus emits the right illumination light and also the left illumination apparatus emits the left illumination light.

At least a part of the components of each of the above-described example embodiments can be appropriately combined with at least the other part of the components of each of the above-described example embodiments. A part of the components of the respective example embodiments described above may not be used. Also, to the extent permitted by law, the disclosure of all documents cited in this disclosure described above (e.g., public publications) shall be incorporated as part of the description of this disclosure.

This disclosure may be modified appropriately in a range which is not inconsistent with this technical idea, which can be acquired by the claims and the entire specification. The illumination apparatus, the illumination control method, the recording medium, and the imaging system with such modifications are also included in the technical idea of this disclosure.

DESCRIPTION OF REFERENCE SIGNS

1000: Light control apparatus
1001: Detection unit
1002: Illumination control unit
1003: Illumination apparatus
1004: Eye image 2000: Imaging system
2001: Right illumination apparatus
2002: Left illumination apparatus
2003: Imaging apparatus
2004: Right illumination light
2005: Left illumination light
2006, 2007: Optical axis
SYSa, SYSb, SYSc, SYSd, SYSe, SYSf, SYSg, SYSh: Authentication System
1: Imaging apparatus
2: Illumination apparatus
2fR: Right illumination apparatus
2fL: Left illumination apparatus
21: Light emitting element
3, 3b, 3c, 3d, 3f, 3g, 3h: Authentication apparatus
311: Image analysis unit
312, 312b, 312c, 312d, 312f, 312g, 312h: Illumination control unit
313, 313c, 313f: Iris authentication unit
IMG_E, IMG_ER, IMG_EL, IMG_EB: Eye image
IL, ILR, ILL: Illumination light
AXR, AXL: Optical axis
IA, IAR, IAL: Iris area
RA: Reflection area

The invention claimed is:

1. An illumination control apparatus comprising:
at least one memory storing instructions; and
at least one processor configured to execute the instructions to:
detect an iris area and a reflection area in an eye image generated by imaging eyes of a target being illuminated with illumination light from an illumination apparatus, the iris area and the reflection area corresponding to an iris of the eyes and a reflection image of the illumination light respectively;
predict motion of the eyes;
determine, based on the motion predicted, a first lighting condition and a second lighting condition so that a position of the reflection area relative to the iris area in a first eye image differs from a position of the reflection area relative to the iris area in a second eye image, the first eye image being generated by imaging the eyes being illuminated with the illumination light based on the first lighting condition and the second eye image being generated by imaging the eyes being illuminated with the illumination light based on the second lighting condition; and
control the illumination apparatus based on an overlap state between the iris area and the reflection area so as to illuminate the eyes with the illumination light based on the second lighting condition different from the first lighting condition after illuminating the eyes with the illumination light based on the first lighting condition.

2. The illumination control apparatus according to claim 1, wherein
the illumination apparatus includes a plurality of light emitters each capable of emitting the illumination light, and
the at least one processor is configured to execute the instructions to determine based on the overlap state, a lighting condition including at least one of: a number of the light emitters for emitting the illumination light; a position of the light emitters for emitting the illumination light; an angle at which the light emitter emits the illumination light; and an intensity of the illumination light that the light emitter emits, and control the illumination apparatus based on the lighting condition determined.

3. The illumination control apparatus according to claim 1, wherein
the at least one processor is configured to execute the instructions to control the illumination apparatus so that a dimension of an overlap area where the iris area and the reflection area overlap each other gets smaller.

4. The illumination control apparatus according to claim 1, wherein
the at least one processor is configured to execute the instructions to control the illumination apparatus so that the reflection area is distributed in a particular distribution pattern.

5. The illumination control apparatus according to claim 1, wherein
the at least one processor is configured to execute the instructions to control the illumination apparatus so that the reflection area blinks at particular intervals.

6. The illumination control apparatus according to claim 1, wherein
the illumination apparatus includes a plurality of light emitters each capable of emitting the illumination light, and
the at least one processor is configured to execute the instructions to determine an intensity condition including at least one of a number and a position with respect to the light emitter for emitting the illumination light, based on at least one of a position, an appearance and a moving velocity with respect to the target, and control the illumination apparatus based on the intensity condition determined.

7. The illumination control apparatus according to claim 1, wherein
the at least one processor is configured to execute the instructions to control the illumination apparatus so as to illuminate the eyes with the illumination light based on a second lighting condition different from a first lighting condition after illuminating the eyes with the illumination light based on the first lighting condition.

8. The illumination control apparatus according to claim 7, wherein
the at least one processor is configured to execute the instructions to determine the first lighting condition and the second lighting condition so that a position of the reflection area relative to the iris area in a first eye image differs from a position of the reflection area relative to the iris area in a second eye image, the first eye image being generated by imaging the eyes being illuminated with the illumination light based on the first lighting condition and the second eye image being generated by imaging the eyes being illuminated with the illumination light based on the second lighting condition.

9. The illumination control apparatus according to claim 8, wherein
the at least one processor is configured to execute the instructions to predict motion of the eyes and determine the first lighting condition and the second lighting condition based on the motion predicted.

10. The illumination control apparatus according to claim 8, wherein
the target is authenticated by using an area portion at which no reflection area overlaps within the iris area included in the first eye image and an area portion at which no reflection area overlaps within the iris area included in the second eye image.

11. The illumination control apparatus according to claim 1, wherein
the at least one processor is configured to execute the instructions to transfer the illumination apparatus based on the overlap state.

12. The illumination control apparatus according to claim 1, wherein
the at least one processor is configured to execute the instructions to output based on the overlap state to the target, information for prompting the target to move relative to the illumination apparatus.

13. An illumination control method performed by a computer and comprising:
detecting an iris area and a reflection area in an eye image generated by imaging eyes of a target being illuminated with illumination light from an illumination apparatus, the iris area and the reflection area corresponding to an iris of the eyes and a reflection image of the illumination light respectively;
predicting motion of the eyes;
determining, based on the motion predicted, a first lighting condition and a second lighting condition so that a position of the reflection area relative to the iris area in a first eye image differs from a position of the reflection area relative to the iris area in a second eye image, the first eye image being generated by imaging the eyes being illuminated with the illumination light based on the first lighting condition and the second eye image being generated by imaging the eyes being illuminated with the illumination light based on the second lighting condition; and
controlling the illumination apparatus based on an overlap state between the iris area and the reflection area so as to illuminate the eyes with the illumination light based on the second lighting condition different from the first lighting condition after illuminating the eyes with the illumination light based on the first lighting condition.

14. An imaging system comprising:
a right illumination apparatus that emits right illumination light capable of illuminating at least a right eye of a target;
a left illumination apparatus that emits left illumination light capable of illuminating at least a left eye of the target; and
an imaging apparatus that images the right eye illuminated with the right illumination light and the left eye illuminated with the left illumination light, wherein
the right illumination apparatus is arranged on a left side of the imaging apparatus viewed from the front of the imaging apparatus,
the left illumination apparatus is arranged on a right side of the imaging apparatus viewed from the front of the imaging apparatus, and
an optical axis of the right illumination apparatus and an optical axis of the left illumination apparatus intersect each other at a position between the imaging apparatus and the target at a timing when the imaging apparatus images the right eye and the left eye, wherein
the imaging apparatus images the right eye under a first illumination environment where, while the right illumination apparatus emits the right illumination light, the left illumination apparatus does not emit the left illumination light,
the imaging apparatus images the left eye under a second illumination environment where, while the left illumination apparatus emits the left illumination light, the right illumination apparatus does not emit the right illumination light,
the imaging apparatus images both of the right eye and the left eye under a third illumination environment where the right illumination apparatus emits the right illumination light and also the left illumination apparatus emits the left illumination light, and
the imaging apparatus (i) images the right eye under the first illumination environment and also images the left eye under the second illumination environment, in a case that quality of an iris with respect to the right eye and the left eye captured in a third eye image does not satisfy a desired condition, the third eye image having been generated by the imaging apparatus that images both of the right eye and the left eye under the third illumination environment, and (ii) neither images the right eye under the first illumination environment nor images the left eye under the second illumination environment, in a case that the quality satisfies the desired condition.

15. The imaging system according to claim 14, wherein the target is authenticated based on: information related to an iris of the right eye captured in a first eye image generated by the imaging apparatus that images the right eye under the first illumination environment; and information related to an iris of the left eye captured in a second eye image generated by the imaging apparatus that images the left eye under the second illumination environment.

16. The imaging system according to claim 14, wherein the right illumination apparatus and the left illumination apparatus emit the right illumination light and the left illumination light respectively, so that equal to each other are the brightness of the iris of the right eye in a first eye image generated by the imaging apparatus that images the right eye under the first illumination environment, the brightness of the iris of the left eye in a second eye image generated by the imaging apparatus that images the left eye under the second illumination environment, and the brightness of the iris with respect to the right eye and the left eye in a third eye image generated by the imaging apparatus that images both of the right eye and the left eye under a third illumination environment where the right illumination apparatus emits the right illumination light and also the left illumination apparatus emits the left illumination light.

* * * * *